US009003574B2

(12) United States Patent
Maercovich

(10) Patent No.: US 9,003,574 B2
(45) Date of Patent: *Apr. 14, 2015

(54) METHOD AND ARRANGEMENT FOR CONTROLLING FLUSH WATER VOLUME

(76) Inventor: Jorge Maercovich, Woodland Hills, CA (US)

(*) Notice: Subject to any disclaimer, the term of this patent is extended or adjusted under 35 U.S.C. 154(b) by 1051 days.

This patent is subject to a terminal disclaimer.

(21) Appl. No.: 12/928,374

(22) Filed: Dec. 9, 2010

(65) Prior Publication Data

US 2011/0083260 A1  Apr. 14, 2011

Related U.S. Application Data

(63) Continuation-in-part of application No. 12/215,117, filed on Jun. 24, 2008, now Pat. No. 8,322,682, and a continuation-in-part of application No. 12/220,231, filed on Jul. 22, 2008, now Pat. No. 8,016,262.

(51) Int. Cl.
*E03D 1/14* (2006.01)
*F16K 31/40* (2006.01)
*E03D 5/10* (2006.01)
*F16K 31/385* (2006.01)
*E03D 3/12* (2006.01)

(52) U.S. Cl.
CPC .............. *E03D 3/12* (2013.01); *F16K 31/404* (2013.01); *E03D 5/105* (2013.01); *F16K 31/3855* (2013.01)

(58) Field of Classification Search
CPC .............. E03D 1/14; E03D 5/092; E03D 3/02
USPC .................................................. 4/300–442
See application file for complete search history.

(56) References Cited

U.S. PATENT DOCUMENTS

| 4,134,570 | A | * | 1/1979 | Walker | 251/40 |
| 4,272,052 | A | * | 6/1981 | Gidner | 251/39 |
| 5,427,350 | A | * | 6/1995 | Rinkewich | 251/30.01 |
| 6,349,921 | B1 | * | 2/2002 | Jahrling | 251/129.04 |
| 6,978,490 | B2 | * | 12/2005 | Wilson | 4/249 |
| 7,185,876 | B2 | * | 3/2007 | Jost | 251/129.04 |
| 7,367,541 | B2 | * | 5/2008 | Muderlak et al. | 251/129.04 |
| 7,543,436 | B2 | * | 6/2009 | Scott et al. | 56/328.1 |
| 7,607,635 | B2 | * | 10/2009 | Wilson | 251/40 |
| 7,857,280 | B2 | * | 12/2010 | Maercovich et al. | 251/40 |
| 8,033,522 | B2 | * | 10/2011 | Wilson | 251/40 |
| 8,042,787 | B2 | * | 10/2011 | Wilson | 251/40 |

* cited by examiner

*Primary Examiner* — Lori Baker
(74) *Attorney, Agent, or Firm* — Raymond Y. Chan; David and Raymond Patent Firm

(57) ABSTRACT

A flush water control arrangement includes a water control pusher alignedly extended towards a flushing shaft, and an automated actuation unit which includes a motorized unit and an automated plunger arm movably extended towards the water control pusher. When the motorized unit is activated in responsive to a presence of a user, the automated plunger arm is driven by the motorized unit to move the water control pusher so as to actuate the flushing shaft between the first and second positions for complete a flushing operation. The water control pusher is actuated to push at the second position of the flushing shaft to complete the flushing operation with a relatively high volume of water. The water control pusher is actuated to push at the first position of the flushing shaft to complete the flushing operation with a relatively low volume of water.

39 Claims, 47 Drawing Sheets

METHOD AND ARRANGEMENT FOR CONTROLLING FLUSH WATER VOLUME

CROSS REFERENCE OF RELATED APPLICATION

This is a CIP application that claims the benefit of priority under 35 U.S.C. §119 to a non-provisional application, application Ser. No. 12/215,117, filed Jun. 24, 2008 now U.S. Pat. No. 8,322,682 and a non-provisional application, application Ser. No. 12/220,231, filed Jul. 22, 2008.

BACKGROUND OF THE PRESENT INVENTION

1. Field of Invention

The present invention relates to a flush system, and more particularly to a flush system comprising a flush water control arrangement which is capable of effectively controlling a flow volume of flush water by a motorized device during a flushing operation in responsive to a presence of a user.

2. Description of Related Arts

A conventional manual flush apparatus for a sanitary system comprises a valve body, a water valve, and a manual operation mechanism. The valve body has a water inlet communicating with a water source, a water outlet for the water flushing out of the valve body, and a manual handle opening communicating with the manual operation mechanism. The water valve comprises a diaphragm member sealing between the water inlet and the water outlet, and a diaphragm shaft downwardly extended from the diaphragm member to move the diaphragm member between a sealed position and an unsealed position.

The manual operation mechanism comprises a driving unit, a retention ring coupled with the valve body at the manual handle opening to hold the driving unit thereat, and a manual handle movably mounted at the retention ring via a ball joint. The driving unit comprises a dish-shaped pushing platform disposed in the retention ring and a plunger pin extended from the pushing platform towards the diaphragm shaft through the manual handle opening. When the manual handle is manually moved through an arc-path from its first position to push the pushing platform, the plunger pin is laterally moved to push a bottom portion of the diaphragm shaft in a tilted manner, thereby unsealing the diaphragm member to let the water flushing out of the water outlet and thus flushing the sanitary system.

The main advantage of the manual flush apparatus is that the manual operation of the manual operation mechanism is accurate and simple. Accordingly, since the pushing platform provides a relatively large pushing surface for the manual handle, the pushing platform can transmit the pushing force at any direction from the manual handle to a lateral pushing force at the plunger pin. In other words, no matter which contacting point at the pushing surface of the pushing platform is hit by the manual handle, the plunger pin will always laterally move to push the diaphragm shaft. Therefore, the user can move the manual handle at any direction for completing the flushing operation of the manual flush apparatus.

For hygiene purposes, an improved flush apparatus provides an automated operation mechanism for flushing the sanitary system in a hand free manner. The automated operation mechanism comprises a solenoid operated pusher for utilizing a latching solenoid to limit power drain on the battery. Accordingly, when an infrared sensor detects the presence of a user of the sanitary system, the solenoid operated pusher is automatically driven to move the diaphragm shaft for flushing the sanitary system. However, the automated operation mechanism has several common drawbacks.

The presence of the user sensed by the infrared sensor will cause the solenoid to move the diaphragm member to the unsealed position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the automated operation mechanism. In other words, the conventional manual operation mechanism is more reliable than the automated operation mechanism. Thus, the maintenance cost of the automated operation mechanism is higher than that of the conventional manual operation mechanism.

In addition, the structural design of the automated operation mechanism is different from that of the manual operation mechanism. In other words, when the flush apparatus is incorporated with the automated operation mechanism, the flush apparatus will lose the mechanical-manual operated feature. Therefore, there is no alternative to flush the sanitary system when the automated operation mechanism has failed to operate.

The solenoid operated pusher is retracted by a spring force. Accordingly, a compression spring is coaxially mounted at the solenoid operated pusher and arranged in such a manner that when the solenoid operated pusher is pushed forward to move the diaphragm shaft, the compressed spring will apply the spring force to push the solenoid operated pusher back to its original position. Accordingly, the spring will gradually generate a weak spring force after a period of continuous use.

In order to install the automated operation mechanism into the conventional flush apparatus, the manual operation mechanism of the flush apparatus must be totally removed, which is a waste of resources in order to incorporate with the automated operation mechanism. In other words, the driving unit, the retention ring, and the manual handle must be disassembled from the flush apparatus in order to install the automated operation mechanism.

Furthermore, the solenoid must be electrically linked to a power source. The solenoid can be electrically linked with an external AC power source that an electric cable must be properly run from the external power source to the solenoid. Alternatively, the solenoid can be powered by a battery that the battery must be frequently replaced before the solenoid is out of battery.

In addition, a conventional toilet or urinal flush system comprises a valve body having a water inlet and a water outlet, a diaphragm having a water channel communicating between the water inlet and the water outlet, a relief valve disposed at the diaphragm for blocking the water flowing from the water inlet to the water outlet through the water channel, and a flush actuator arranged to move the relief valve at a position where the water is allowed flow to the water outlet for completing the flushing operation.

Conventionally, the relief valve has a pivotal pin member longitudinally and downwardly extended therefrom in the water channel, whereas the flush actuator comprises an elongated actuating member transversely and pivotally extended from the valve body, and a pusher pin transversely and movably extended in the valve body to align with the pivotal pin, in such a manner that when the elongated actuating member is pivotally moved in a predetermined direction (such as a downward direction with respect to the valve body), the pusher pin is transversely pushed to drive the pivotal pin to pivotally move within the valve body so as to open the relief valve for allowing water flowing through water channel. As a result, a user is able to flush the toilet by actuating the flush actuator.

A major drawback for this conventional toilet flush system is that the user is unable to control the volume of water flow so that unnecessary waste of water is prevalent. In other words, the conventional flush system will allow a standard time and volume of flushing regardless of purpose thereof. For example, when the user wishes to flush away a certain piece of toilet paper in the toilet bowl, he or she is unable to adjust the volume of flushing water so that the flushing cycle in this particular instance is exactly the same as any usual flushing cycle for this particular flush system. This is obviously undesirable from environmental as well as economical point of view.

There exist several types of flush systems which include certain types of water adjustment mechanisms which are claimed to be capable of controlling the volume of water during a typical flush cycle. However, the major problem for these kinds of water adjustment mechanisms is that their efficacy of effectively controlling the volume of flushing water among a plurality of operation modes is in doubt. For example, a conventional flush system equipped with a conventional water adjustment mechanism may have two modes of operations, namely a regular flush cycle and a water-saving flush cycle, in which the latter is supposed to require less water than the former. However, the reality is that very often, there is no noticeable or significant difference in water consumption between these two modes of operations so that there is no practical distinction between these two modes of operations. From engineering point of view, when the water adjustment mechanism produces no significant difference in water consumption, there is actually no reason or incentive to produce a flush system having such a water adjustment mechanism because it will certainly increase the manufacturing cost of that flush system.

It is submitted that the main reason for this ineffectiveness in controlling the volume of flush water is that one is hard to accurately control the period for which the relief valve is opened by one single actuating member. Thus, it is possible that the time of opening the relief valve in the two modes of operations is very much the same so that there is no noticeable difference in water volume between these two modes of operation.

SUMMARY OF THE PRESENT INVENTION

The invention is advantageous in that it provides a method and arrangement for controlling flush water volume, which is capable of effectively controlling a flow volume of flush water during a flushing operation.

Another advantage of the invention is to method and arrangement for controlling flush water volume, which is adapted for incorporating with the flush apparatus to selectively actuate the flush apparatus automatically by a motorized device in responsive to a presence of a user.

Another advantage of the invention is to method and arrangement for controlling flush water volume, which is adapted for coupling with the conventional flush apparatus by only detaching the manual handle. In other words, the driving mechanism is adapted to maximize the use of the components of the conventional flush apparatus.

Another advantage of the invention is to method and arrangement for controlling flush water volume, which is adapted to mount at the retention ring and to actuate the driving unit of the conventional manual operation mechanism. Therefore, the present invention will provide an accurate and simple flush operation as the manual flush apparatus provides.

Another advantage of the invention is to method and arrangement for controlling flush water volume, wherein the automated plunger arm is automatically driven by a motorized unit in a lateral direction that the automated plunger arm is laterally moved towards the diaphragm shaft and is laterally moved back from the diaphragm shaft. Therefore, no spring force is applied at the automated plunger arm to retract the automated plunger arm back to its original position.

Another advantage of the invention is to method and arrangement for controlling flush water volume, wherein the motorized unit is used as a replacement of the solenoid to control a flow of water, so as to enhance the reliable of the operation of the driving mechanism in comparison with the conventional solenoid mechanism. Thus, the motorized unit avoids water damage and to enhance performance and reliability.

Another advantage of the invention is to method and arrangement for controlling flush water volume, which does not require to alter the original structural design of the flush apparatus, so as to minimize the manufacturing cost of the flush apparatus incorporating with the driving mechanism.

Another object of the present invention is to provide a flush system comprising a water control arrangement, wherein a flushing shaft extended from a valve seat of the flush system is pushed at two spacedly apart positions on the flushing shaft so as to effectively control the period for which the valve seat is opened for effectively controlling the volume of flush water at two separate modes of operation.

Another object of the present invention is to provide a flush system comprising a water control arrangement, which does not in any way interfere with a normal operation of the flush system (except an adjustment of the volume of flush water), so as to allow the water control arrangement to be incorporated into a wide range of conventional flush systems without undue burden on the part of flush system manufacturers. In other words, the present invention can be kept to have the minimal manufacturing cost.

Another advantage of the invention is to method and arrangement for controlling flush water volume, wherein no expensive or complicated structure is required to employ in the present invention in order to achieve the above mentioned objects. Therefore, the present invention successfully provides an economic and efficient solution for not only providing an automated flush operation for the flush apparatus to control the flush water volume but also providing an accurate and simple flush operation as the manual flush apparatus does.

Additional advantages and features of the invention will become apparent from the description which follows, and may be realized by means of the instrumentalities and combinations particular point out in the appended claims.

According to the present invention, the foregoing and other objects and advantages are attained by an arrangement for controlling flush water volume, which comprises:

In accordance with another aspect of the invention, the present invention comprises Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
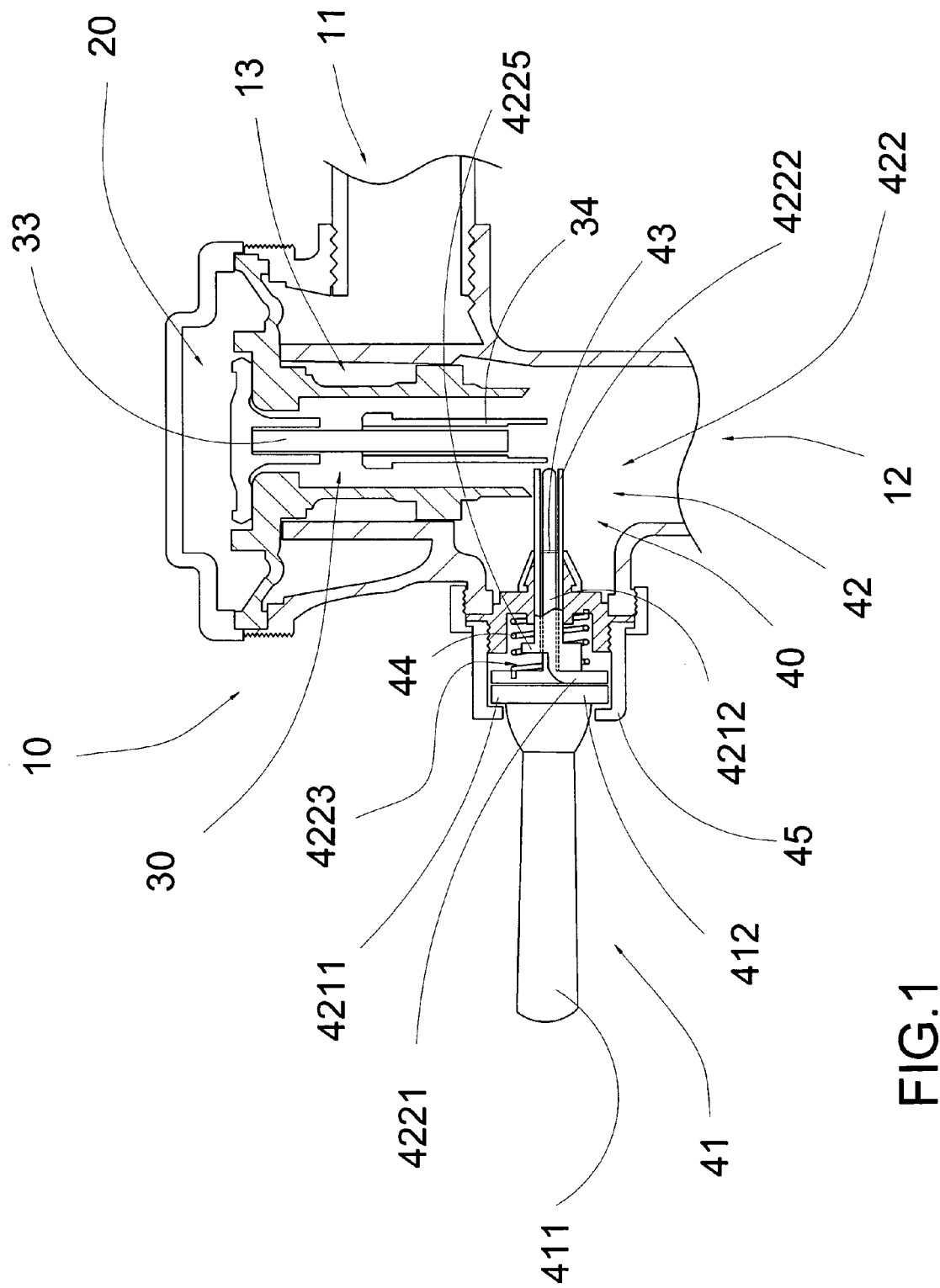
FIG. 1 is a sectional side view of a flush system according to a preferred embodiment of the present invention.

Referring to FIG. 1 to FIG. 6 of the drawings, a flush system according to a preferred embodiment of the present invention is illustrated, in which the flush system for a toilet comprises a valve body 10, a valve seat 20, a flushing shaft 30, and a water control arrangement 40.

The valve body 10 has a water inlet 11 communicating with a water source, a water outlet 12, and a water chamber 13 communicating between the water inlet 11 and the water outlet 12.

The valve seat 20 is supported in the valve body 10 to move between a normal idle position and a flushing position, wherein at the idle position, the valve seat 20 is sealed at the water chamber 13 for retaining a water pressure within the water chamber 13 so as to block flush water flowing from the water inlet 11 to the water outlet 12, wherein and at the flushing position, the valve seat 20 is moved to relief the water pressure for allowing the flush water flowing towards the toilet through the water outlet 12 so as to complete a flushing operation.

The flushing shaft 30 is extended from the valve seat 20 in the valve body 10 for being moved to drive the valve seat 20 to move between the idle position and the flushing position, wherein the flushing shaft 30 defines a lower pushing position 31 as a first position and a higher pushing position 32 as a second position. Furthermore, the flushing shaft 30 comprises a main shaft member 33 and a movable pin 34 movably provided on a lower portion thereof so that the movable pin 33 is capable of longitudinally moving along the flushing shaft 30 with respective to the main shaft member 33.

The flush water control arrangement 40 comprises a flush actuator 41 and a water control pusher 42. The flush actuator 41 comprises an actuator handle 411 movably extended from the valve body 10 for being actuated to activate the flushing operation, wherein the flush actuator 41 is adapted to move between a high volume actuating position and a low volume actuating position.

On the other hand, the water control pusher 42 comprises a low volume pusher member 421 and a high volume pusher member 422 spacedly supported and extended from the flush actuator 41, in such a manner that when the flush actuator 41 is moved to the high volume actuating position, the high volume pusher member 422 is driven to move by the flush actuator 41 to pivotally move the flushing shaft 30 at the higher pushing position 32 for allowing a high volume of water flowing through the valve seat 20, wherein when the flush actuator 41 is moved to the low volume actuating position, the low volume pusher member 421 is driven to move by the flush actuator 41 to pivotally move the flushing shaft 30 at the lower pushing position 31 for allowing a low volume of water flowing through the valve seat 20, thereby a user is able to control a flush volume of the water by actuating the flush actuator 41 between the high volume actuating position and the low volume actuating position. Normally however, the low volume pusher member 421 and the high volume pusher member 422 are spacedly apart from the flushing shaft 30 so as to close the valve seat 20 for blocking water from flowing through the valve body 10.

According to the preferred embodiment of the present invention, the flush actuator 41 further comprises a driving member 412 received within the valve body 10 and operatively connected with the actuator handle 411, in such a manner that when the flush actuator 41 is in the high volume actuating position, the flush actuator 41 is driven to drive the driving member 412 to push the high volume pusher member 422 of the water control pusher 42. On the other hand, when the flush actuator 41 is in the low volume actuating position, the flush actuator 41 is driven to drive the driving member 412 to push the low volume pusher member 421 of the water control pusher 42.

The high volume pusher member 422 of the water control pusher 42 comprises a biasing head 4221 extended to align with the driving member 412 of the flush actuator 41, and a tubular member 4222 defining a central cavity transversely extended from the biasing head 4221 to align with the higher pushing position 32 for pushing the lower pushing position 31 of the flushing shaft 30 when the flush actuator 41 is driven to move at the high volume actuating position. It is worth mentioning that when the tubular member 4222 is pushed to bias against the flushing shaft 30, the movable pin 34 is arranged to be pushed to move upwardly along the flushing shaft 30 while the main shaft member 33 is pivotally pushed to open the valve seat 20 for allowing a high volume of water flowing through the valve body 10.

In order to precisely control the volume of the water to complete the flushing operation, the time period of the valve seat 20 being stayed at the flushing position should be concerned. In other words, the longer time of the valve seat 20 being stayed at the flushing position, the relatively higher volume of water is used for completing the flushing operation. Therefore, the shorter time of the valve seat 20 being stayed at the flushing position, the relatively lower volume of water is used for completing the flushing operation.

Accordingly, the time period of the valve seat 20 being stayed at the flushing position can be controlled by the time of the flushing shaft 30 being actuated to move back to its vertical orientation. It is worth to mention that when the movable pin 34 of the flushing shaft 30 is moved back to its vertical orientation, the valve seat 20 is sealed back at its idle position to block the water flushing out of the water outlet 12.

Figure 2:
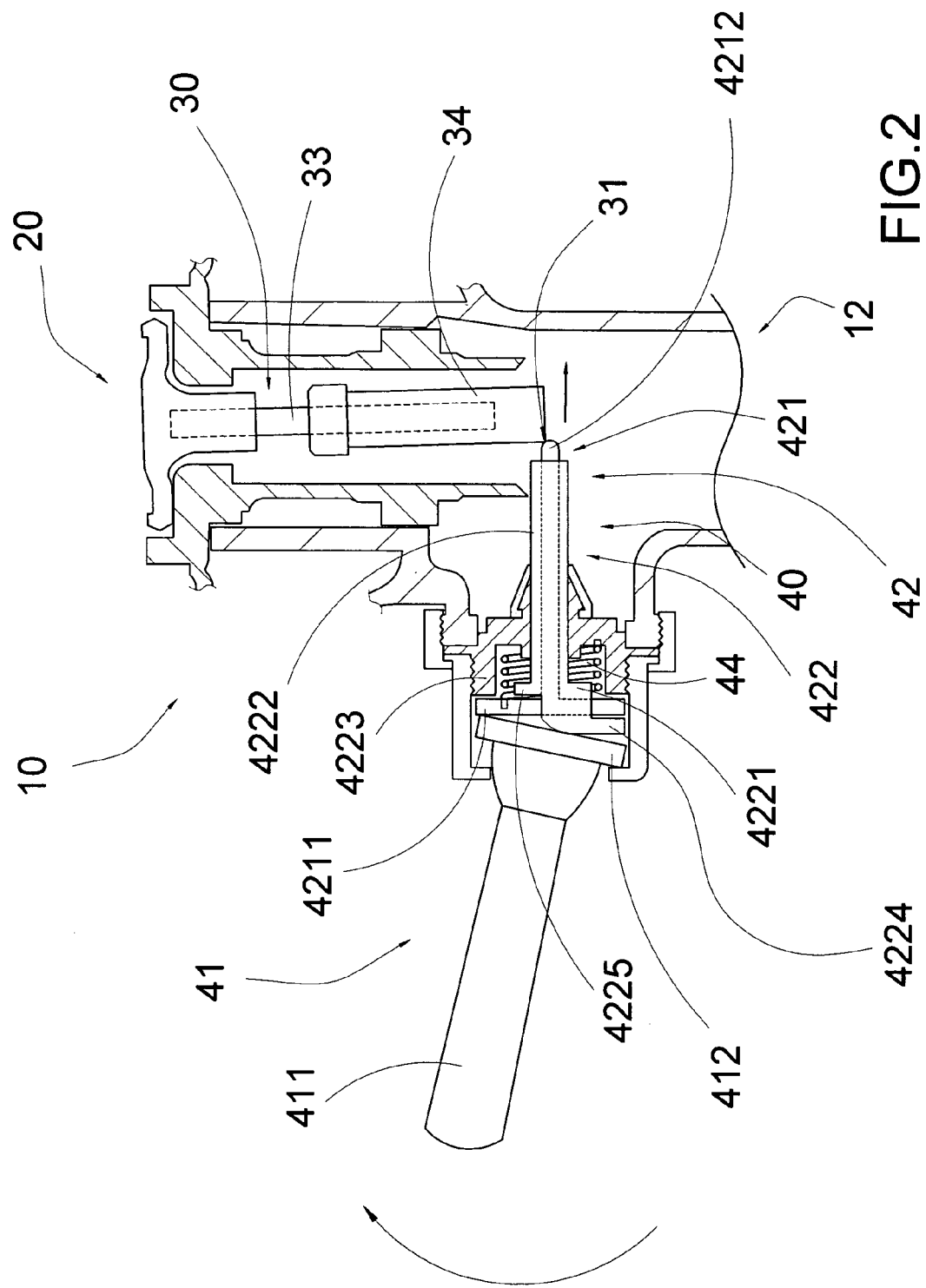
FIG. 2 is another sectional side view of the flush system according to the above preferred embodiment of the present invention, illustrating that the flush actuator is in the low volume actuating position and the flush cycle is about to start.
Figure 3:
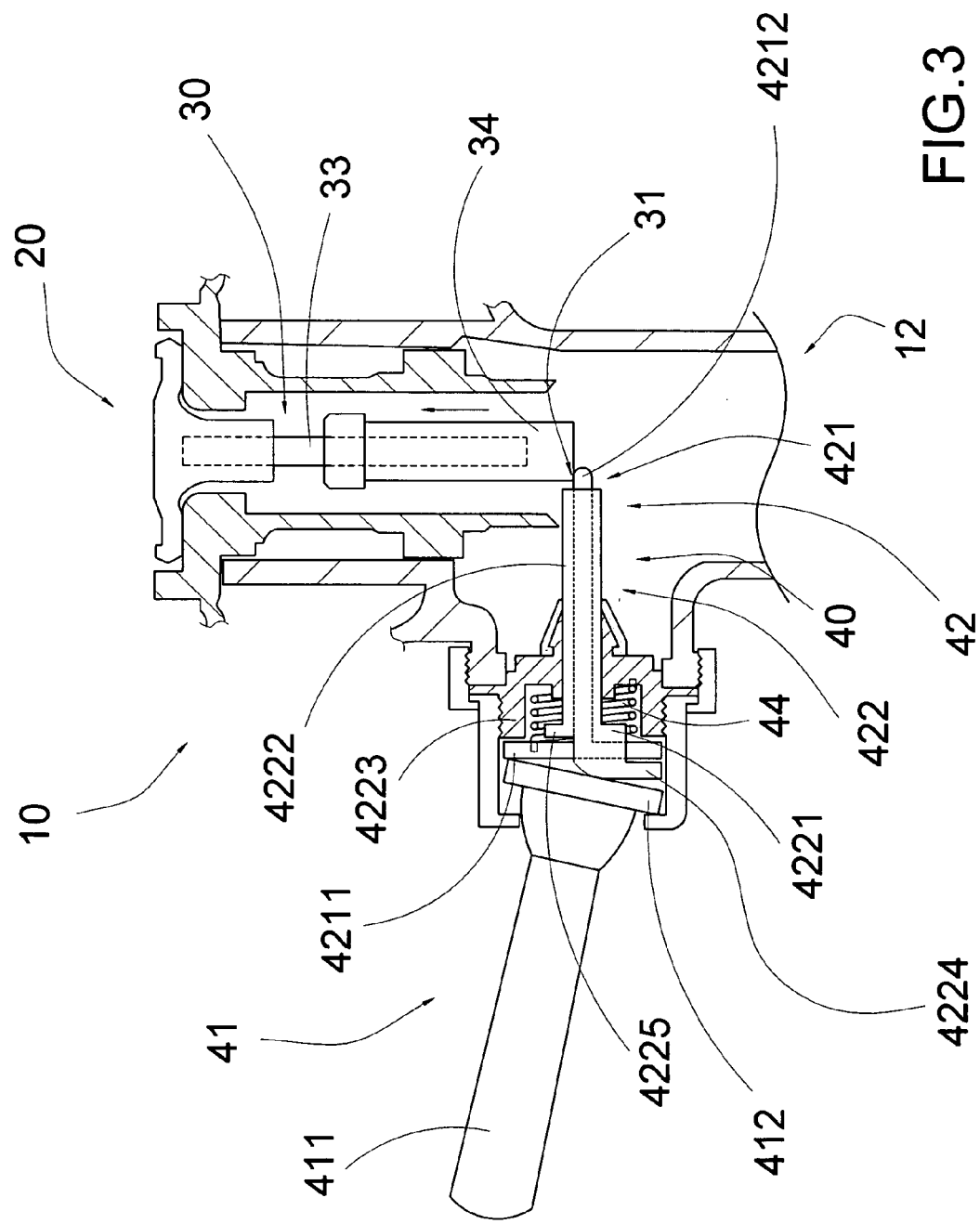
FIG. 3 is another sectional side view of the flush system according to the above preferred embodiment of the present invention, illustrating that the flush actuator is in the low volume actuating position when the flush cycle is started.
Figure 4:
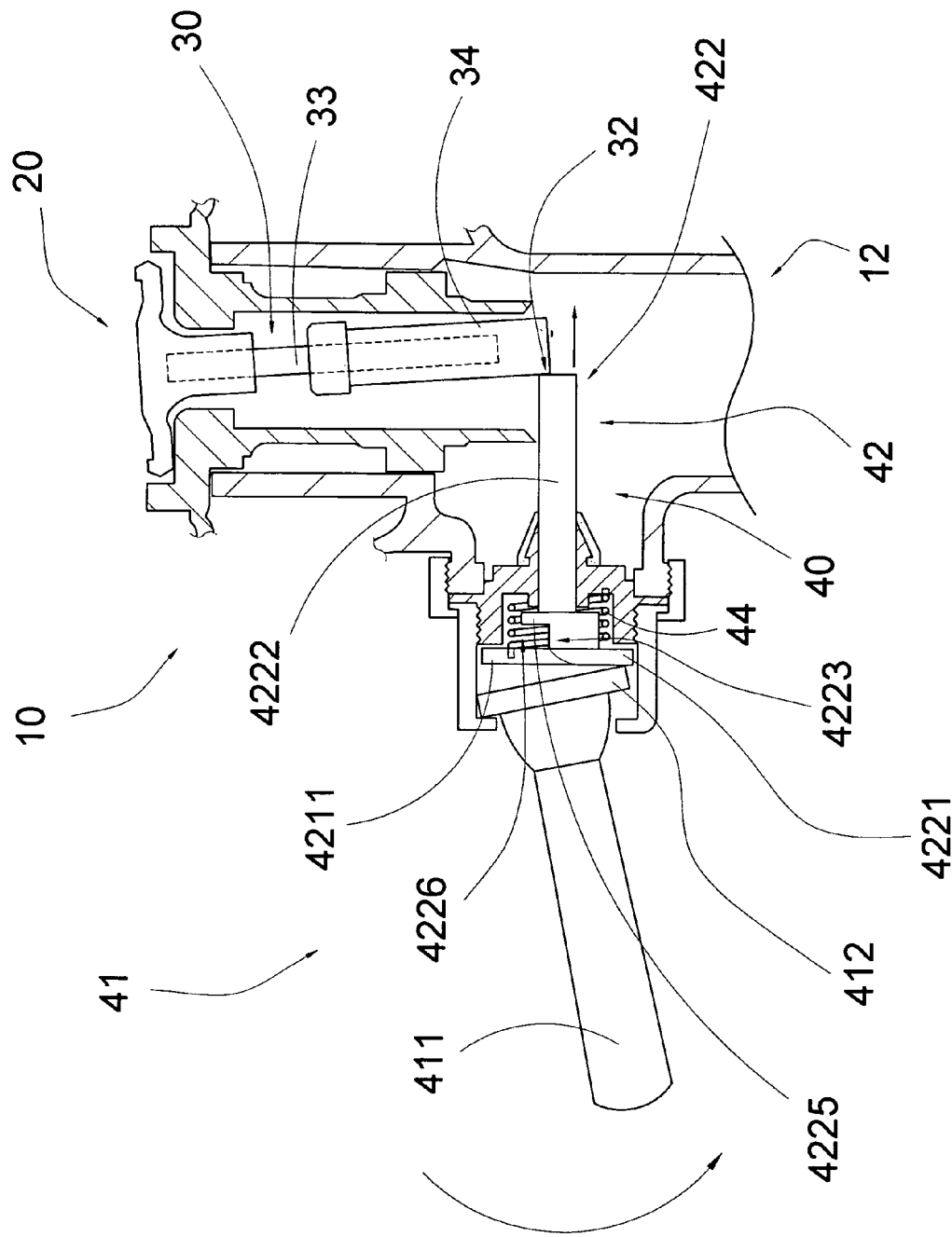
FIG. 4 is another sectional side view of the flush system according to the above preferred embodiment of the present invention, illustrating that the flush actuator is in the high volume actuating position and the flush cycle is about to start.
Figure 5:
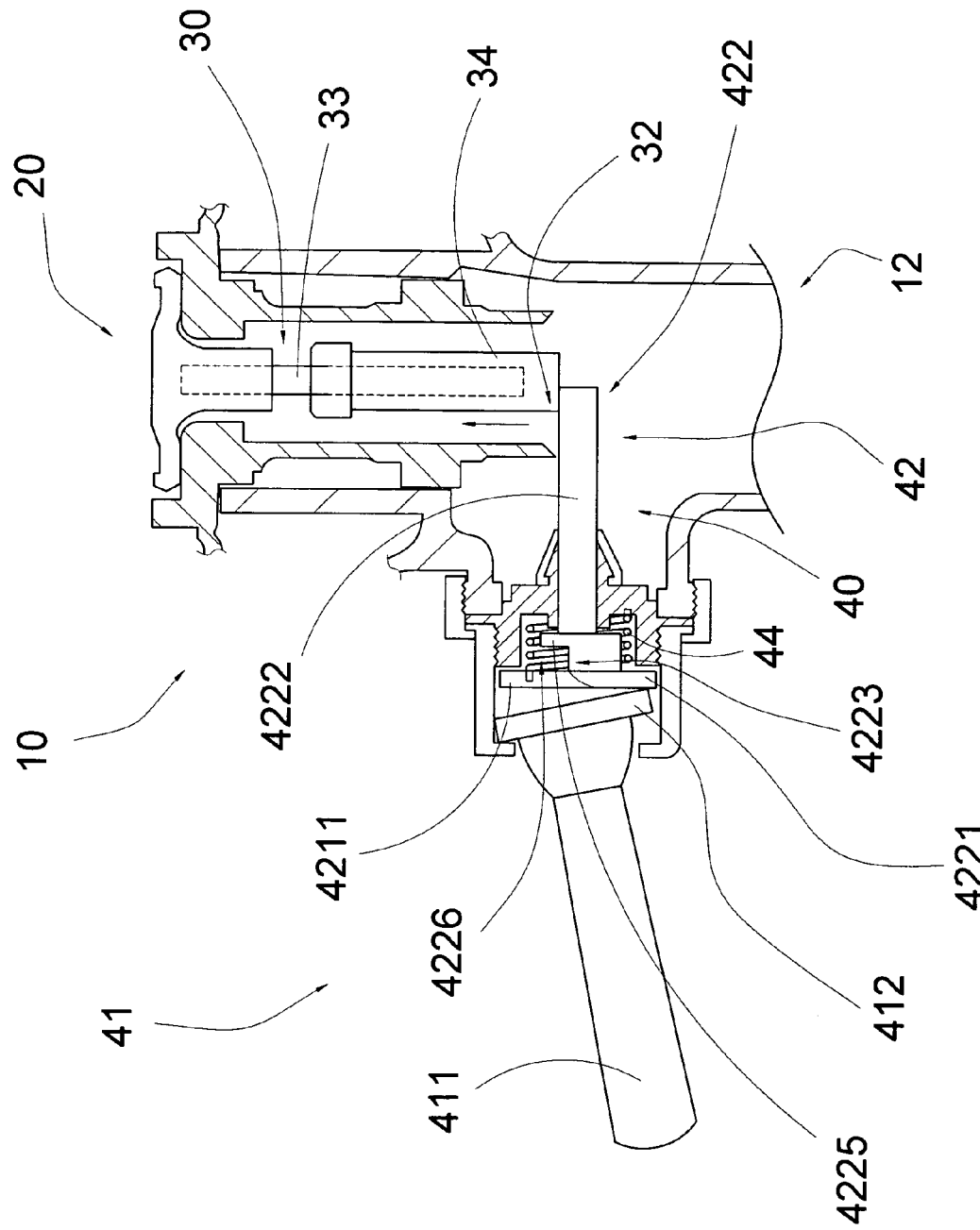
FIG. 5 is another sectional side view of the flush system according to the above preferred embodiment of the present invention, illustrating that the flush actuator is in the high volume actuating position when the flush cycle is started.
Figure 6:
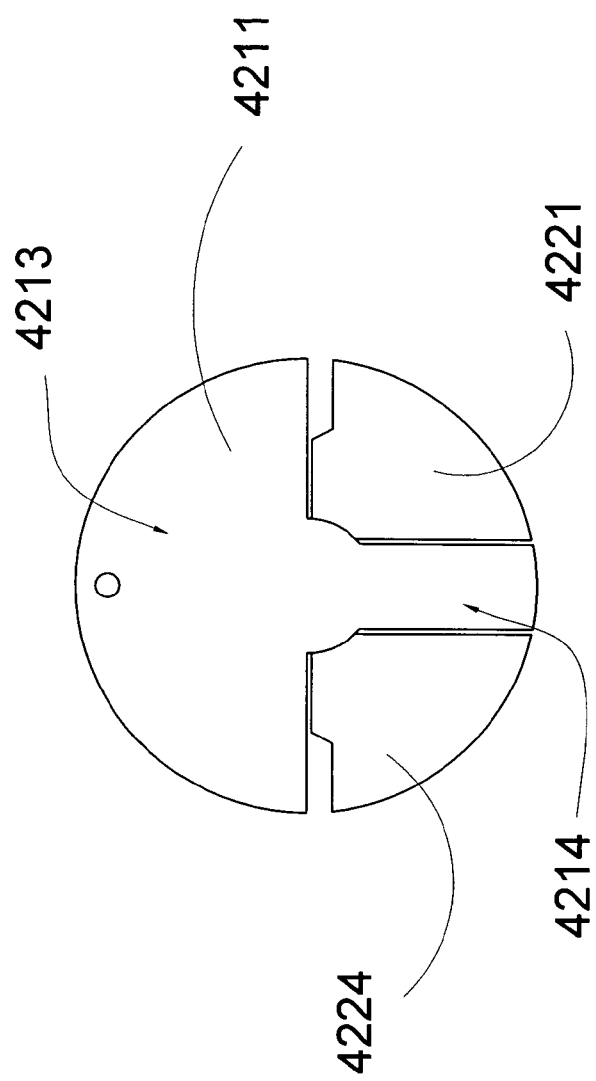
FIG. 6 is a side view of the flush actuator according to the above preferred embodiment of the present invention.

When the high volume pusher member 422 is driven to move by the flush actuator 41 to pivotally move the flushing shaft 30 at the higher pushing position 32, the movable pin 34 requires longer time to return back to its vertical orientation, as shown in FIGS. 4 and 5. When the low volume pusher member 421 is driven to move by the flush actuator 41 to pivotally move the flushing shaft 30 at the lower pushing position 31, the movable pin 34 requires shorter time to return back to its vertical orientation, as shown in FIGS. 2 and 3. Therefore, by actuating one of the low volume pusher member 421 and the high volume pusher member 422, the time period of the movable pin 34 returning back to its vertical orientation can be controlled so as to control the volume of water for completing the flushing operation.

Another way to precisely control the volume of the water to complete the flushing operation is to control the inclination angle of the flushing shaft 30 being actuated.

According to the preferred embodiment of the present invention, the high volume pusher member 422 is arranged to be longitudinally pushed to bias against the flushing shaft 30 until the movable pin 34 is moved to a position above the high volume pusher member 422. In other words, the flushing shaft 30 is pivotally moved to a high volume flushing angle of inclination with respect to a vertical axis of the flushing shaft 30 so that a time period for which the valve seat 20 is opened is maximized.

On the other hand, the low volume pusher member 421 comprises a pusher head 4211 extended between the driving member 412 of the flush actuator 41 and the high volume pusher member 422, and an elongated pusher pin 4212 transversely extended from the pusher head 4211 to align with the lower pushing position 31 for pushing the lower pushing position 31 of the flushing shaft 30 when the flush actuator 41 is driven to move at the low volume actuating position. It is worth mentioning that the elongated pusher pin 4212 has a circular cross section and is arranged to movably and coaxially disposed into the central cavity of the high volume pusher member 422 such that the low volume pusher member 421 is capable of pushing the lower pushing position 31 of the flushing shaft 30 by longitudinally sliding along the central cavity of the high volume pusher member 422. According to the preferred embodiment of the present invention, the low volume pusher member 421 is arranged to be longitudinally pushed to bias against the flushing shaft 30 until the movable pin 34 is moved to a position above the low volume pusher member 421. In other words, the flushing shaft 30 is pivotally moved to a low volume flushing angle of inclination with respective to a vertical axis of the flushing shaft 30 so that a time period for which the valve seat 20 is less than that when the flushing shaft 30 is pivotally moved to the high volume flushing angle. Since the low volume flushing angle of inclination is less than the high volume flushing angle of inclination, the time period for which the valve seat 20 is opened is less than that when the flushing shaft 30 is pivotally moved to the high volume flushing angle, and the volume of flush water will be accordingly less than when the flushing shaft 30 is pivotally moved to the high volume flushing angle.

Thus, when the higher pushing position 32 of the flushing shaft 30 is longitudinally pushed, a relatively high volume of flush water is allowed to pass through the valve body 10 because there is an extended time of opening of the valve seat 20. When the lower pushing position 31 of the flushing shaft 30 is longitudinally pushed, a relatively low volume of flush water is allowed to pass through the valve body 10 because the time of which the valve seat 20 is opened is less than that when the higher pushing position 31 of the flushing shaft 30 is pushed.

It is important to mention that when the high volume pusher member 422 is pushed by the driving member 412, the driving member 412 is arranged to push both the low volume pusher member 421 and the high volume pusher member 422 for driving them to move longitudinally toward the flushing shaft 30.

Accordingly, the pusher head 4211 of the low volume pusher member 421 has a top semi-circular portion 4213 and a lower transverse portion 4214 extended from the semi-circular portion 4213, wherein the when the flush actuator 41 is moved to the low volume actuating position, the driving member 412 is arranged to push the semi-circular portion 4213 of the low volume pusher member 421 so as to push the elongated pusher pin 4212 to bias against the flushing shaft 30.

On the other hand, the biasing head 4221 of the high volume pusher member 422 comprises a pusher seat 4223 having two spacedly apart biasing members 4224 and a blocking member 4225 spacedly formed from the two biasing members 4224 to define a pusher cavity 4226 between the two biasing members 4224 and the blocking member 4225, wherein when the flush actuator 41 is moved to the high volume actuating position, the driving member 412 is arranged to push the biasing members 4224 so as to push the elongated tubular member 4222 to bias against the flushing shaft 30. It is worth mentioning that the pusher head 4211 of the high volume pusher member 422 is capable of longitudinally moving in the pusher cavity 4226 so that a distance by which the pusher head 4211 can be longitudinally moved in the valve body 10 is dictated by a longitudinal length of the pusher cavity 4226 (i.e. the longitudinal distance between the biasing members 4224 and the blocking member 4225).

Figure 9A:
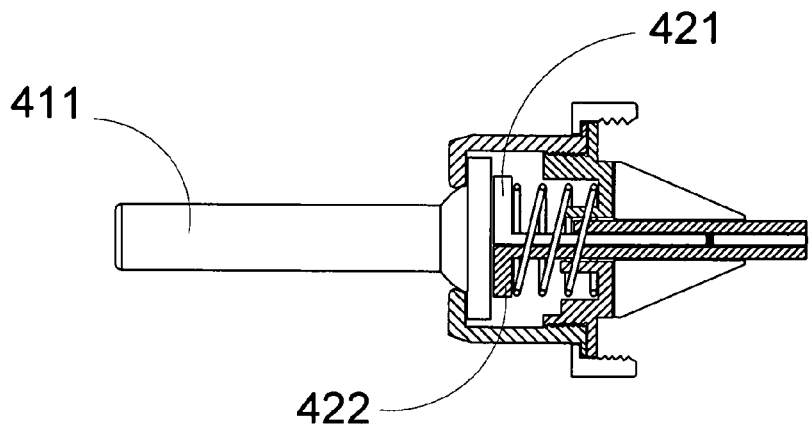
FIGS. 9A to 9C illustrate the actuator handle of the flush water control arrangement and its alternative modes according to the above preferred embodiment of the present invention.
Figure 9B:
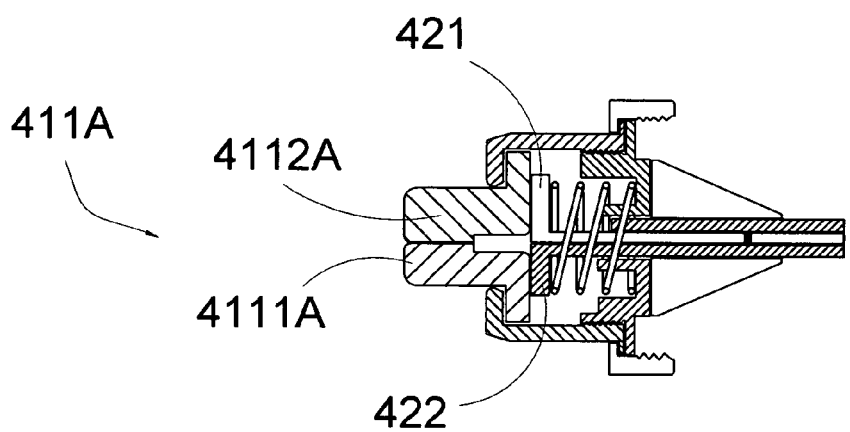
Figure 9C:
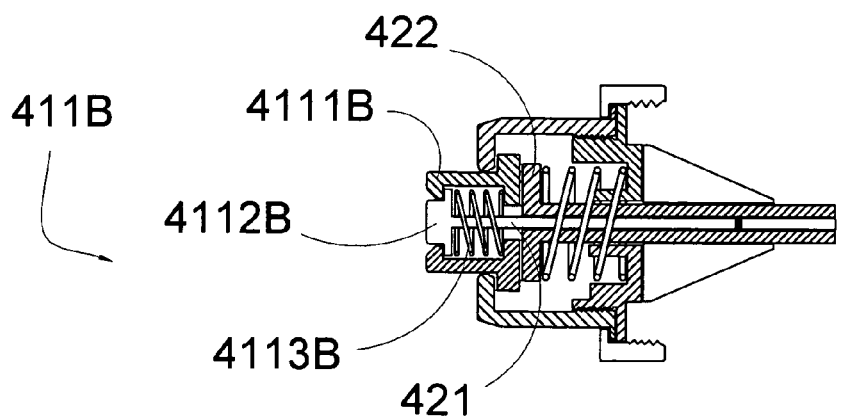

Accordingly, the lower transverse portion 4214 is integrally extended from the semi-circular portion 4213 such that when the actuator handle 411 is actuated to push at the biasing members 4224 for moving the high volume pusher member 422, the actuator handle 411 will also push at the lower transverse portion 4214 for moving the low volume pusher 421 at the same time. Therefore, both the low and high volume pusher members 421, 422 will be moved at the same time to complete the high volume flushing operation. It is worth to mention that the lower transverse portion 4214 can be omitted, as shown in FIG. 9A, such that when the actuator handle 411 is actuated, only the high volume pusher member 422 is pushed to complete the high volume flushing operation while the low volume pusher member 421 is remained at its original position without being pushed.

Figure 7:
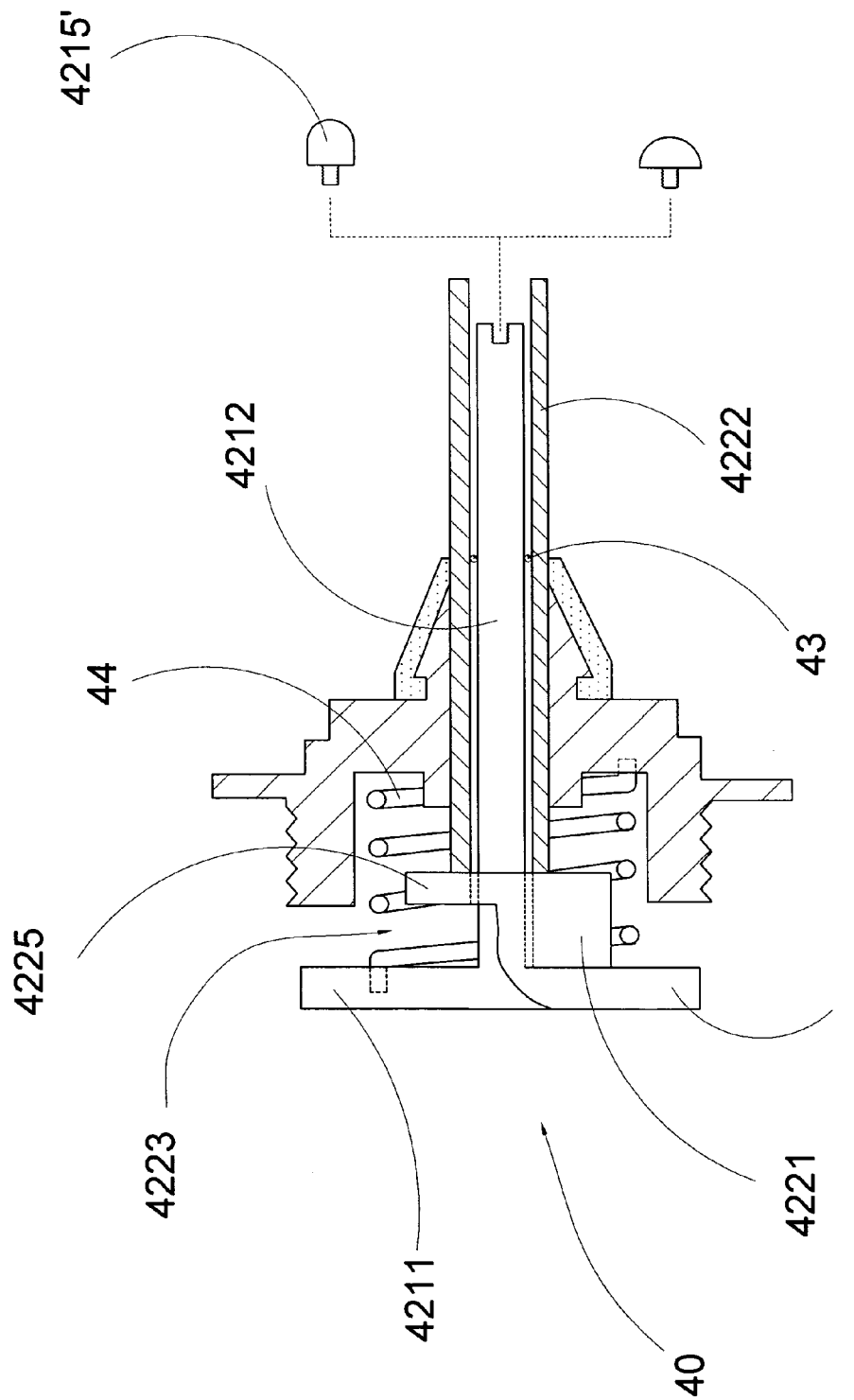
FIG. 7 is a first alternative mode of the flush system according to the above preferred embodiment of the present invention.

The water control arrangement 40 further comprises a sealing ring 43 received within the high volume pusher member 422 for preventing backflow of flush water from within the valve body 10 to the flush actuator 41. As shown in FIG. 7, two spaced apart sealing rings 43 are mounted between the outer surface of the low volume pusher member 421 and the inner surface of the high volume pusher member 422, wherein lubricant is applied at the outer surface of the low volume pusher member 421 between the two sealing rings 43 to ensure the smooth sliding movement of the low volume pusher member 421 within the high volume pusher member 422 and to seal the gap between the outer surface of the low volume pusher member 421 and the inner surface of the high volume pusher member 422.

Moreover, the water control arrangement 40 further comprises a resilient element 44 as an outer resilient element provided in the pusher cavity 4226 for normally applying an urging force to the low volume pusher member 421 and the high volume pusher member 422 for restoring a position thereof so as to normally keep the low volume pusher member 421 and the high pusher member 422 to be spacedly apart from the flushing shaft 30.

As shown in FIGS. 1 and 7, the water control arrangement 40 further comprises an inner resilient element 47 provided in the pusher cavity 4226 for applying an urging force to the high volume pusher member 422 only so as to normally keep the high volume pusher member 422 in an idle position when the low volume pusher 421 is actuated. Accordingly, the outer and inner resilient elements 44, 47 are two compression springs, wherein a diameter of the outer resilient element 44 is larger than a diameter of the inner resilient element 47.

When the actuator handle 411 is moved to actuate the high volume pusher member 422, both the low and high volume pusher members 421, 422 are driven to move. When the actuator handle 411 is moved to actuate the low volume pusher member 421, the inner resilient element 47 will push against the high volume pusher member 422 to keep the high volume pusher member 422 at its original position. In other words, the inner resilient element 47 ensures only the low volume flushing operation being completed when only the low high pusher member 421 is actuated.

It is worth mentioning that according to the preferred embodiment of the present invention, the actuator handle 411 is adapted to move upwardly and downwardly with respective to the valve body 10 in order to actuate the flush operation for having either the high volume of flush water or the low volume of flush water. However, one having ordinary skill in the art must appreciate that the direction of actuation for the actuator handle 411 can also be forward or backward with respective to the valve body 10.

The operation of the present invention is as follows: a user is free to actuate the actuator handle 411 upwardly or downwardly for driving the driving member to bias against the low volume pusher member 421 or the high volume pusher member 422.

When the low volume pusher member 421 is pushed, the flushing shaft 30 is pushed at the lower pushing position 31 so as to release a relatively low volume of flush water. On the other hand, when the high volume pusher member 422 is pushed, the flushing shaft 30 is pushed at the higher pushing position 32 so as to release a relatively high volume of flush water.

Referring to FIG. 7 of the drawings, a first alternative mode of the flush system according to the preferred embodiment of the present invention is illustrated. The first alternative mode is similar to the preferred embodiment except the low volume pusher member 421' further comprises a supplemental pusher member 4215' attached onto an outer end of the elongated pusher pin 4212, so that by adjusting a size of the supplemental pusher member 4215', the time opening the valve seat 20 can be optimally adjusted. For example, when the size of the supplemental pusher member 4125' is smaller than the size of the elongated pusher pin 4212, the time for releasing the valve seat 20 can further be reduced so as to further reduce the flow of the flush water.

Figure 8:
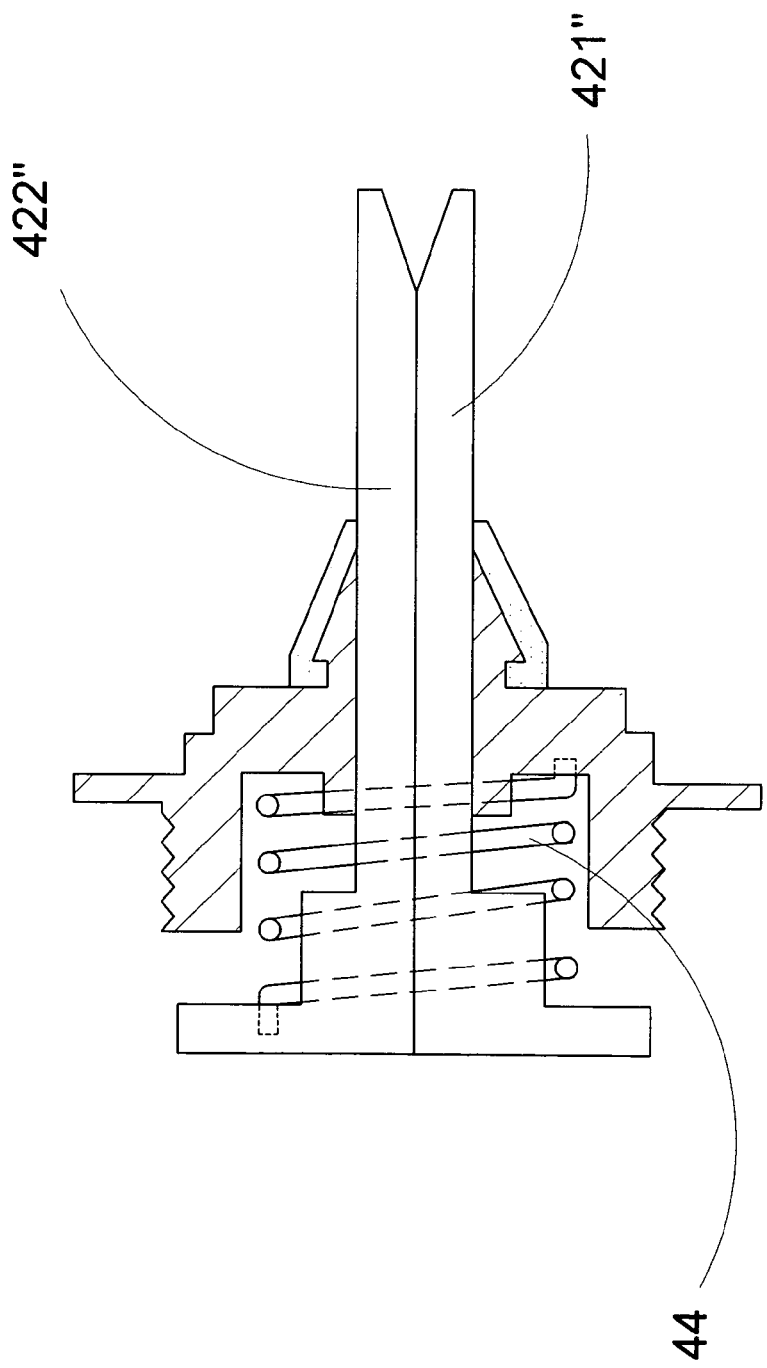
FIG. 8 is a second alternative mode of the flush system according to the above preferred embodiment of the present invention.

Referring to FIG. 8 of the drawings, a second alternative mode of the flush system according to the preferred embodiment of the present invention is illustrated. The alternative mode is similar to the preferred embodiment except the low volume pusher member 421" and the high volume pusher member 422". According to the alternative mode, each of the low volume pusher member 421" and the high volume pusher member 422" is an elongated member, wherein the low volume pusher member 421" and the high volume pusher member 422" are slidably supported within the valve body 10 in a side-by-side manner for being driven to move for pushing the lower pushing position 31 and the higher pushing position 32 respectively.

FIGS. 9 to 14 illustrate the actuator handle 411 of the flush water control arrangement 40 and its alternative modes according to the above preferred embodiment of the present invention.

Figure 10A:
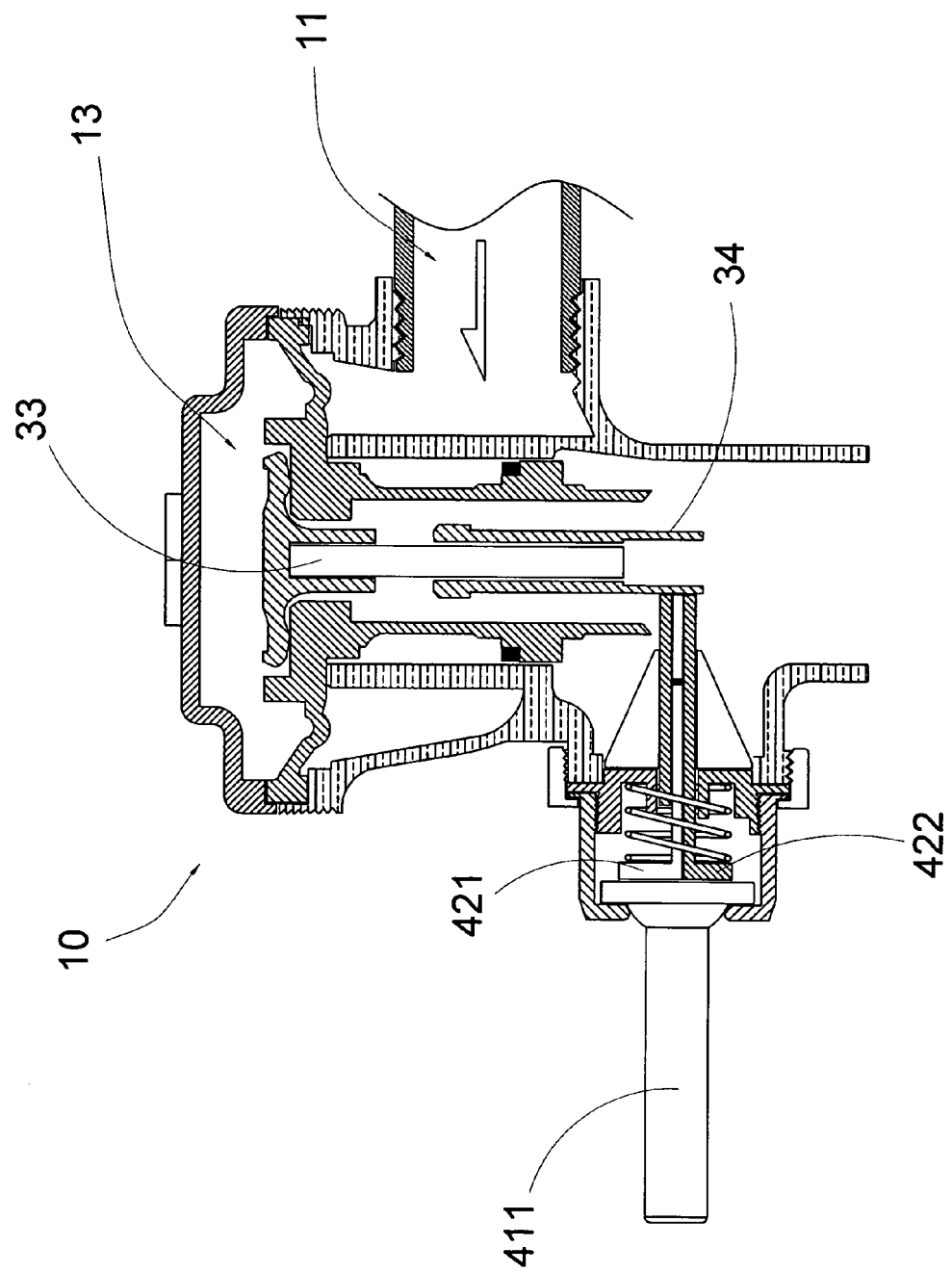
FIGS. 10A to 10C illustrate the actuator handle and its alternative modes mounted to the valve body according to the above preferred embodiment of the present invention.
Figure 10B:
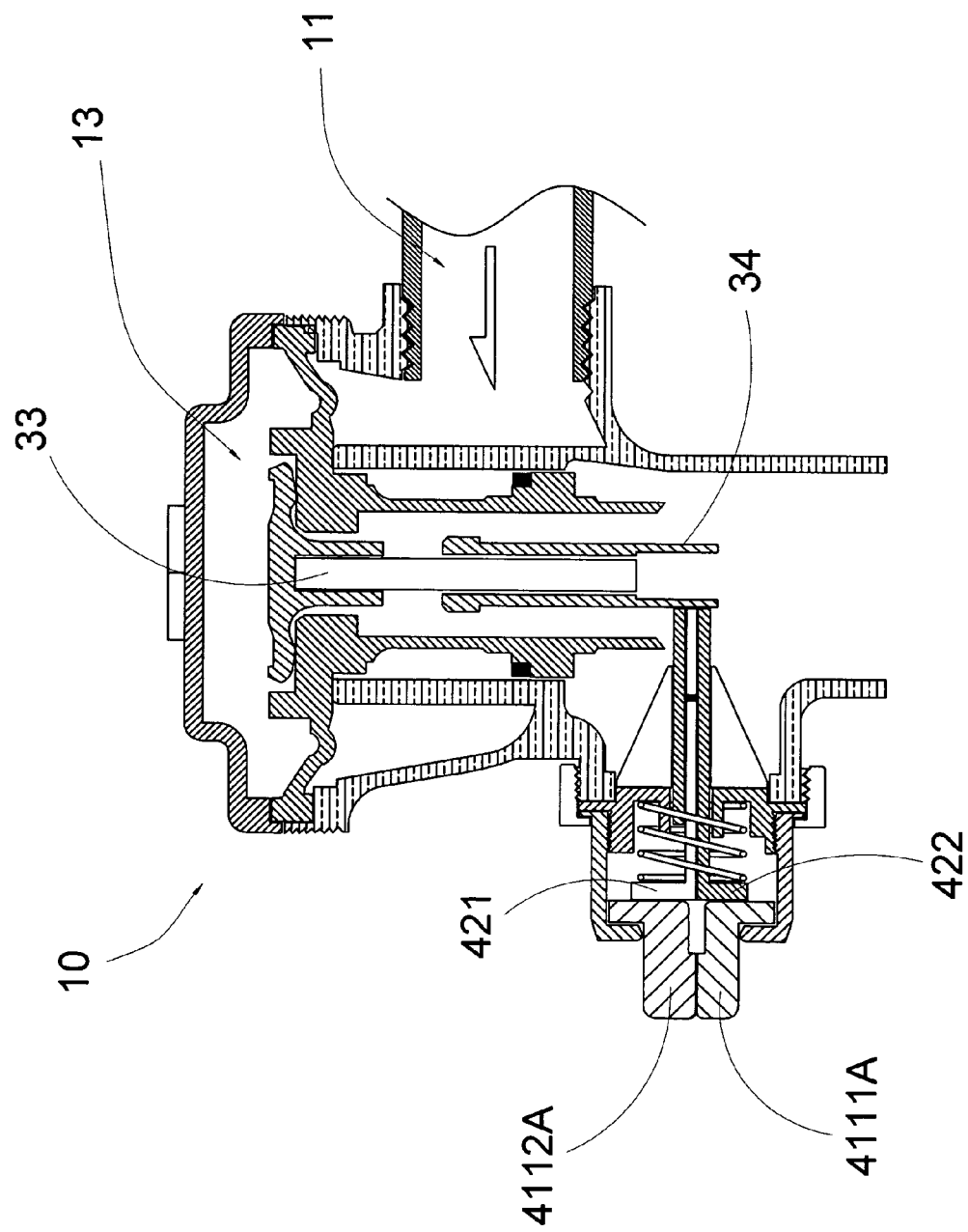
Figure 10C:
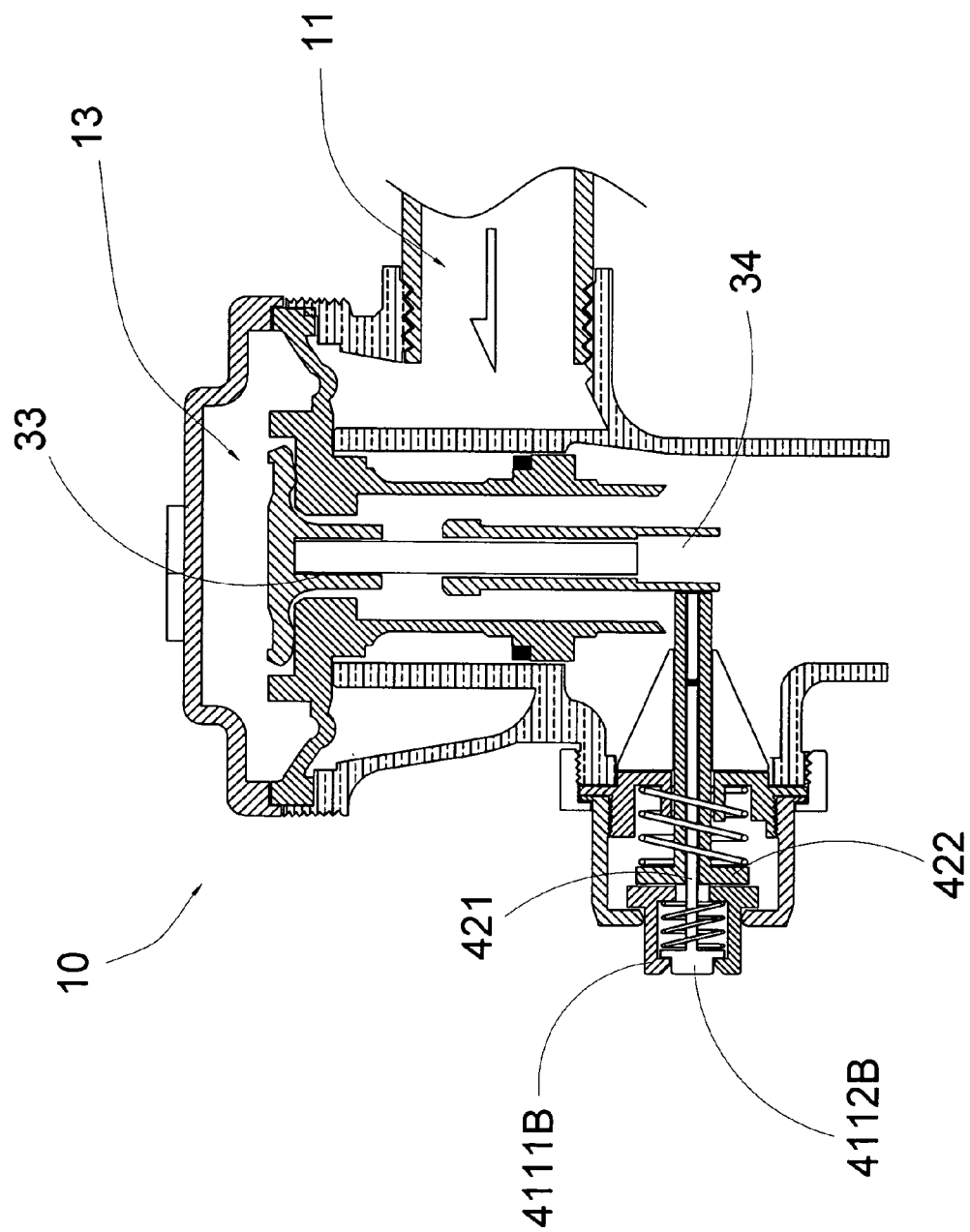
Figure 11A:
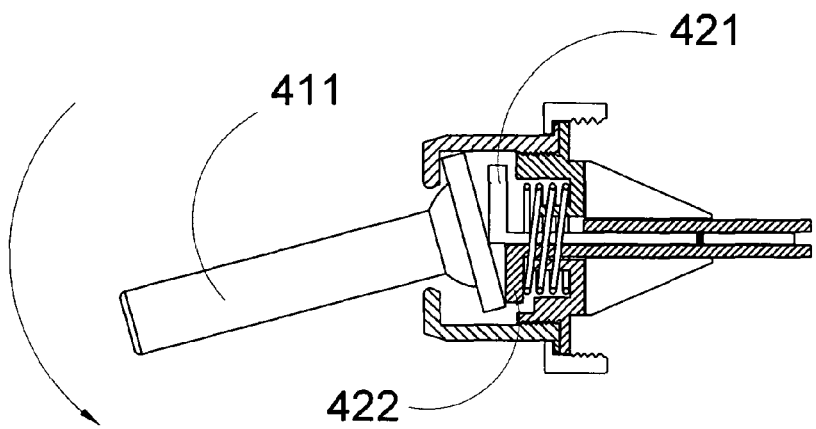
FIGS. 11A to 11C illustrate the actuator handle and its alternative modes being actuated for high volume flush operation according to the above preferred embodiment of the present invention.
Figure 12A:
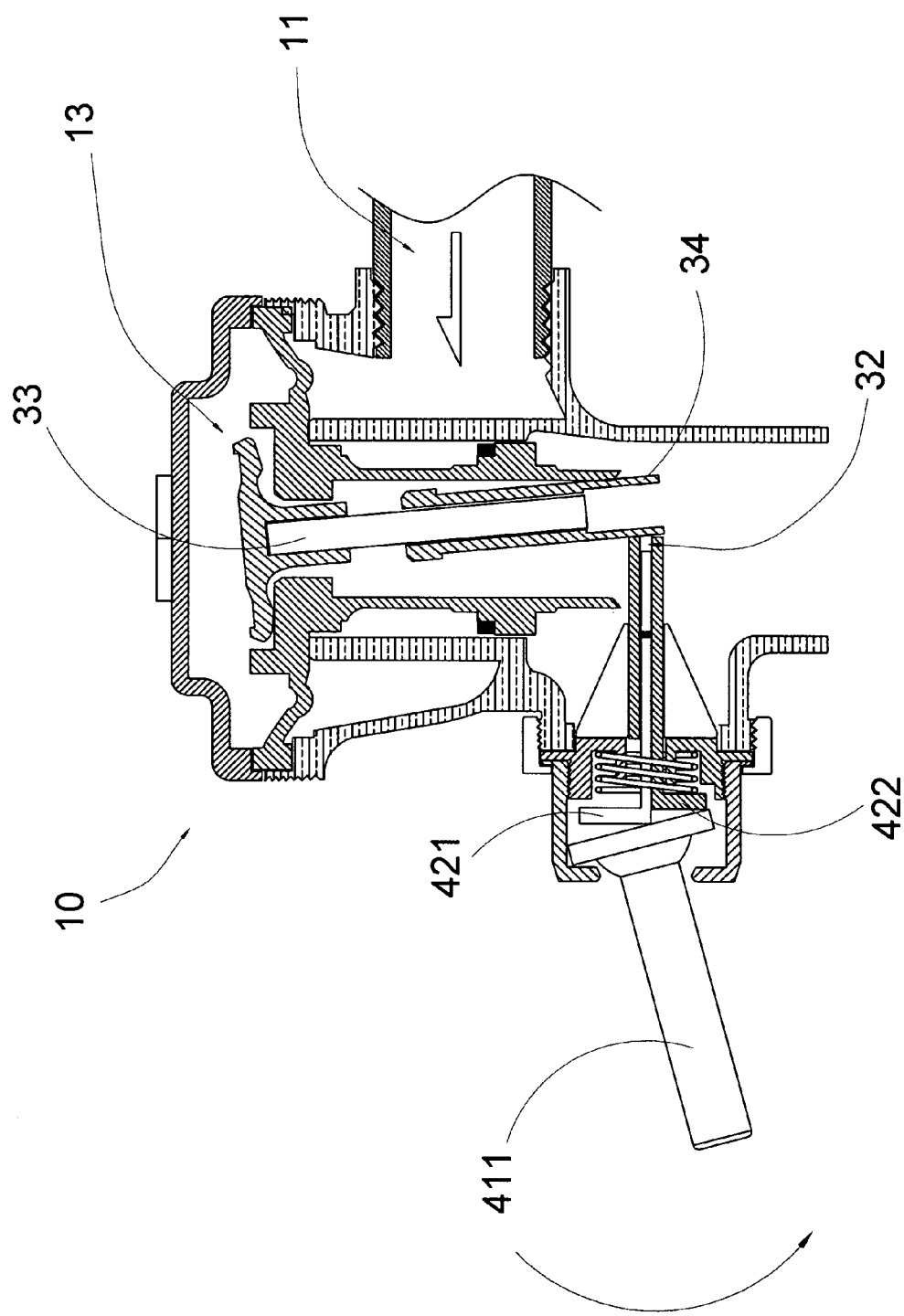
FIGS. 12A to 12C illustrate the actuator handle and its alternative modes mounted to the valve body for high volume flush operation according to the above preferred embodiment of the present invention.
Figure 13A:
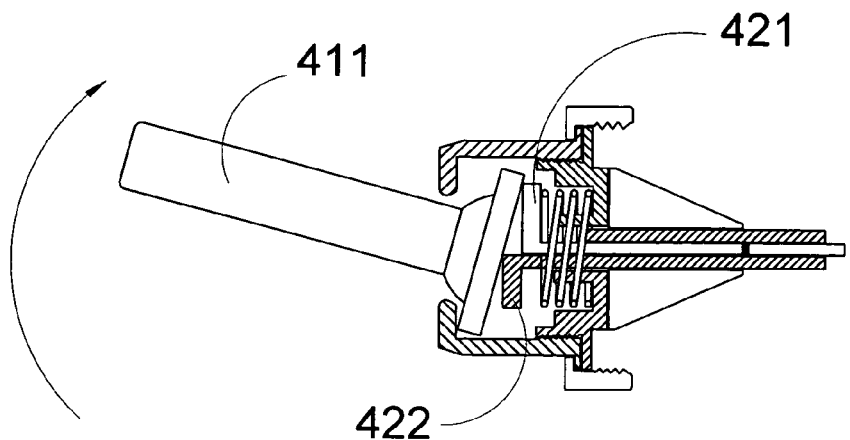
FIGS. 13A to 13C illustrate the actuator handle and its alternative modes being actuated for low volume flush operation according to the above preferred embodiment of the present invention.
Figure 14A:
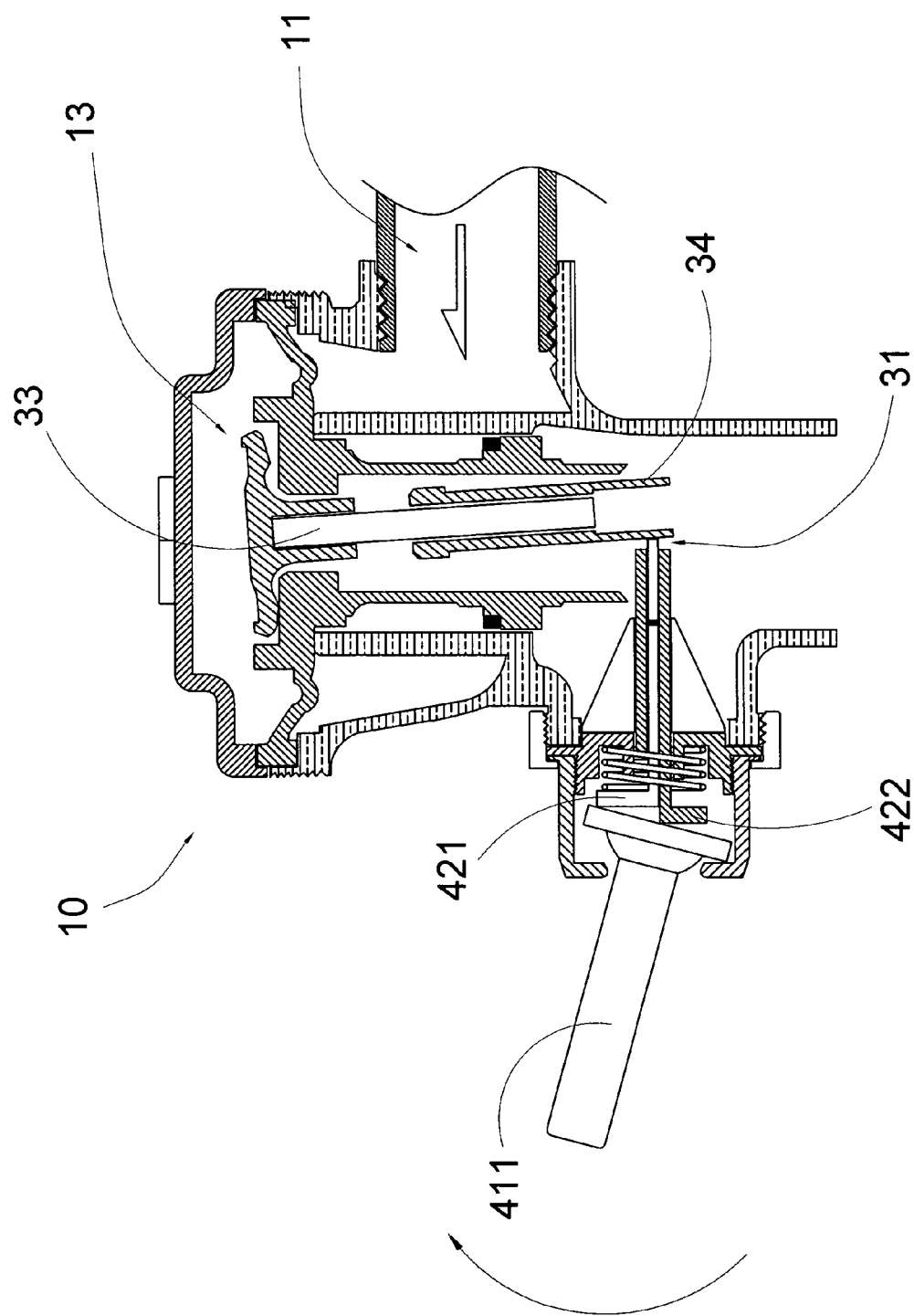
FIGS. 14A to 14C illustrate the actuator handle and its alternative modes mounted to the valve body for low volume flush operation according to the above preferred embodiment of the present invention.
Figure 16:
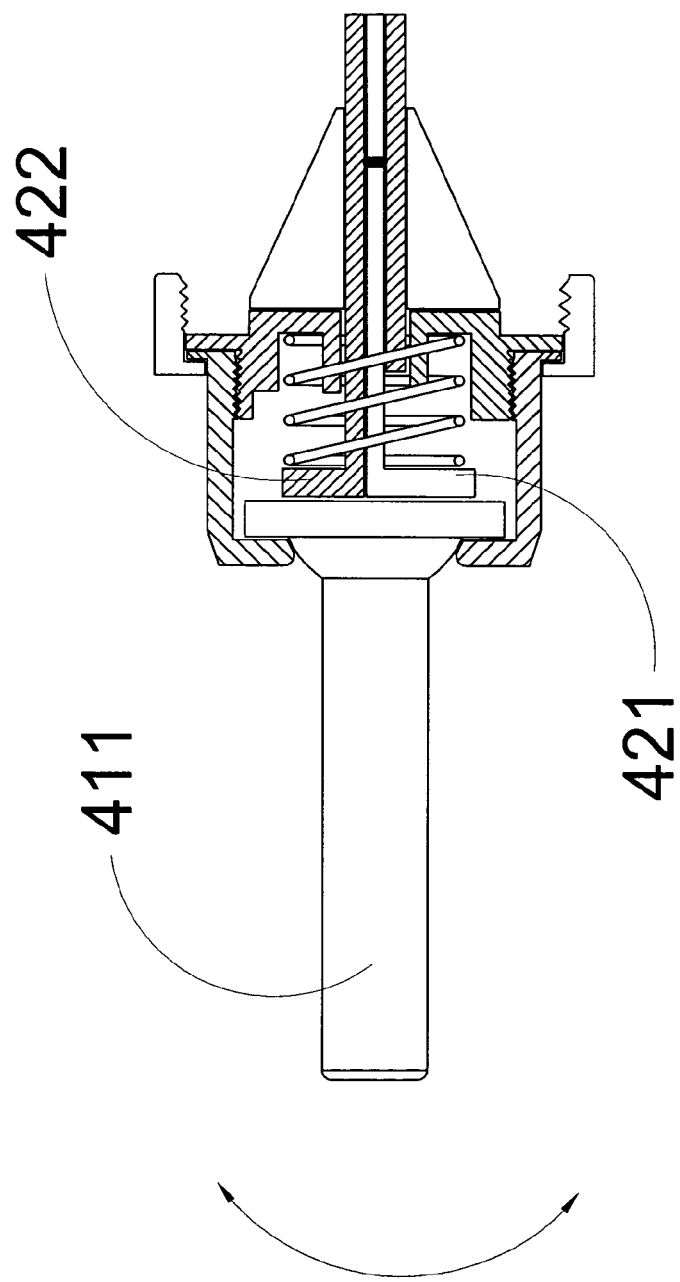
FIG. 16 illustrates the modification of the manual handle to change the actuation direction to its high and low volume actuating position.

As shown in FIGS. 9A, 10A, 11A, 12A, 13A, and 14A, the actuator handle 411 is the manual handle manually moved through an arc-path at its idle position to the high volume actuating position or the low volume actuating position. Accordingly, FIGS. 9A and 10A illustrate the manual handle at its idle position. FIGS. 11A and 12A illustrate the manual handle at its high volume actuating position. FIGS. 13A and 14A illustrate the manual handle at its low volume actuating position. It is appreciated that the actuator handle 411 can be pivotally moved downward to its high volume actuating position as shown in FIGS. 11A and 12A. Likewise, it is appreciated that the actuator handle 411 can be pivotally moved upward to its low volume actuating position as shown in FIGS. 13A and 14A. The modification of the manual handle is obvious to change the actuation direction to its high and low volume actuating position, as shown in FIG. 16. In other words, by self-rotating the flush water control arrangement 40 at 180° with respect to the valve body 10, the actuator handle 411 can be pivotally moved upward to its high volume actuating position while the actuator handle 411 can be pivotally moved downward to its low volume actuating position.

It is worth to mention that the low volume pusher member 421 and the high volume pusher member 422 are individually moved by the actuator handle 411. In other words, the high volume flushing operation is completed when only the high volume pusher member 422 is driven to move while the low volume flushing operation is completed when only the low volume pusher member 421 is driven to move.

Figure 11B:
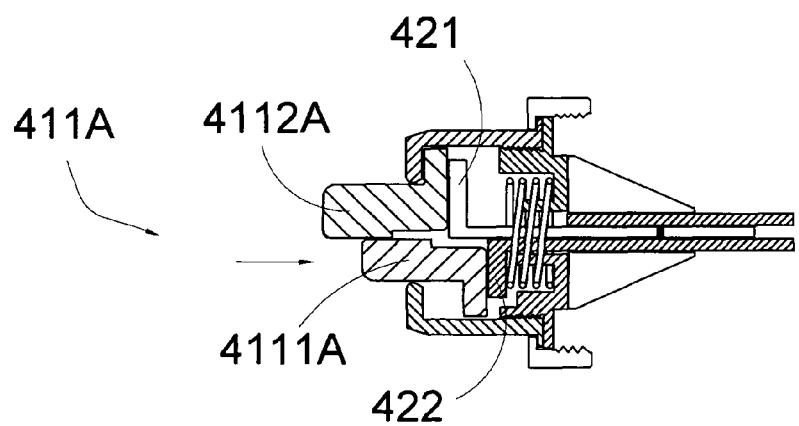
Figure 12B:
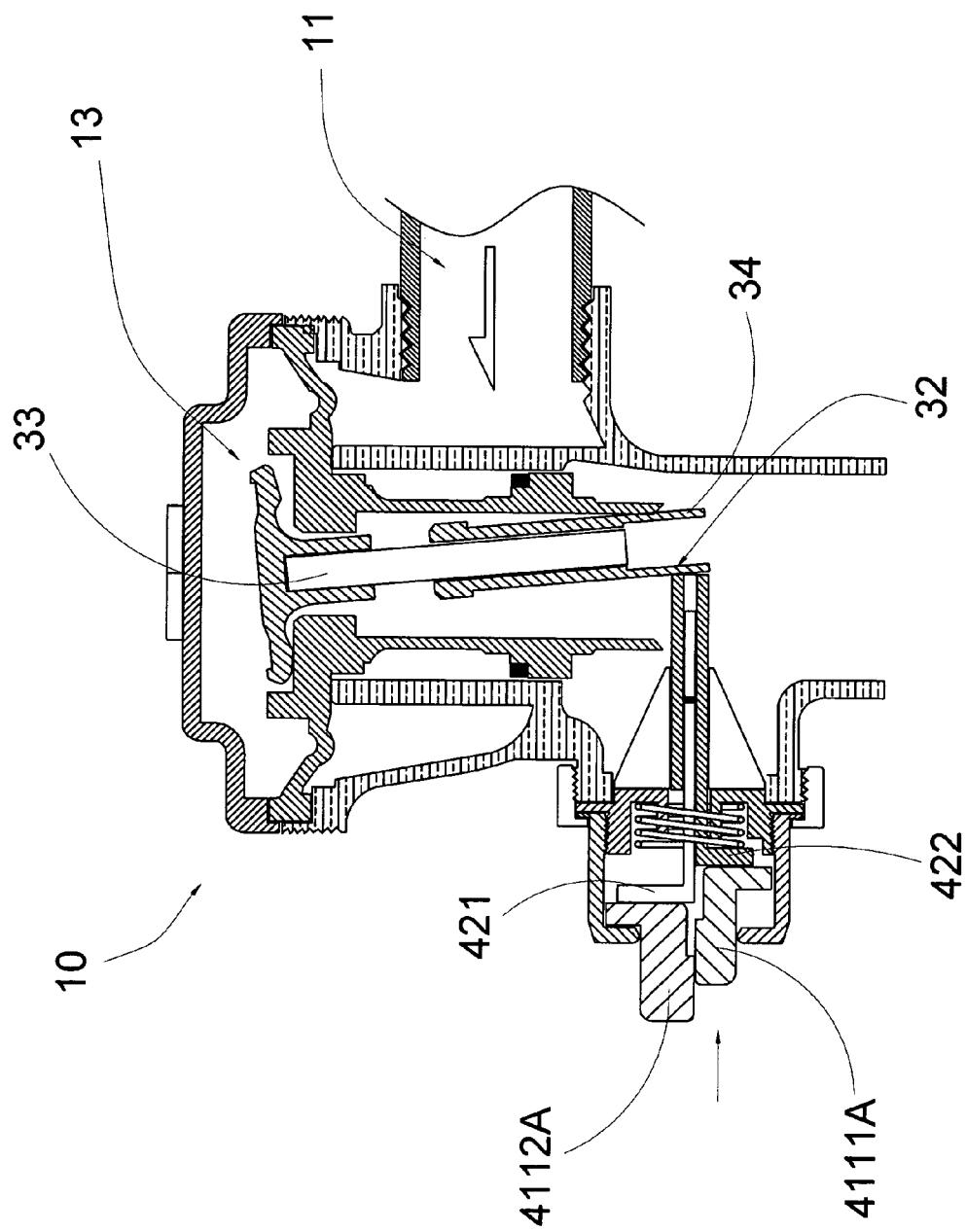
Figure 13B:
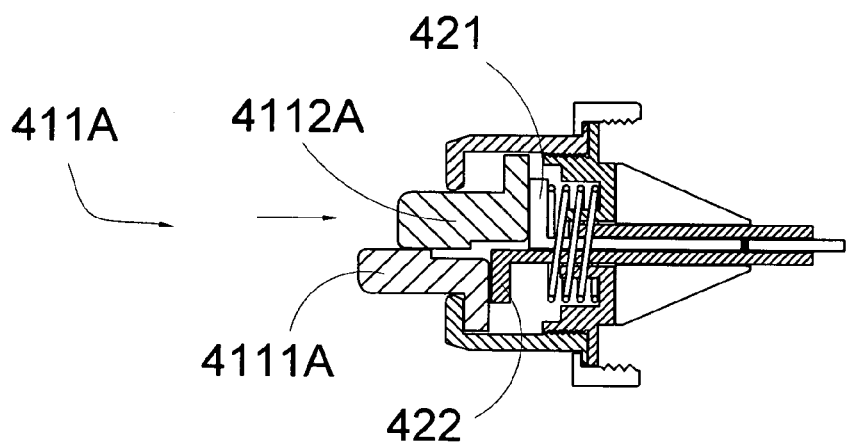
Figure 14B:
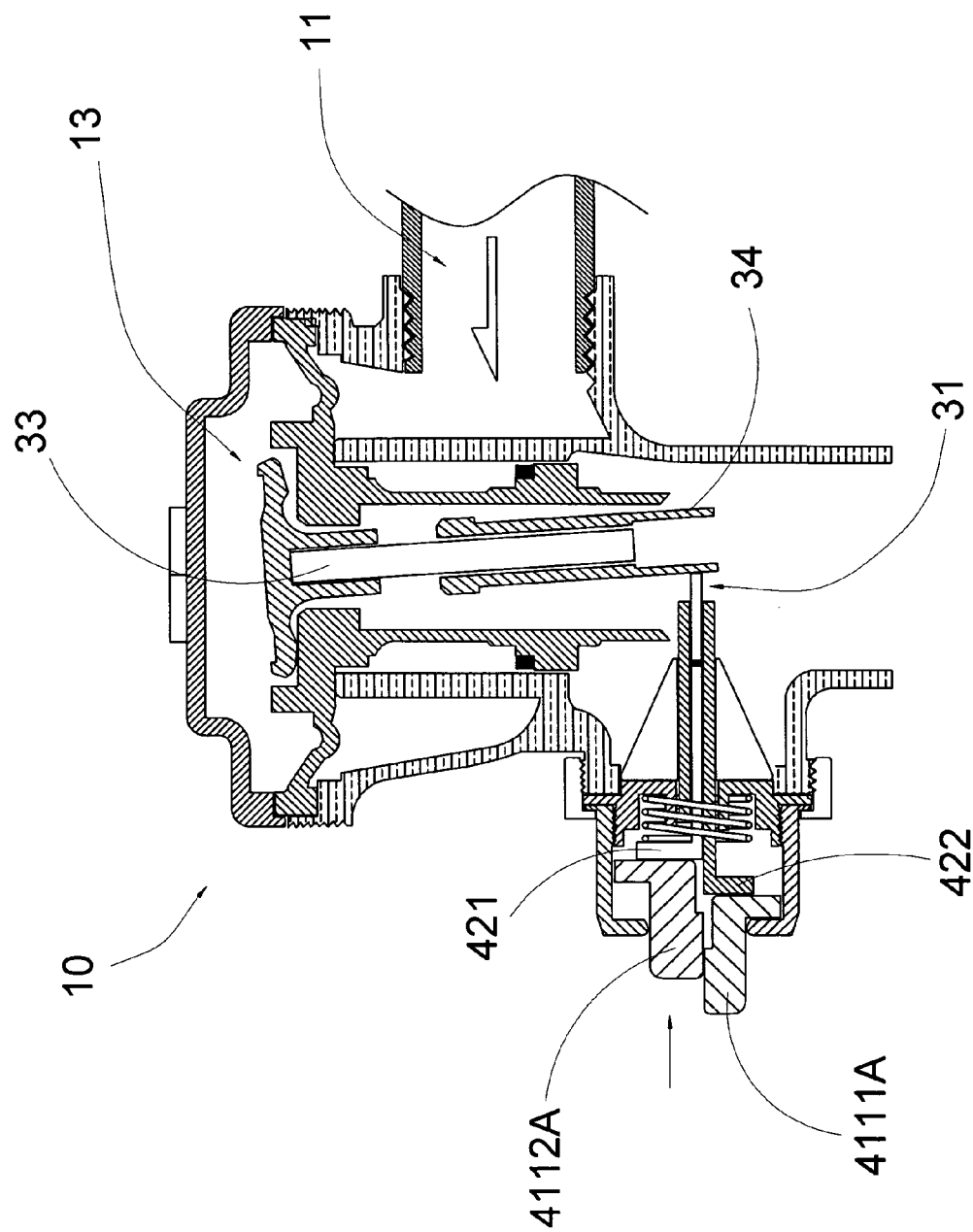

FIGS. 9B, 10B, 11B, 12B, 13B, and 14B illustrate a first alternative mode of the actuator handle 411A, wherein the actuator handle 411A comprises a lower button 4111A and an upper button 4112A. Accordingly, the lower and upper buttons 4111A, 4112A are two half-buttons. The lower button 4111A is manually pressed to drive the high volume pusher member 422 towards the higher pushing position 32 of the flushing shaft 30, as shown in FIGS. 11B and 12B. The upper button 4112A is manually pressed to drive the low volume pusher member 421 towards the lower pushing position 31 of the flushing shaft 30, as shown in FIGS. 13B and 14B. Therefore, instead of pivotally moving the manual handle up and down, the user is able to selectively press one of the lower and upper buttons 4111A, 4112A to select the high and low volume flushing operations.

FIGS. 9C, 10C, 11C, 12C, 13C, and 14C illustrate a second alternative mode of the actuator handle 411B, wherein the actuator handle 411B comprises an outer button 4111B and an inner button 4112B. Accordingly, the outer button 4111B has a hollow shape for the inner button 4112B slidably disposed therein, wherein the user is able to selectively press one of the outer and inner buttons 4111B, 4112B for completing the flushing operation. A compression spring 4113B is disposed in the outer button 4111B for applying an urging force between the outer and inner buttons 4111B, 4112B.

Figure 11C:
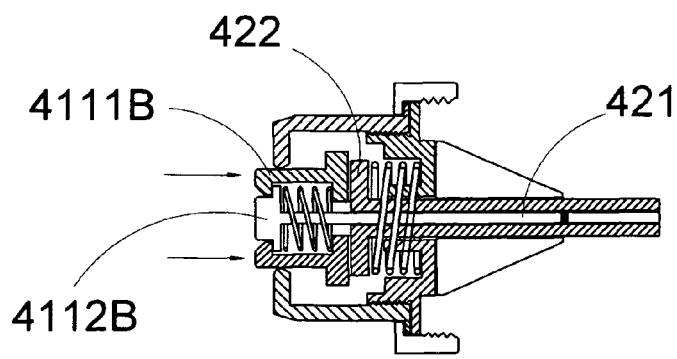
Figure 12C:
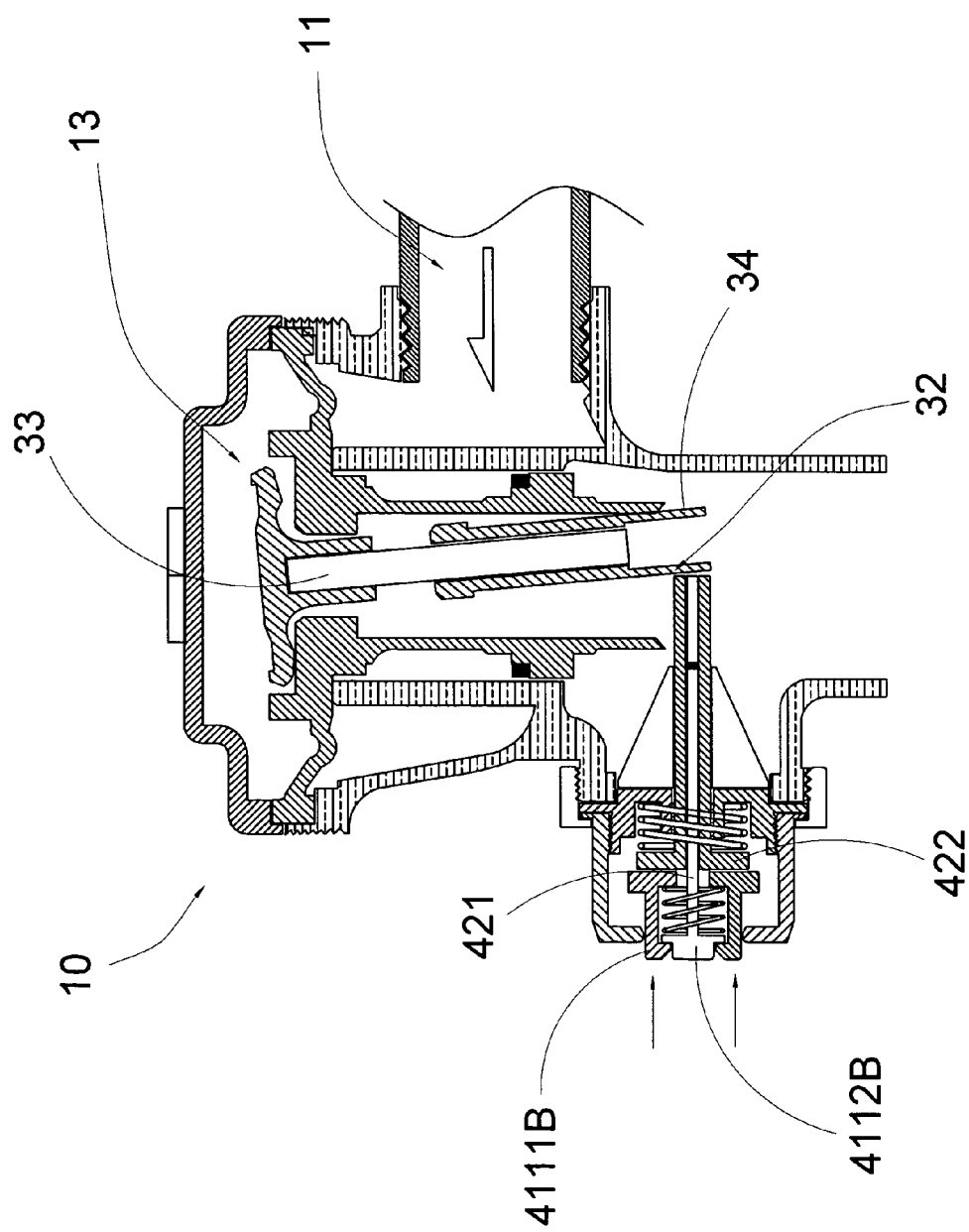
Figure 13C:
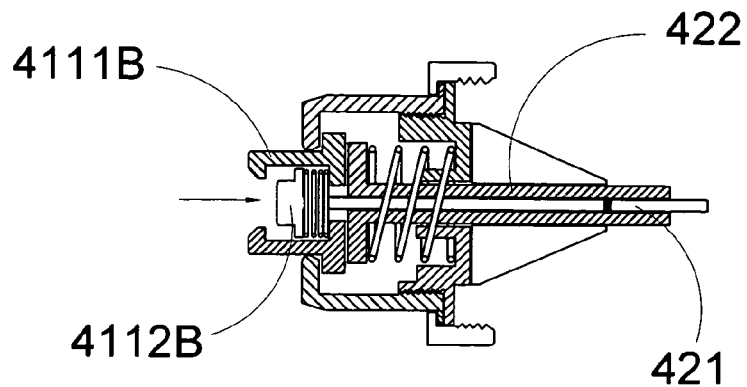
Figure 14C:
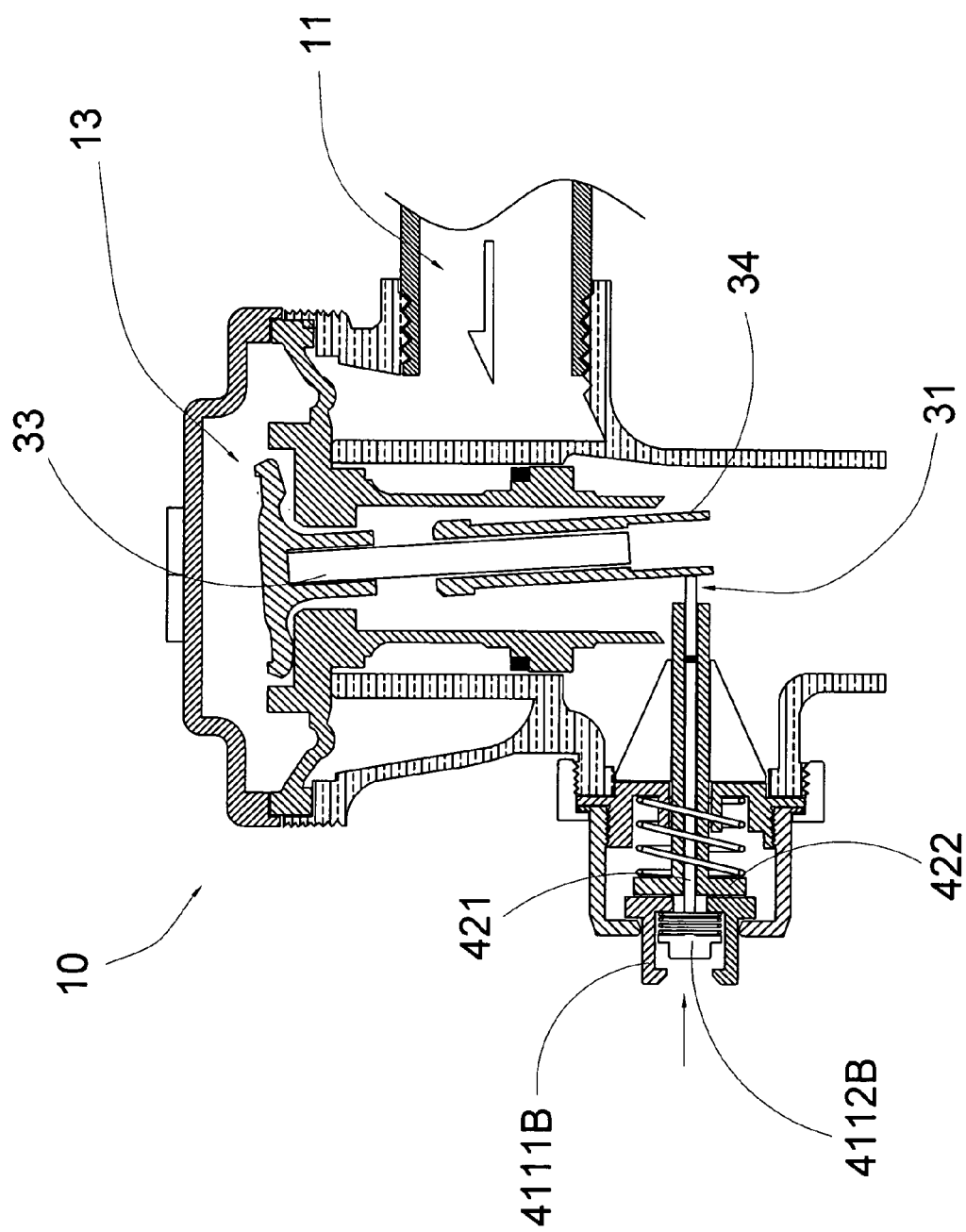

In particularly, the outer button 4111B is manually pressed to drive the high volume pusher member 422 towards the higher pushing position 32 of the flushing shaft 30, as shown in FIGS. 11C and 12C. The inner button 4112B is manually pressed to drive the low volume pusher member 421 towards the lower pushing position 31 of the flushing shaft 30, as shown in FIGS. 13C and 14C. In addition, the inner button 4112B can be integrated with the low volume pusher member 421. It is worth to mention that when the outer button 4111B is pressed, the inner button 4112B is also driven to be pressed at the same time such that the low and high volume pusher members 421, 422 are driven to move at the same time. However, the high volume flushing operation is completed when both the low and high volume pusher members 421, 422 are driven to move at the same time.

Figure 15:
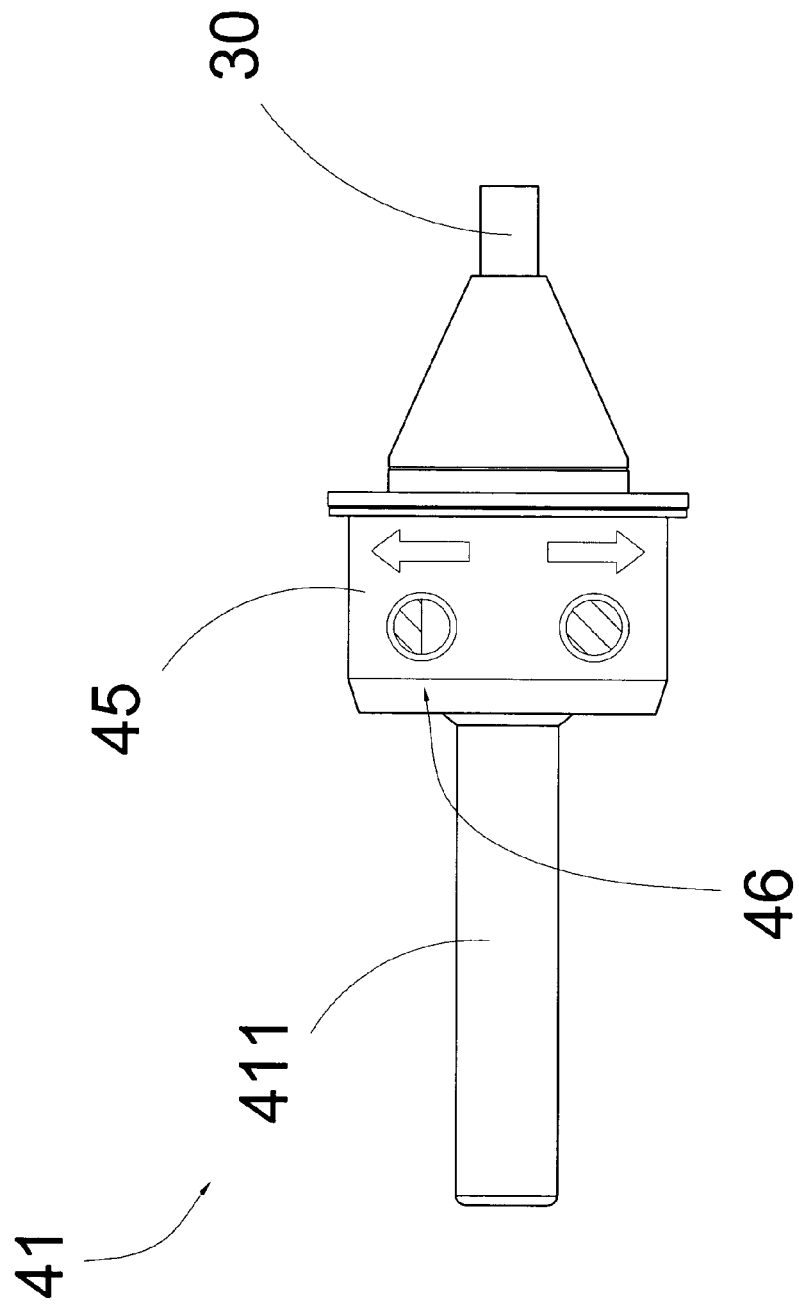
FIG. 15 illustrates a flush indicator of the flush water control arrangement according to the above preferred embodiment of the present invention.

As shown in FIGS. 1 and 15, the flush water control arrangement 40 further comprises a locking ring 45 detachably locking the flush actuator 41 at the opening of the valve body 10 in a movable manner, and a flush indicator 46 provided on the locking ring 45 to indicate the direction of the flush actuator 41 between the high volume actuating position and the low volume actuating position. As shown in FIG. 15, when the actuator handle 411 of the flush actuator 41 is remained at a horizontal orientation, the valve seat 20 is remained at the idle position. The flush indicator 46 contains a low flush indication and a high flush indication located below the low flush indication. Therefore, when the actuator handle 411 of the flush actuator 41 is moved upwardly towards the low flush indication, the flushing operation with low volume of water is completed. When the actuator handle 411 of the flush actuator 41 is moved downwardly towards the high flush indication, the flushing operation with high volume of water is completed.

According to the preferred embodiment of the present invention, the present invention also provides a method of actuating a flush system. The flush system comprises a valve body 10, a valve seat 20 and a flushing shaft 30 extended from the valve seat 20, wherein the method comprises the steps of:

(a) providing a flush actuator 41 comprising an actuator handle 411 movably extended from the valve body 10 for being actuated to activate the flushing operation, wherein the flush actuator 41 is adapted to move between a high volume actuating position and a low volume actuating position;

(b) providing a water control pusher 42 comprising a low volume pusher member 421 and a high volume pusher member 422 spacedly supported and extended from the flush actuator 41; and (c) actuating the flushing actuator 41 in such a manner that when the flush actuator 41 is moved to the high volume actuating position, the high volume pusher member 422 is driven to move by the flush actuator 41 to pivotally move the flushing shaft 30 at the higher pushing position 32 for allowing a high volume of water flowing through the valve seat 20, wherein when the flush actuator 41 is moved to the low volume actuating position, the low volume pusher member 421 is driven to move by the flush actuator 41 to pivotally move the flushing shaft 30 at the lower pushing position 31 for allowing a low volume of water flowing through the valve seat 20, so that a user is able to control a flush volume of the water by actuating the flush actuator 41 between the high volume actuating position and the low volume actuating position.

Figure 17:
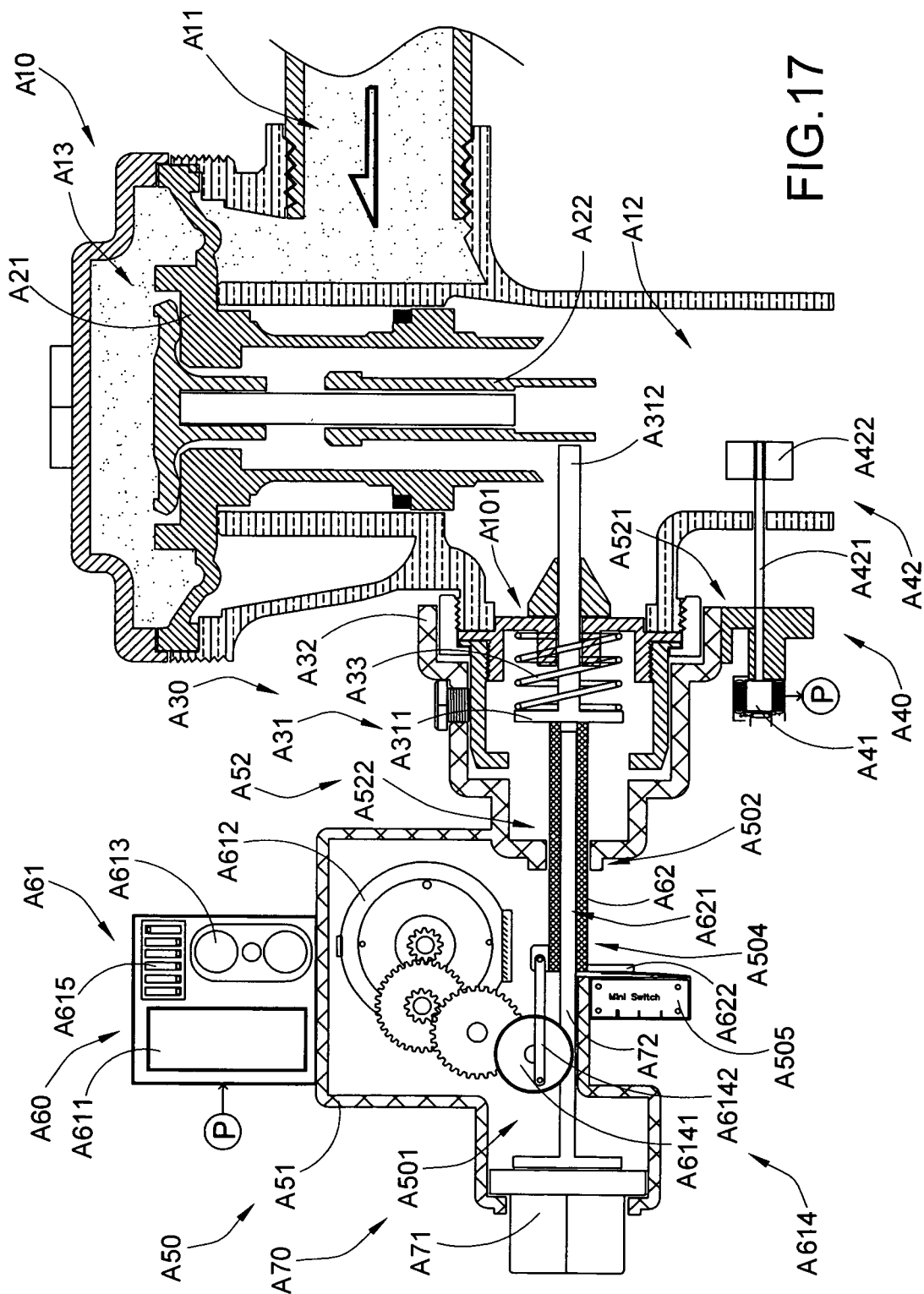
FIG. 17 is a sectional view of a flush apparatus with a driving mechanism according to a second preferred embodiment of the present invention.
Figure 18:
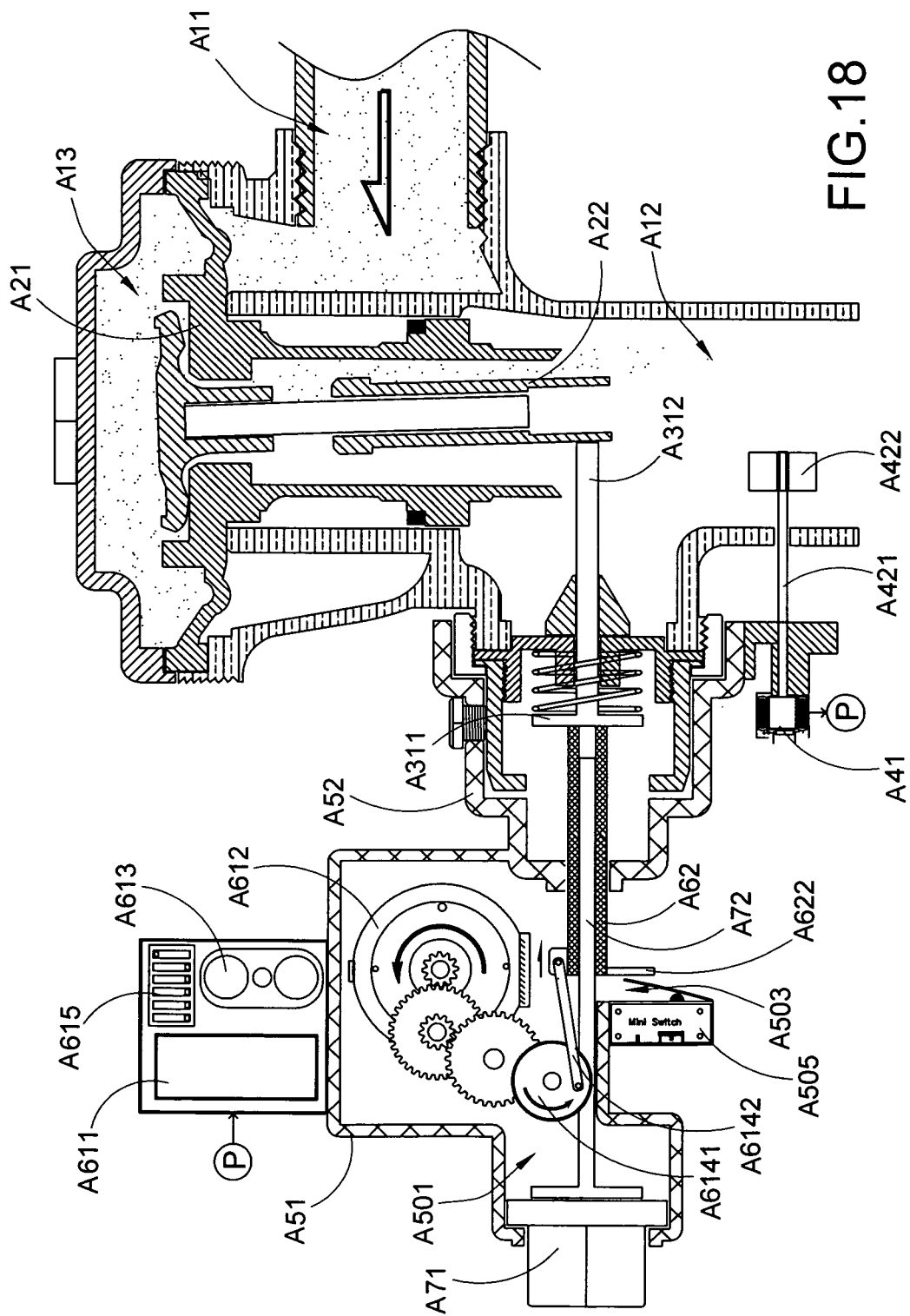
FIG. 18 is a sectional view of the flush apparatus according to the above second preferred embodiment of the present invention, illustrating the automatic plunger arm being actuated.
Figure 19:
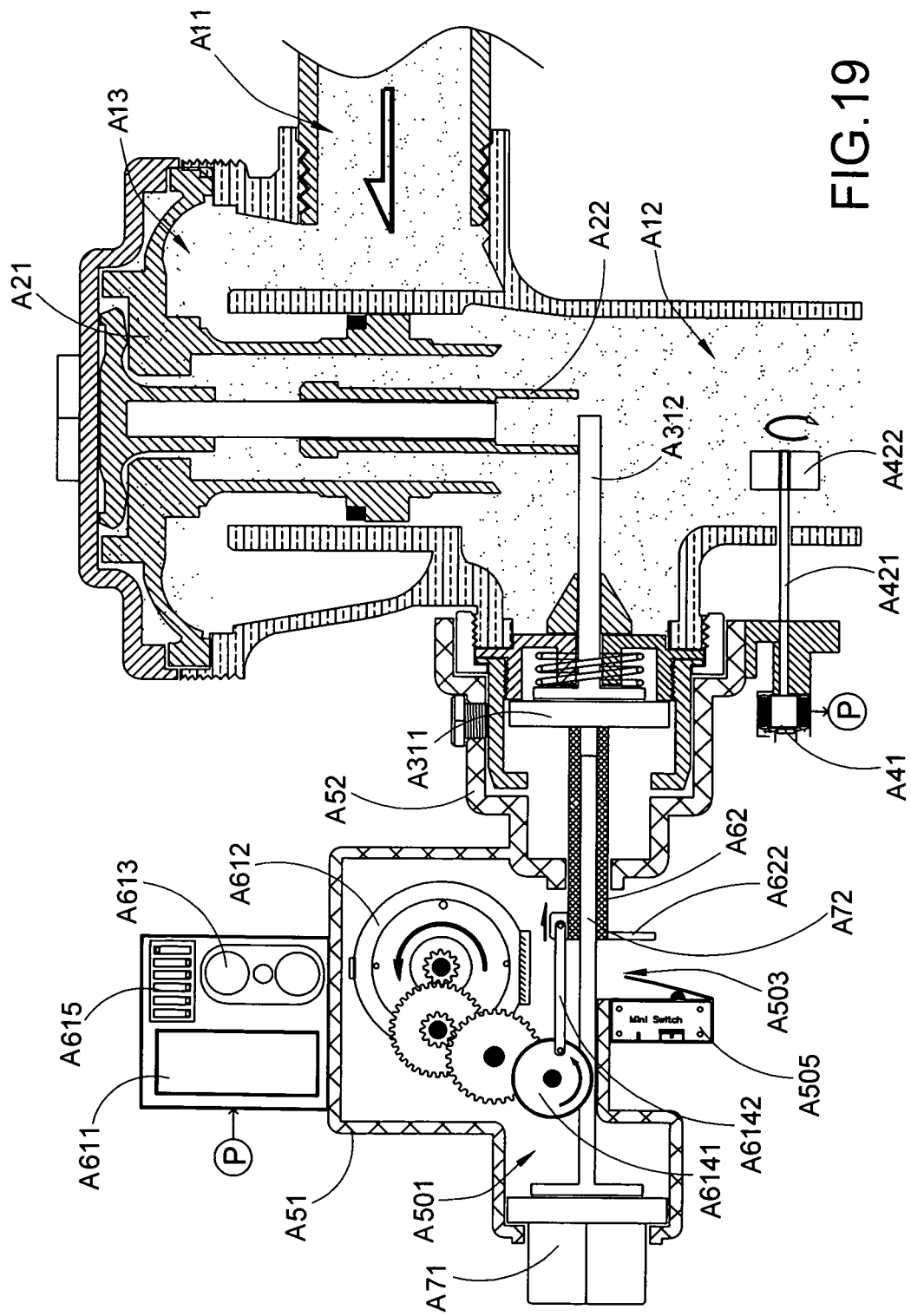
FIG. 19 is a sectional view of the flush apparatus according to the above second preferred embodiment of the present invention, illustrating the diaphragm member returning back to the sealed position.

Referring to FIGS. 17 to 19 of the drawings, a flush apparatus according to a second preferred embodiment of the present invention is illustrated, wherein the flush apparatus, such as a conventional manual flush apparatus for a sanitary system, comprises a valve body A10, a water valve A20 and an operation device A30.

The valve body A10 has a water inlet A11 communicatively linked to a water source, a water outlet A12, and a water chamber A13 provided between the water inlet A11 and the water outlet A13.

The water valve A20 comprises a diaphragm member A21 sealing at the water chamber A13 between the water inlet A11 and the water outlet A12, and a diaphragm shaft A22 extended from the diaphragm member A21 to move the diaphragm member A21 between a sealed position and an unsealed position. Accordingly, at the sealed position, the diaphragm member A21 is sealed at the water chamber A13 via the water pressure inside the valve body A10 to block the water flowing from the water inlet A11 to the water outlet A12. At the unsealed position, the diaphragm member A21 is moved by the diaphragm shaft A22 to allow the water passing from the water inlet A11 to the water outlet A12, thereby flushing the sanitary system.

The operation device A30 comprises a driving unit A31 and a retention ring A32 coupled with the valve body A10 at an operation opening A101 thereof, wherein the driving unit A31 comprises a pushing platform A311 movably disposed in the retention ring A32 and a plunger pin A312 extended from the pushing platform A311 towards the diaphragm shaft A22. Therefore, when the pushing platform A311 is pushed towards the diaphragm shaft A22, the plunger pin A312 is driven to hit a bottom portion of the diaphragm shaft A22 so as to move the diaphragm member A21 from the sealed position to the unsealed position. The operation device A30 further comprises a spring A33 supported in the retention ring A32 for applying an urging force against the pushing platform A311 to push the plunger pin A312 back to its original position after the plunger pin A312 is laterally moved towards the diaphragm shaft A22. It is worth to mention that the pushing platform A311 will only be slid within the retention ring A32 and will be blocked at the surrounding edge of the operation opening A101 of the valve body A10 to prevent the further forward sliding movement of the pushing platform A311. In other words, the pushing platform A311 will not be slid into the valve body A10 through the operation opening A101.

It is worth to mention that when the operation device A30 incorporates with a manual handle as the conventional manual flush apparatus, the manual handle is actuated to push the pushing platform A311 at a pushing surface thereof towards diaphragm shaft A22 so as to move the diaphragm member A21 from the sealed position to the unsealed position.

According to the preferred embodiment, the flush apparatus further comprises a driving mechanism incorporating with the operation device A30, wherein the driving mechanism comprises an actuation housing A50 and an automated actuation unit A60.

The actuation housing A50, having an actuation channel A501, is coupling with the valve body A10. Accordingly, the actuation housing A50 is mounted at the valve body A10 through the retention ring A32 such that the actuation housing A50 is positioned adjacent to the valve body A10. As shown in FIG. 17, the actuation housing A50 comprises a housing body A51 defining the actuation channel A501 at a bottom portion thereof and a tubular mounting ring A52 encirclingly mounting at the retention ring A32 to align the actuation channel A501 with the pushing platform A311.

The automated actuation unit A60 is received in the housing body A51 at a position above the actuation channel A501, wherein the automated actuation unit A60 comprises a motorized unit A61 received in the housing body A51 of the actuation housing A50 and an automated plunger arm A62 transversely extended along the actuation channel A501. Accordingly, the motorized unit A61 is received in the housing body A51 at a position above the actuation channel A501. When the motorized unit A61 is activated in responsive to a presence of a user, the automated plunger arm A62 is driven by the motorized unit A61 to move towards the pushing platform A311, such that the pushing platform A311 is pushed by the automated plunger arm A62 to move the diaphragm member A21 at the unsealed position, as shown in FIG. 18. Accordingly, the diaphragm member A21 is then moved back to its sealed position as shown in FIG. 19.

As shown in FIG. 17, the motorized unit A61 comprises a power source A611, a servo unit A612 electrically coupled with the power source A611, a sensor A613 controllably activating the servo unit A612 in responsive to a presence of the user, and a gear transmission unit A614 coupling the servo unit A612 with the automated plunger arm A62 to transmit a servo power from the servo unit A612 to a transverse force at the automated plunger arm A62 so as to drive the automated plunger arm A62 towards the pushing platform A311.

According to the preferred embodiment, the power source A611 is a rechargeable battery supported in the housing body A51. Alternatively, the power source A611 can be a power outlet electrically linking with an external AC power supply or a solar energy collector for converting solar energy into electrical energy to supply the power to the servo unit A612.

The servo unit A612, according to the preferred embodiment, comprises an electric motor electrically connected to the power source A611, wherein the servo unit A612 is actuated to drive the automated plunger arm A62 to move laterally. It is worth to mention that the electric motor is more reliable than the solenoid because the electric motor provides simple mechanical work rather than using the magnetic force, so as to minimize the failure operation of the servo unit A612 and to reduce the maintenance cost of the present invention. In addition, the size of the electric motor is so small in comparison with the solenoid so as to reduce the overall size of the actuation housing A40 to house the automated actuation unit A60 of the present invention. Therefore, the electric motor is preferred to be used to not only ensure the reliable of the automated actuation unit A60 but also enhance the smooth operation thereof.

The sensor A613, such as an infrared sensor, is arranged to detect the presence of the user by means of infrared signal in such a manner that when the sensor A613 transmits an infrared signal for detecting the presence of the user of the sanitary system, the sensor A613 activates the servo unit A612 to actuate the automated plunger arm A62 to push the pushing platform A311 forward so as to move the diaphragm member A21 at the unsealed position. Accordingly, the housing body A51 has a transparent window aligned with the sensor A613 for allowing the infrared signal sending out through the transparent window. It is worth to mention that the sensor A613 activates the servo unit A612 to stop the automated plunger arm A62 once the operation of the flush apparatus is completed.

Accordingly, a CPU A615 is operatively connected to the sensor A613 to receive the signal therefrom, wherein the servo unit A612 is controlled by the CPU A615 such that once the CPU A615 receives the signal from the sensor A613, the CPU A615 will activate the servo unit A612 to drive the automatic plunger arm A62 for completing the automatic operation. It is worth to mention that the CPU A615 can be programmed to the time period of the presence of the user via the sensor A613 and to control the flush volume of the water via the automated actuation unit A60 by means of the time period of the opening of the diaphragm member A21 at the unsealed position.

The gear transmission unit A614 comprises a gear set A6141 coupling with an output of the servo unit A612 and a driving arm A6142 having one end rotatably coupling with the gear set A6141 and an opposed end pivotally coupling with the automated plunger arm A62 in such a manner that when the servo unit A612 is activated, the automated plunger arm A62 is driven to laterally move in a reciprocating manner.

As shown in FIGS. 18 and 19, the corresponding end of the driving arm A6142 is rotatably coupled with one gear of the gear set A6141, wherein when the corresponding gear is rotated, the automated plunger arm A62 is driven to laterally move in a reciprocating manner. Accordingly, when the corresponding gear is rotated in a half revolution, the automated plunger arm A62 is laterally moved forward to push the pushing platform A311 at a position that the diaphragm member A21 is moved at the unsealed position. When the corresponding gear is rotated in one full revolution, the automated plunger arm A62 is laterally moved backward at a position that the diaphragm member A21 is moved back to the sealed position. Therefore, the automated plunger arm A62 is driven to laterally move in a reciprocating manner via the rotation of the gear set A6141. It is worth to mention that the time of the automated plunger arm A62 traveling back and forth can be controlled by the rotational speed of the gear set A6141. In addition, the automated plunger arm A62 is laterally pulled back by the driving arm A6142 after the pushing platform A311 is pushed forward so as to ensure the automated plunger arm A62 returning back to its original position once the flush operation is completed.

As shown in FIG. 17, the driving mechanism further comprises a manual actuation unit A70 which is received in the housing body A51 of the actuation housing A50. The manual actuation unit A70 comprises a push button A71 movably mounted at the housing body A51 of the actuation housing A50 and a manual plunger arm A72 transversely extended along the actuation channel A501 from the push button A71 towards the pushing platform A311. When the push button A71 is manually pressed, the pushing platform A311 is pushed by the manual plunger arm A72 to move the diaphragm member A21 at the unsealed position.

According to the preferred embodiment, the actuation housing A50 has a button slot provided at a sidewall thereof for the push button A71 slidably mounted at the button slot. The push button A71 is aligned with the pushing platform A311 through the actuation channel A501 such that when the push button A71 is manually pressed, the pushing platform A311 is directly pushed in a lateral direction through the manual plunger arm A72.

As shown in FIG. 17, the manual plunger arm A72 has an enlarged pressing end extended to bias against the push button A71 and an opposed pusher end extended towards the pushing platform A311 through the actuation channel A501 in such a manner that when the push button A71 is manually pressed, the manual plunger arm A72 is directly pushed towards the pushing platform A311.

In order to correspondingly guide the lateral movement between the automated plunger arm A62 and the manual plunger arm A72, the automated plunger arm A62 has a hollow structure defining a sliding channel A621 that the manual plunger arm A72 is slidably extended through the sliding channel A621. Therefore, at the manual flush operation, the automated plunger arm A62 will guide the sliding movement of the manual plunger arm A72 when the automated plunger arm A62 is stationary. Likewise, at the automated flush operation, the manual plunger arm A72 will guide the sliding movement of the automated plunger arm A62 when the manual plunger arm A72 is stationary.

Figure 23:
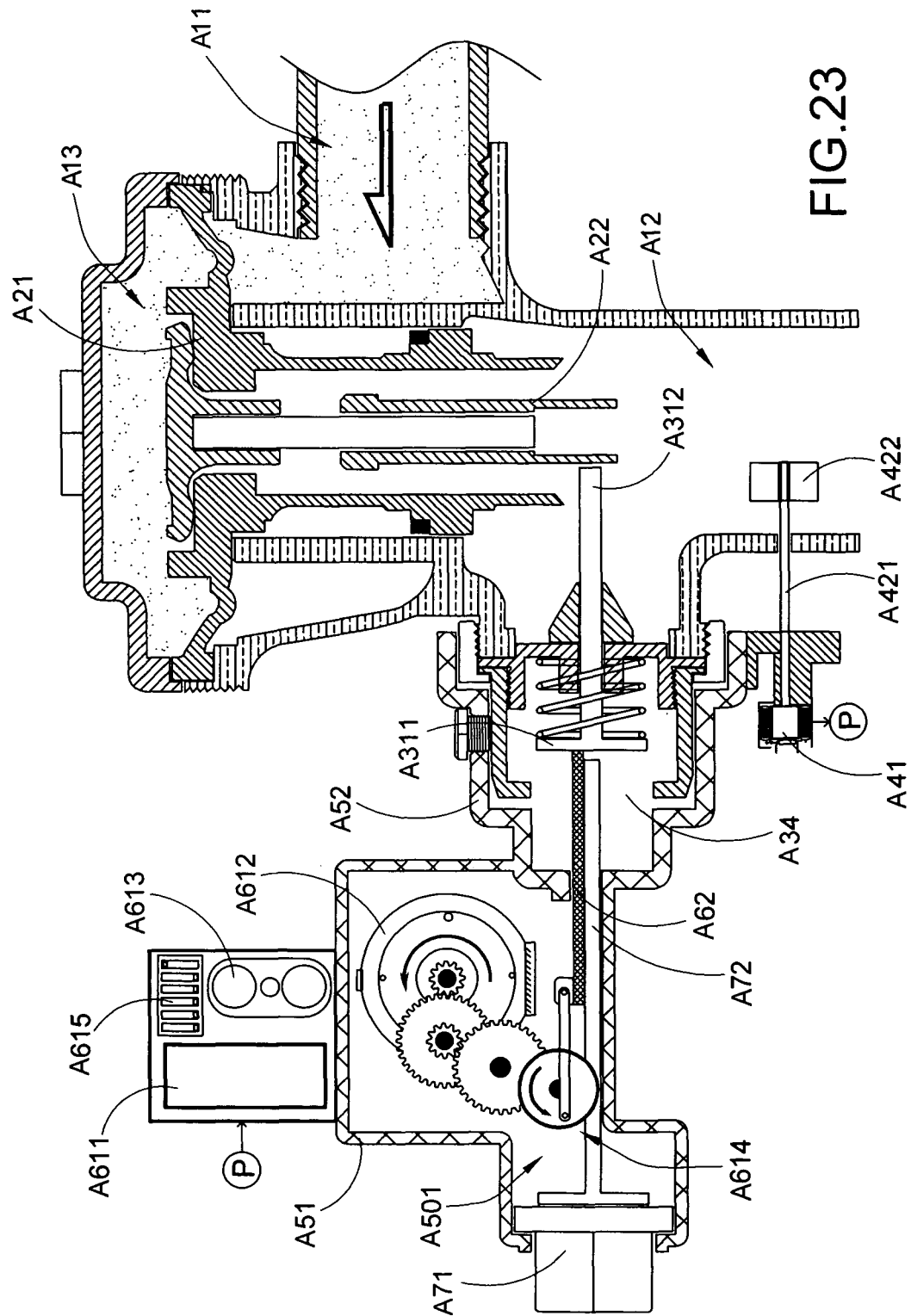
FIG. 23 illustrates an alternative mode of the driving mechanism, illustrating the automatic plunger arm and the manual plunger arm being extended side-by-side.

As shown in FIG. 23, the automated plunger arm A62 and the manual plunger arm A72 can be two individual pins extending side by side to push the pushing platform A311. However, two guiders should be included to guide the sliding movement of each of the automated plunger arm A62 and the manual plunger arm A72.

As shown in FIGS. 17 to 19, the automated plunger arm A62 comprises a sliding stopper A622 protruded outwardly, wherein when the automated plunger arm A62 is laterally moved forward, the sliding stopper A622 is blocked by a first stopper A502 of the housing body A51 so as to stop the further forward movement of the automated plunger arm A62. When the automated plunger arm A62 is laterally moved backward, the sliding stopper A622 is blocked by a second stopper A503 of the housing body A51 so as to ensure the automated plunger arm A62 returning back to its original position. Accordingly, the housing body A51 has a guiding slot A504 provided at a bottom wall of the actuation channel A501, wherein the sliding stopper A622 is downwardly extended from the automated plunger arm A62 to slidably engage with the guiding slot A504. The two ends of the guiding slot A504 form the first and second stoppers A502, A503 respectively, such that the traveling distance of the automated plunger arm A62 is limited by the length of the guiding slot A502 between the two ends thereof.

Accordingly, a contact switch A505 is provided at the housing body A51 at the second stopper A503 and arranged in such a manner that when the sliding stopper A622 is slid along the guiding slot A504 at the second stopper A503, the sliding stopper A622 contacts with the contact switch A505 to generate a stopping signal so as to deactivate the servo unit A612.

As shown in FIG. 17, the mounting ring A52 has an enlarged mounting opening A521 encirclingly mounting at the retention ring A32 and an opposed guiding opening A522 aligning with the actuation channel A501. The automated plunger arm A62 is extended through the guiding opening A522 of the mounting ring A52 to push the pushing platform A311. As it is mentioned above, the manual plunger arm A72 is coaxially coupled with the automated plunger arm A62 such that the automated plunger arm A62 and the manual plunger arm A72 are slidably extended through the guiding opening A522 of the mounting ring A52. In other words, the guiding opening A522 of the mounting ring A52 not only provides a support for the automated plunger arm A62 and the manual plunger arm A72 within the actuation channel A501 but only ensures the correct alignment of the automated plunger arm A62 and the manual plunger arm A72 to push the pushing platform A311.

According to the preferred embodiment, the driving mechanism further comprises a power charging arrangement A40 for charging the power source A611 every time during the flush operation, including both automated flush operation and manual flush operation. The power charging arrangement A40 comprises an electrical generator A41 operatively linked to the power source A611 and a propeller unit A42 extended from the electrical generator A41 to the water outlet A12 of the valve body A10 in such a manner that when the propeller unit A42 is driven to rotate in responsive to a flush of water coming out at the water outlet A12, the electrical generator A41 is actuated to charge the power source A611.

The electrical generator A41, according to the preferred embodiment, is an alternator or a DC generator converting mechanical energy (rotational force) of the propeller unit A42 to the electrical energy. Accordingly, a rectifier can be used to convert AC current to DC current if the alternator is used.

As shown in FIG. 17, the propeller unit A42 comprises a propeller shaft A421 transversely extended with respect to the actuation channel A501 and a propeller blade A422 coupled at a free end of the propeller shaft A421 at the water outlet A12 such that the propeller blade A422 is driven to be rotated in responsive to a flush of water so as to transmit a rotational power to the electrical generator A41 through the propeller shaft A421.

Accordingly, during the flush operation, the diaphragm member A21 is moved at the unsealed position by the diaphragm shaft A22 to allow the water passing from the water inlet A11 to the water outlet A12, thereby flushing the sanitary system. When the water flushes out at the water outlet A12, the flush power of the water will drive the propeller blade A422 to rotate. In other words, the propeller blade A422 provides a torque to the propeller shaft A421 during the water flushing movement at the water outlet A12. The electrical generator A41, which is an induction device, comprises a coil body encircling with a magnet such that when the propeller unit A42 generates the rotational force, the electrical generator A41 will convert the rotational force into an electrical force for charging the power source A611.

The propeller unit A42 translates water flush energy to the rotational torque directly related to the total blade area, i.e. more blades equal more torque. Multiple propeller blades A422 contain a greater surface area on the propeller blades A422 allowing a small diameter propeller size to be effective.

As shown in FIG. 17, the propeller shaft A421 is extended parallel to each of the manual and automated plunger arms A62, A72. Accordingly, the power charging arrangement A40 can be an add-on device externally coupled with the valve body A10. It is worth to mention that the propeller shaft A421, which is made of rigid and durable material, has a relatively small size in diameter. Even though the propeller shaft A421 is extended from the housing body A51 to the water outlet A12 of the valve body A10, the flush operation of the flush apparatus will not be affected. It is appreciated that the power charging arrangement A40 can be an integrated device that the propeller unit A42 is extended through the actuation channel A501 to support the propeller blade A422 at the water outlet A12.

In order to mount the driving mechanism to the valve body A10 which is the conventional manual flush apparatus, the user is able to remove the manual handle from the retention ring A32 only. Then, by mounting the mounting opening A522 of the mounting ring A52 at the retention ring A32, the actuation housing A60 is supported adjacent to the valve body. The installation of the driving mechanism is completed. Therefore, the user is able to selectively operation the flush apparatus manually by pressing the push button A71 or automatically by detecting the presence of the user via the sensor A612. It is worth to mention that both manual and automated flush operation via the driving mechanism of the present invention act like the conventional manual flush operation by pushing the pushing platform A311 to move the diaphragm member A21 at the unsealed position through the diaphragm shaft A22. Therefore, the present invention provides an accurate, reliable, and simple manual/automated flush operation as the manual flush apparatus provides.

Figure 20:
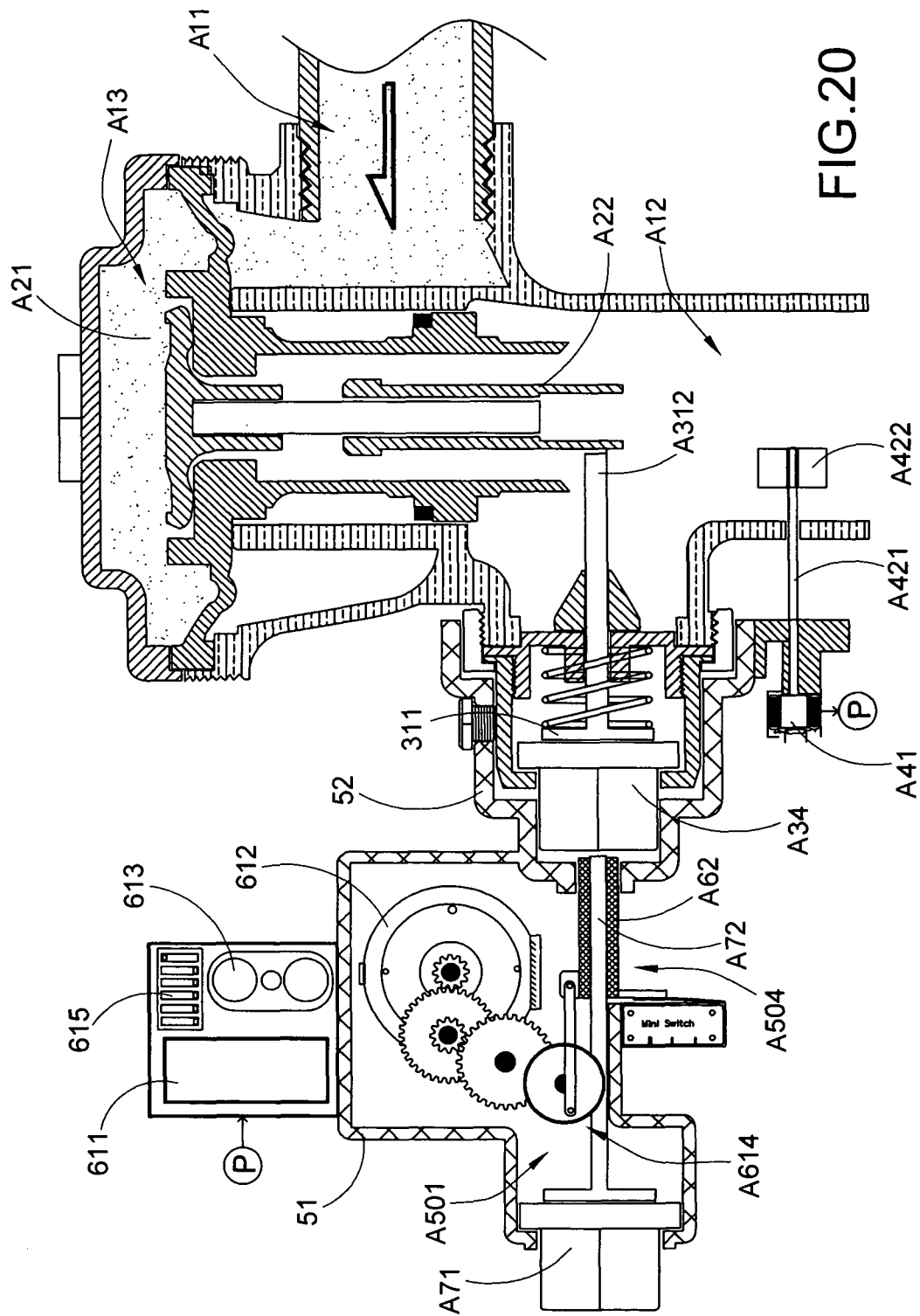
FIG. 20 illustrates the driving mechanism incorporating with an alternative mode of the button-type flush apparatus according to the above second preferred embodiment of the present invention.
Figure 21:
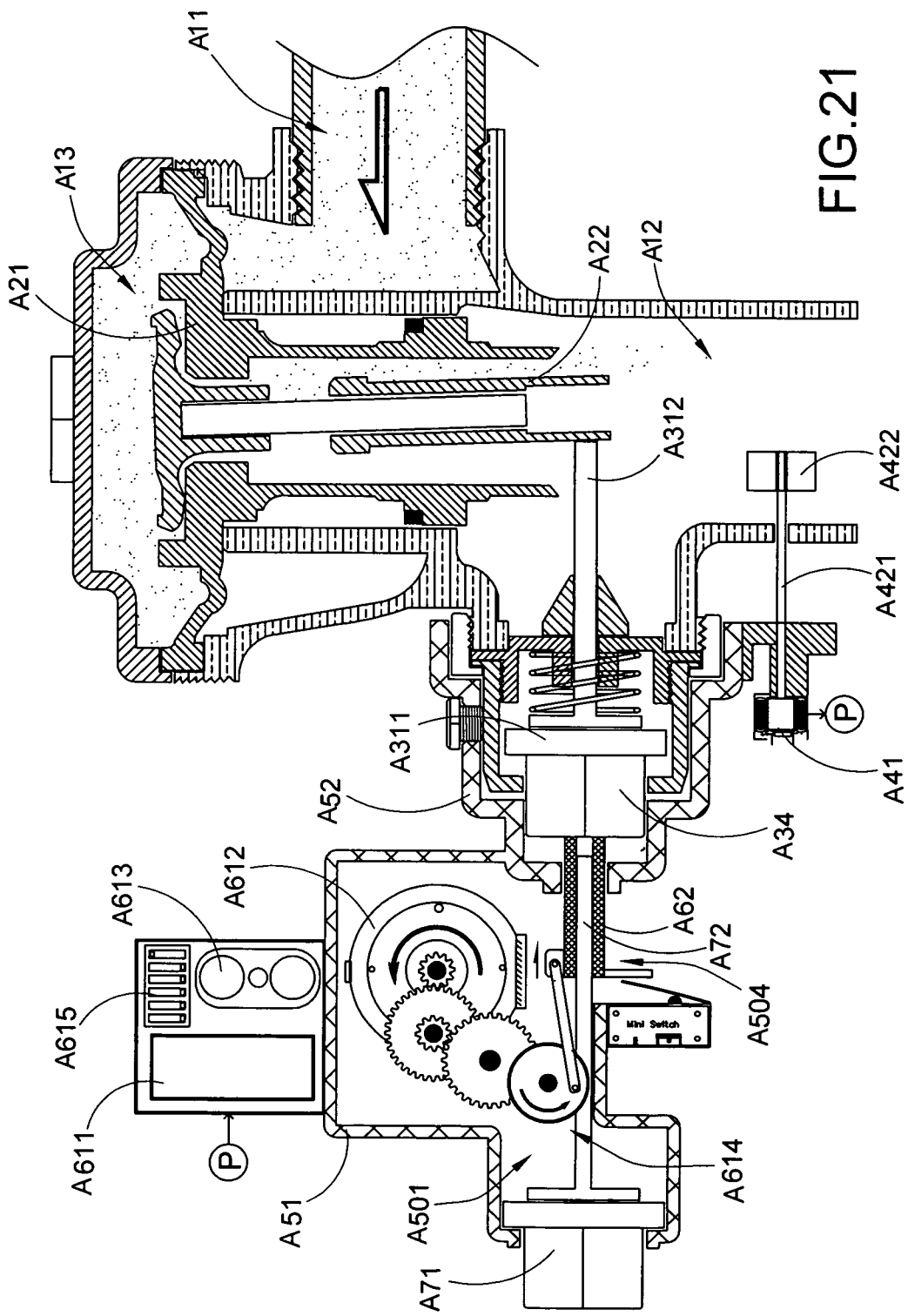
FIG. 21 illustrates the automatic plunger arm being actuated to move the diaphragm member of the alternative flush apparatus to its unsealed position according to the above second preferred embodiment of the present invention.
Figure 22:
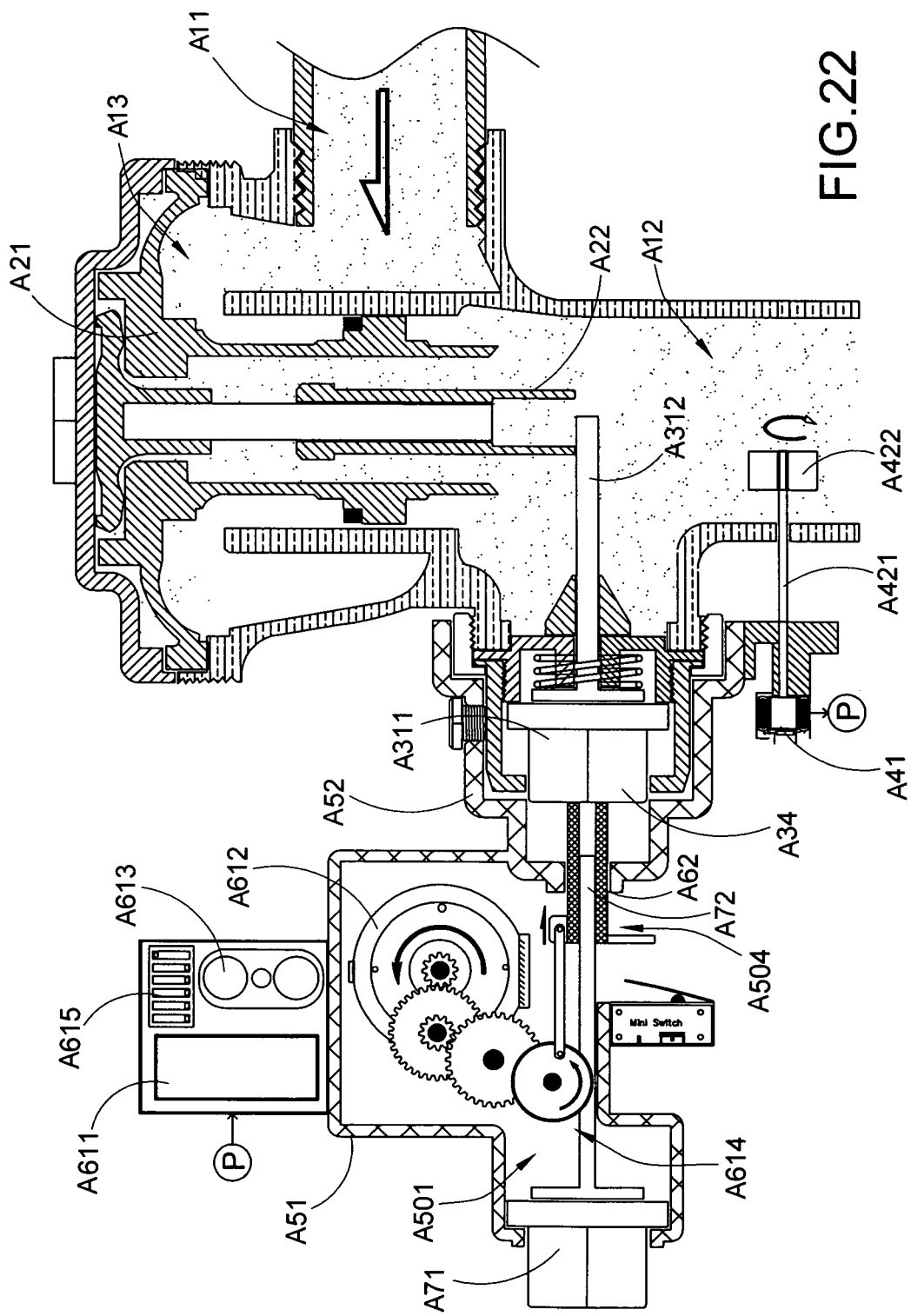
FIG. 22 illustrates the diaphragm member of the alternative flush apparatus returning back to the sealed position according to the above second preferred embodiment of the present invention.

FIGS. 20 to 22 illustrates alternative mode of the driving mechanism incorporating with the button-type conventional manual flush apparatus. As it is mentioned above, the handle type conventional manual flush apparatus is that the manual handle is actuated to push the pushing platform A311 at the pushing surface thereof towards diaphragm shaft A22 so as to move the diaphragm member A21 from the sealed position to the unsealed position. Accordingly, the button-type conventional manual flush apparatus is that operation device A30 further comprises a manual depressible button A34 coupling with the pushing platform A311 of the driving unit A31. Therefore, when the manual depressible button A34 is manually depressed, the pushing platform A311 is pushed by the manual depressible button A34 at the pushing surface thereof towards diaphragm shaft A22 so as to move the diaphragm member A21 from the sealed position to the unsealed position.

The driving mechanism of the present invention is adapted to incorporate with both the handle type conventional manual flush apparatus, as shown in FIGS. 17 to 19, and the button-type conventional manual flush apparatus, as shown in FIGS. 20 to 22. As shown in FIG. 20, the automated plunger arm A62 and the manual plunger arm A72 are slidably extended to the manual depressible button A34. Therefore, for manual operation, the manual plunger arm A72 is actuated to push at the manual depressible button A34. For automatic operation, the automated plunger arm A62 is actuated to push at the manual depressible button A34. In other words, both the manual and automatic operations for the handle type conventional manual flush apparatus are the same as the manual and automatic operations for the button-type conventional manual flush apparatus.

It is worth to mention that the operator must replace the manual handle from the handle type conventional manual flush apparatus in order to install the driving mechanism of the present invention. For the button-type conventional manual flush apparatus, the operator does not require to replace any part of the button-type conventional manual flush apparatus, i.e. keeping the manual depressible button A34, in order to install the driving mechanism of the present invention.

Figure 24:
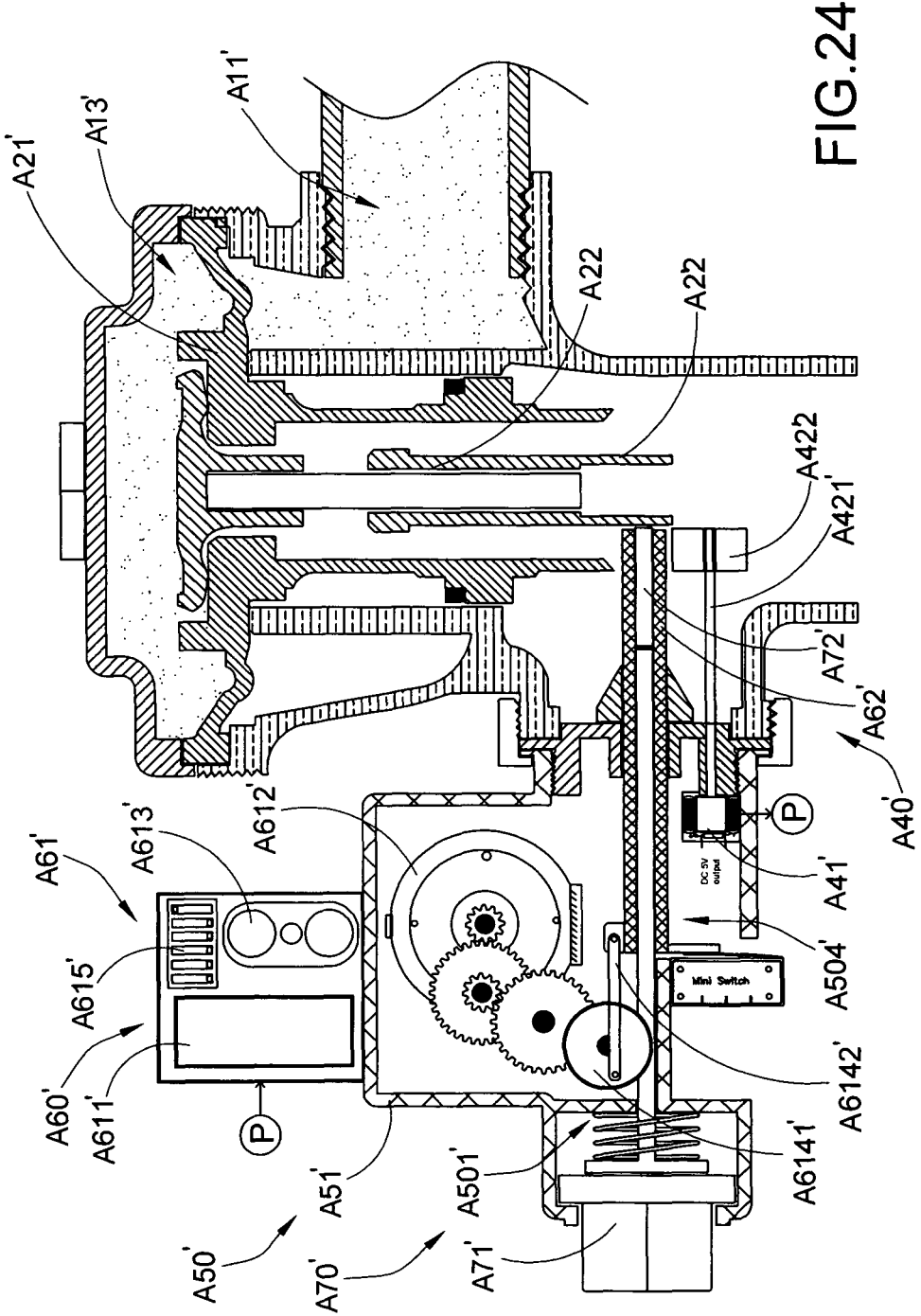
FIG. 24 is a sectional view of a flush apparatus with a driving mechanism according to a third preferred embodiment of the present invention.
Figure 25:
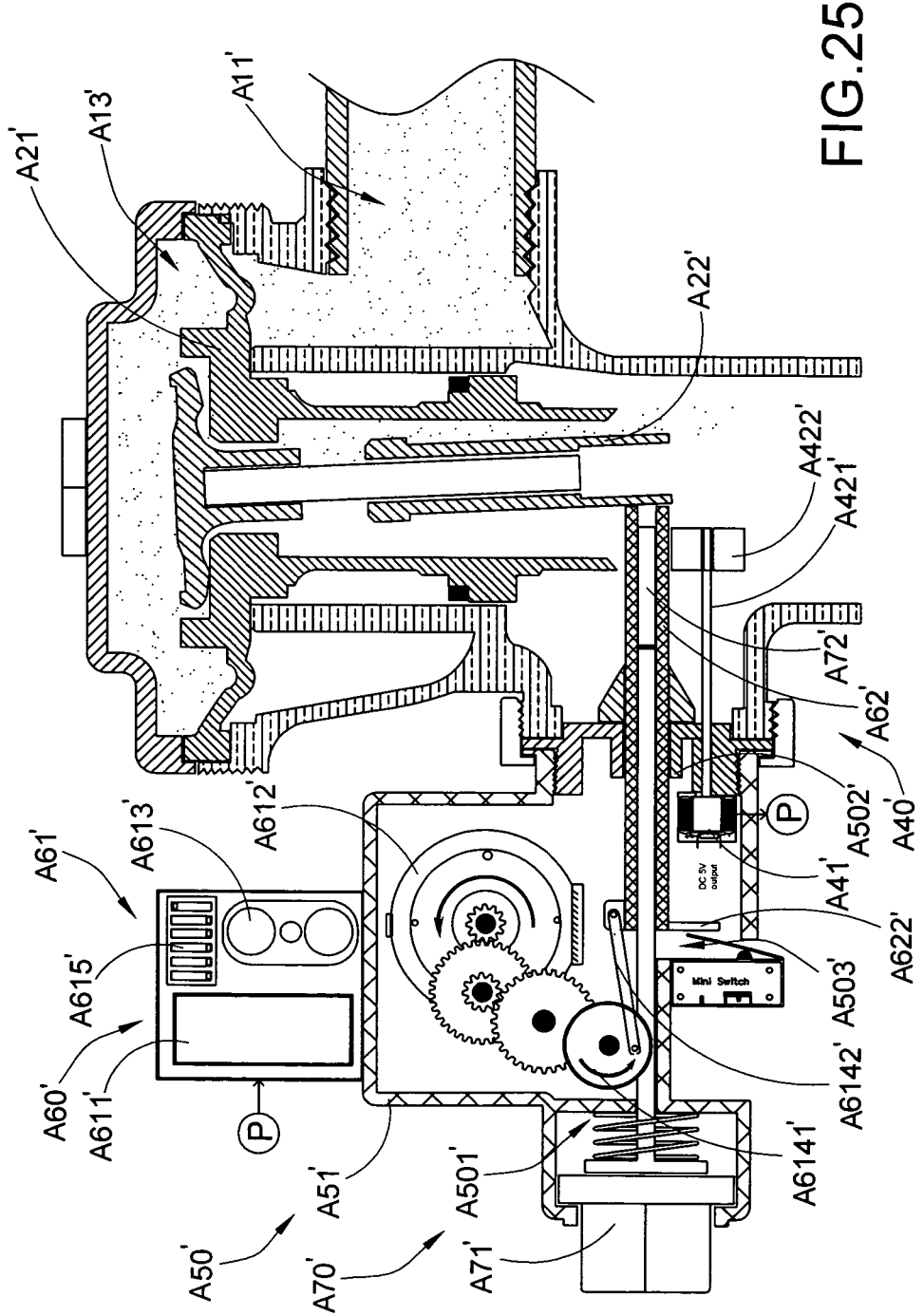
FIG. 25 is a sectional view of the flush apparatus according to the above third preferred embodiment of the present invention, illustrating the automatic plunger arm being actuated.
Figure 26:
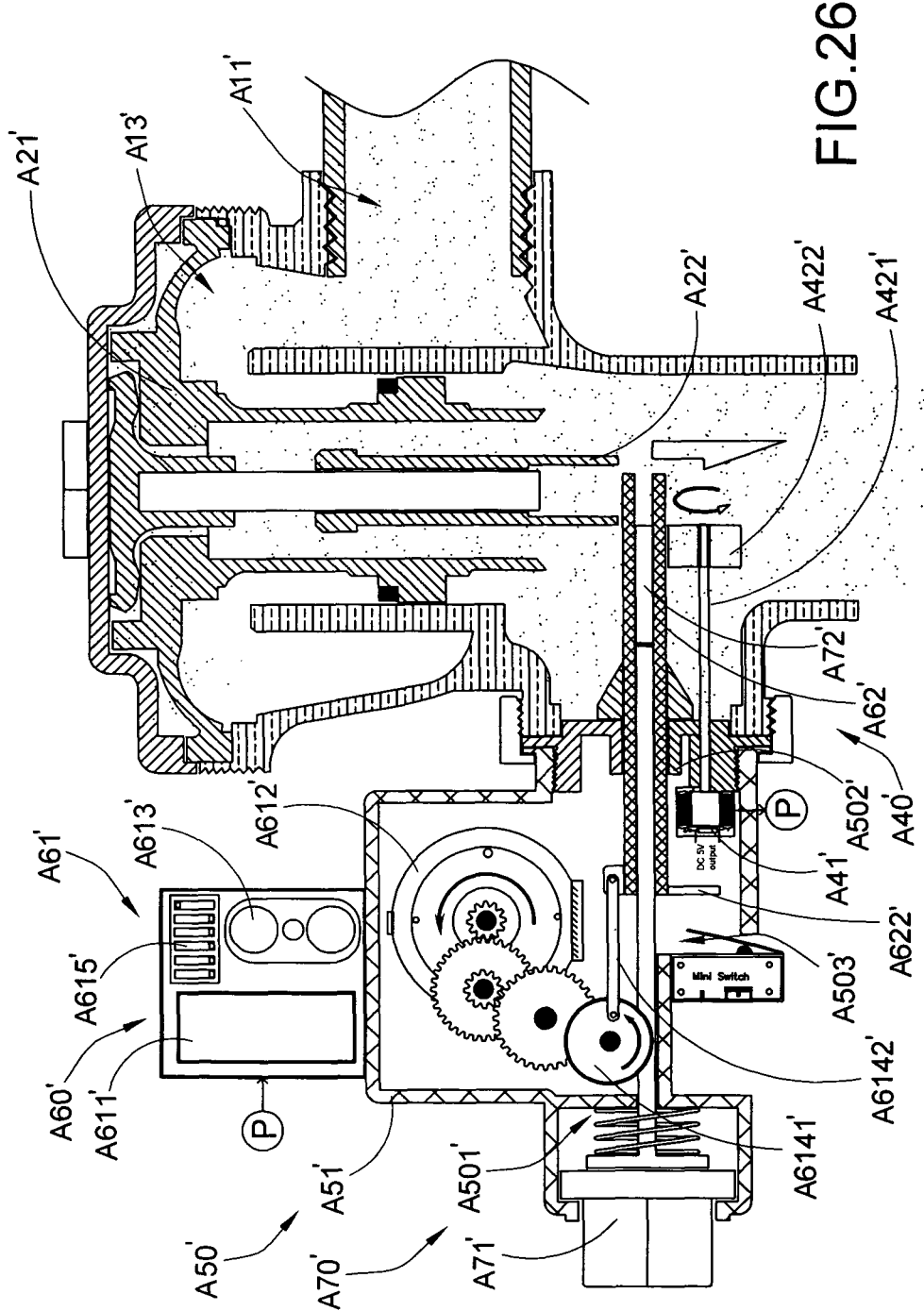
FIG. 26 is a sectional view of the flush apparatus according to the above third preferred embodiment of the present invention, illustrating the diaphragm member returning back to the sealed position.

As shown in FIGS. 24 to 26, a flush apparatus of a third preferred embodiment illustrates an alternative mode of the second embodiment, wherein the flush apparatus of the third preferred embodiment has the same configuration except the operation device A30 shown in the second embodiment.

According to the third embodiment, the driving mechanism comprises an actuation housing A50', an automated actuation unit A60', a manual actuation unit A70', and power charging arrangement A40'.

The actuation housing A50', having an actuation channel A501', is supported by the valve body A10. Accordingly, the actuation housing A50' is mounted at the valve body A10 at a position that the actuation housing A50' is positioned adjacent to the valve body A10. As shown in FIG. 24, the actuation housing A50' comprises a housing body A51' defining the actuation channel A501' at a bottom portion thereof and a tubular mounting element A52' mounting at said valve body to align the actuation channel A501' with the diaphragm shaft A22'. Accordingly, the actuation channel A501' is transversely extended to communicate with the bottom portion of the diaphragm shaft A22'.

The automated actuation unit A60' is received in the housing body A51' at a position above the actuation channel A501', wherein the automated actuation unit A60' comprises a motorized unit A61' received in the housing body A51' of the actuation housing A50' and an automated plunger arm A62' transversely extended along the actuation channel A501. When the motorized unit A61' is activated in responsive to a presence of a user, the automated plunger arm A62' is driven by the motorized unit A61' to move towards the diaphragm shaft A22', such that the diaphragm shaft A22' is pushed by the automated plunger arm A62' to move the diaphragm member A21' at the unsealed position, as shown in FIG. 25. Accordingly, the diaphragm member A21' is then moved back to its sealed position as shown in FIG. 26.

As shown in FIG. 24, the motorized unit A61' comprises a power source A611', a servo unit A612' electrically coupled with the power source A611', a sensor A613' controllably activating the servo unit A612' in responsive to a presence of the user, and a gear transmission unit A614' coupling the servo unit A612' with the automated plunger arm A62' to transmit a servo power from the servo unit A612' to a transverse force at the automated plunger arm A62' so as to drive the automated plunger arm A62' towards the diaphragm shaft A22.

According to the second embodiment, the power source A611' is a rechargeable battery supported in the housing body A51'. The servo unit A612' comprises an electric motor electrically connected to the power source A611'. The sensor A613' is an infrared sensor to detect the presence of the user by means of infrared signal. The gear transmission unit A614' comprises a gear set A6141' coupling with an output of the servo unit A612' and a driving arm A6142' driving the automated plunger arm A62' to laterally move in a reciprocating manner.

A CPU A615' is operatively connected to the sensor A613' to receive the signal therefrom, wherein the servo unit A612' is controlled by the CPU A615' such that once the CPU A615 receives the signal from the sensor A613', the CPU A615' will activate the servo unit A612' to drive the automatic plunger arm A62' for completing the automatic operation. It is worth to mention that the CPU A615' can be programmed to the time period of the presence of the user via the sensor A613' and to control the flush volume of the water via the automated actuation unit A60' by means of the time period of the opening of the diaphragm member A21' at the unsealed position.

The automated plunger arm A62' comprises a sliding stopper A622' blocked by a first stopper A502' of the housing body A51' to stop the further forward movement of the automated plunger arm A62' and blocked by a second stopper A503' of the housing body A51' to ensure the automated plunger arm A62' returning back to its original position. Accordingly, the housing body A51' has a guiding slot A504' provided at a bottom wall of the actuation channel A501', wherein the sliding stopper A622' is downwardly extended from the automated plunger arm A62' to slidably engage with the guiding slot A504'. The two ends of the guiding slot A504' form the first and second stoppers A502', A503' respectively, such that the traveling distance of the automated plunger arm A62' is limited by the length of the guiding slot A502' between the two ends thereof.

In other words, the automated actuation unit A60' of the second embodiment has the same configuration of the second embodiment, except that the automated plunger arm A62' of the third embodiment is extended to the diaphragm shaft A22' while the automated plunger arm A62 of the second embodiment is extended to the pushing platform A311.

The manual actuation unit A70' is received in the housing body A51' of the actuation housing A50'. The manual actuation unit A70' comprises a push button A71' movably mounted at the housing body A51' of the actuation housing A50' and a manual plunger arm A72' transversely extended along the actuation channel A501' from the push button A71' towards the diaphragm shaft A22'. When the push button A71' is manually pressed, the diaphragm shaft A22' is pushed by the manual plunger arm A72' to move the diaphragm member A21' at the unsealed position.

The push button A71' is extended to align with the diaphragm member A21 through the actuation channel A501'. The manual plunger arm A72' has an enlarged pressing end extended to bias against the push button A71' and an opposed pusher end extended towards the diaphragm shaft A22 through the actuation channel A501' in such a manner that when the push button A71' is manually pressed, the manual plunger arm A72' is directly pushed towards the diaphragm shaft A22'. The automated plunger arm A62' has a hollow structure defining a sliding channel A621' that the manual plunger arm A72' is slidably extended through the sliding channel A621'.

Therefore, the manual actuation unit A70' of the second embodiment has the same configuration of the second embodiment, except that the manual plunger arm A72' of the third embodiment is extended to the diaphragm shaft A22' while the manual plunger arm A72 of the second embodiment is extended to the pushing platform A311.

As shown in FIG. 24, the mounting element A52' having a ring shape defines two mounting openings to mount at the valve body A10' and the actuation housing A50' respectively to align the actuation channel A501'.

The power charging arrangement A40' of the second embodiment, having the same configuration of the second embodiment, comprises an electrical generator A41' operatively linked to the power source A611' and a propeller unit A42' extended from the electrical generator A41' to the water outlet A12' of the valve body A10 in such a manner that when the propeller unit A42' is driven to rotate in responsive to a flush of water coming out at the water outlet A12', the electrical generator A41' is actuated to charge the power source A611'. Accordingly, the power charging arrangement A40' can be an integrated device internally built-in with the housing body A51'.

The electrical generator A41' is an alternator or a DC generator. The propeller unit A42' comprises a propeller shaft A421' transversely extended along the actuation channel A501' and a propeller blade A422' coupled at a free end of the propeller shaft A421' at the water outlet A12' such that the propeller blade A422' is driven to be rotated in responsive to a flush of water so as to transmit a rotational power to the electrical generator A41' through the propeller shaft A421'.

It is worth to mention that the power charging arrangement A40, A40' can be incorporated with any conventional automated flush apparatus having a rechargeable power supply. Therefore, the user does not require frequently replacing the power supply or running any electrical cable to the power supply in order to installation the conventional automated flush apparatus.

Figure 27:
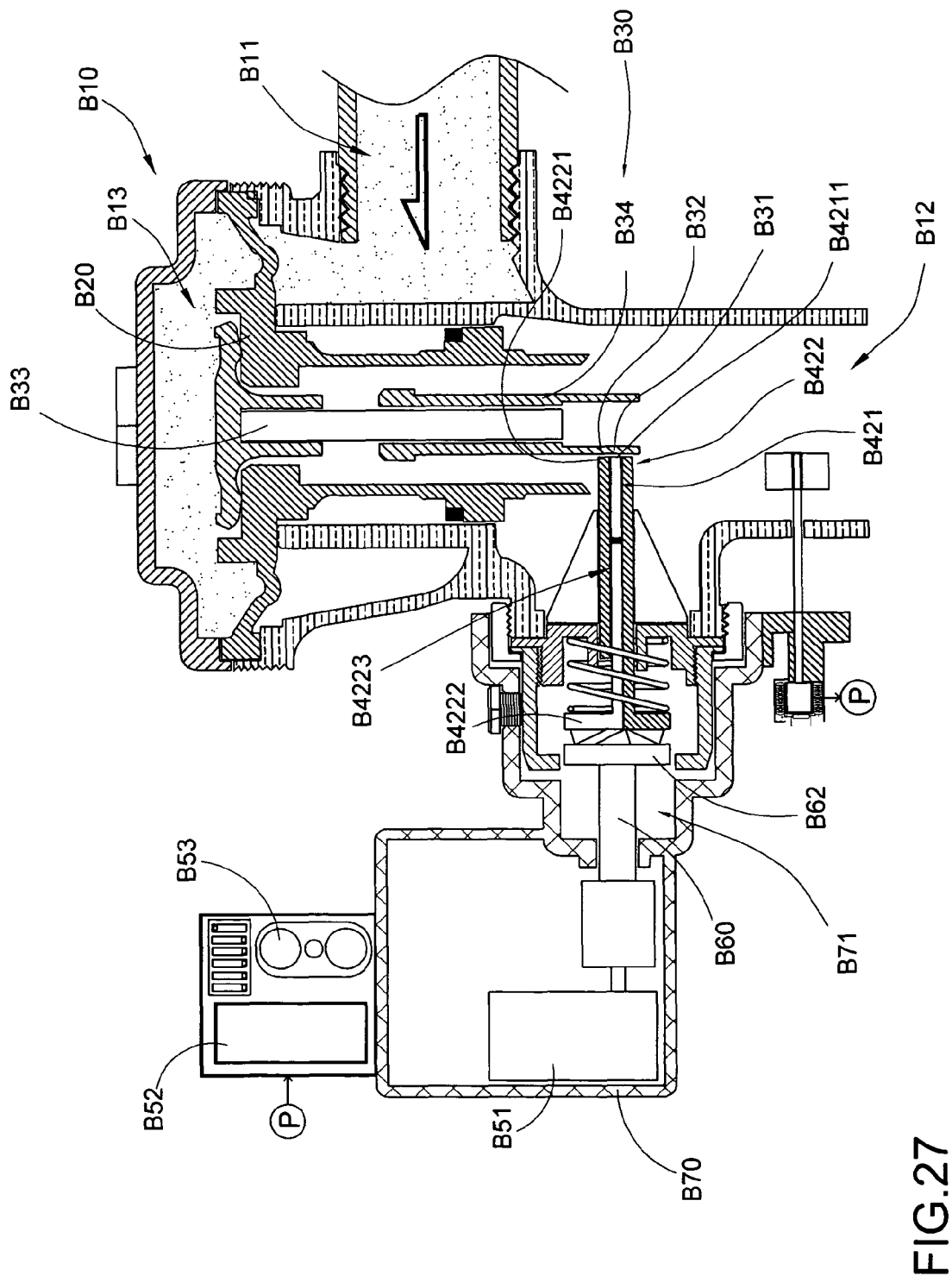
FIG. 27 is a sectional view of the flush apparatus according to a fourth preferred embodiment of the present invention.
Figure 28:
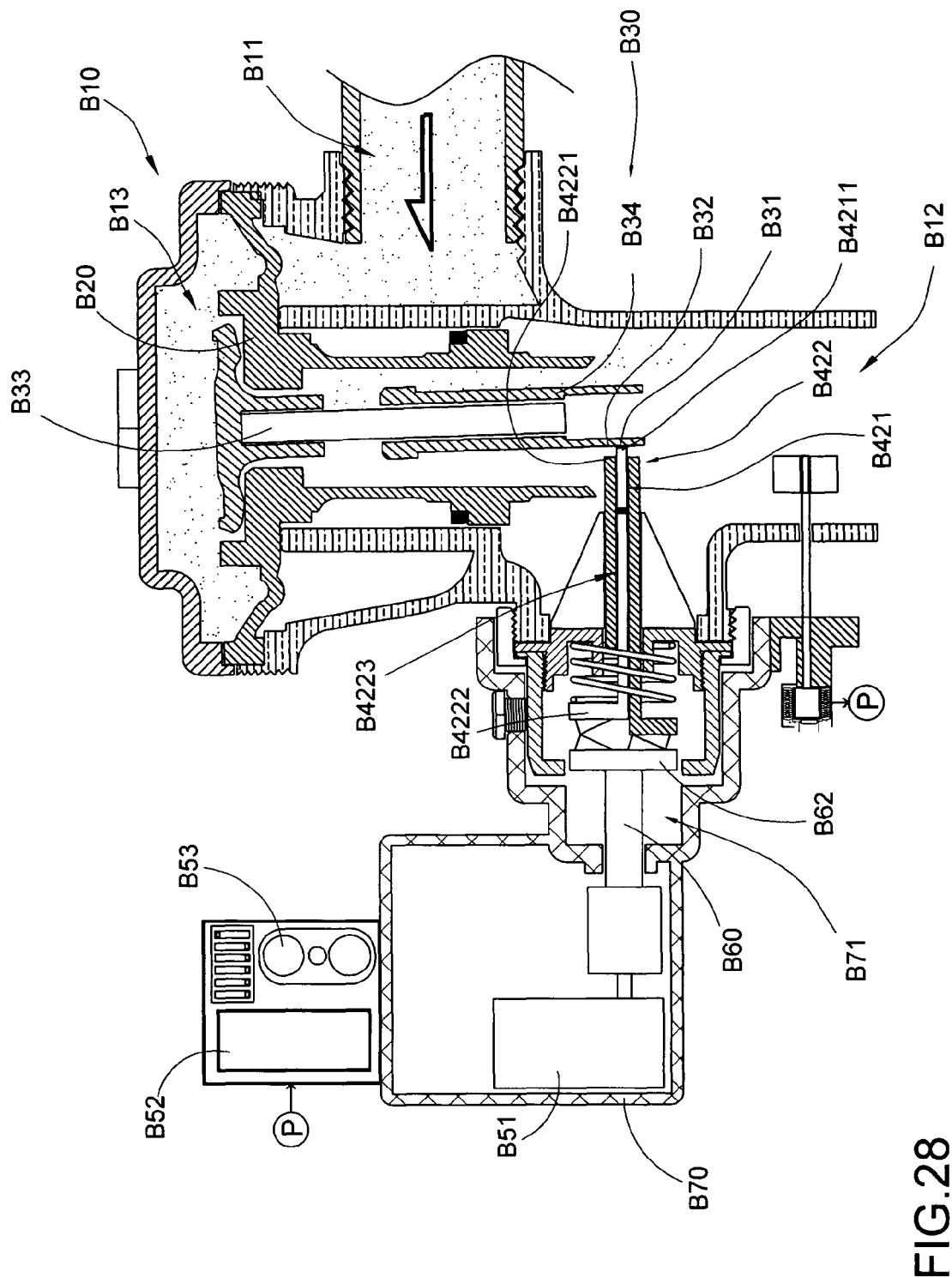
FIG. 28 is a sectional view of the flush apparatus according to the above fourth preferred embodiment of the present invention, illustrating the low volume pusher member being actuated.
Figure 29:
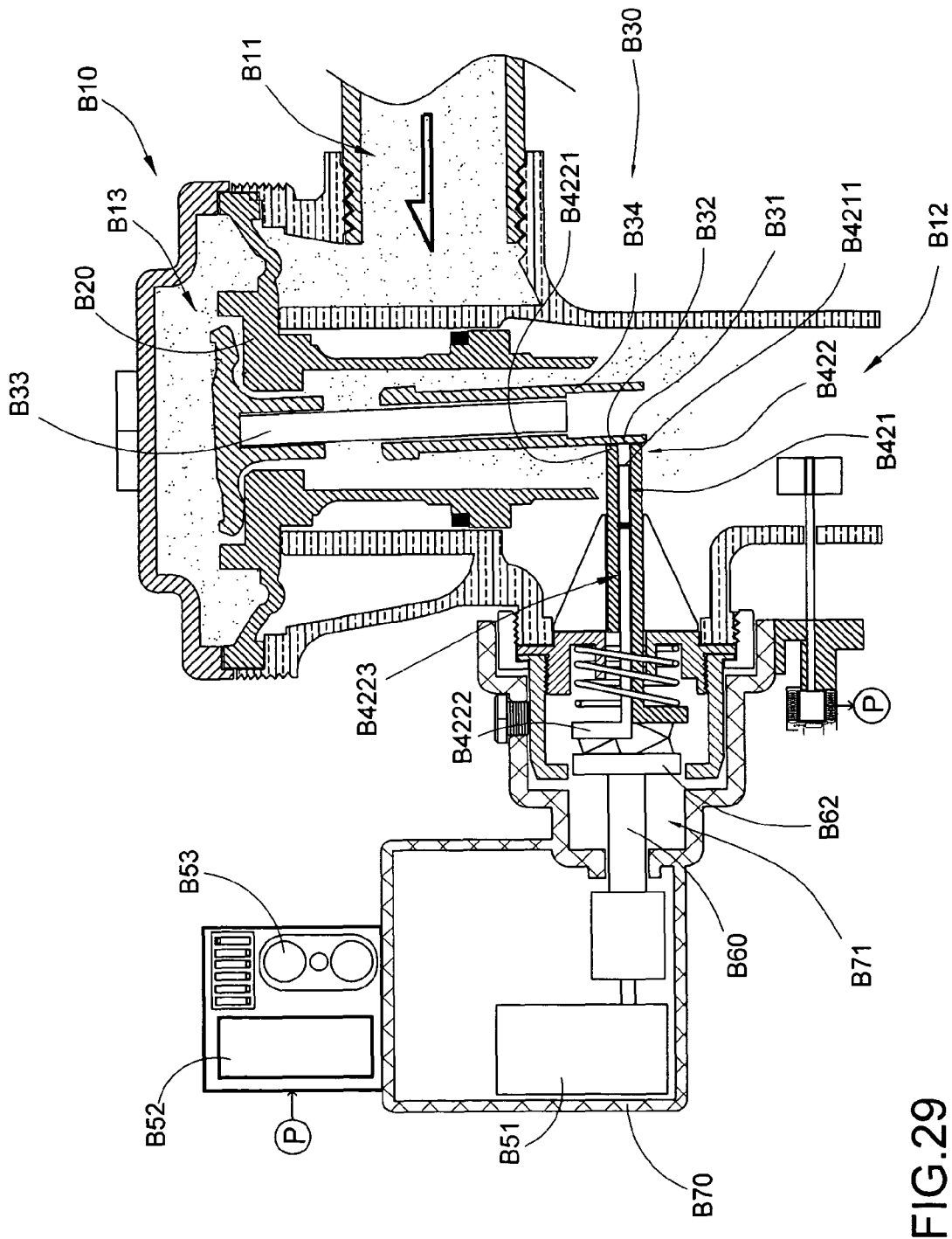
FIG. 29 is a sectional view of the flush apparatus according to the above fourth preferred embodiment of the present invention, illustrating the high volume pusher member being actuated.

Referring to FIGS. 27 to 29, a flush system according to a fourth embodiment of the present invention is illustrated, wherein the flush system, for a toilet as an example, comprises a valve body B10, a valve seat B20, a flushing shaft B30, and a water control arrangement B40.

The valve body B10 has a water inlet B11 communicating with a water source, a water outlet B12, and a water chamber B13 communicating between the water inlet B11 and the water outlet B12.

The valve seat B20 is supported in the valve body B10 to move between a normal idle position and a flushing position, wherein at the idle position, the valve seat B20 is sealed at the water chamber B13 for retaining a water pressure within the water chamber B13 so as to block flush water flowing from the water inlet B11 to the water outlet B12, wherein and at the flushing position, the valve seat B20 is moved to relief the water pressure for allowing the flush water flowing towards the toilet through the water outlet B12 so as to complete a flushing operation.

The flushing shaft B30 is extended from the valve seat B20 in the valve body B10 for being moved to drive the valve seat B20 to move between the idle position and the flushing position, wherein the flushing shaft B30 defines a first position B31 and a second position B32. Accordingly, the first position B31 of the flushing shaft B30 is set at a lower pushing position while the second position of the flushing shaft B30 is set at a higher pushing position thereof. In other words, the first position B31 of the flushing shaft B30 is lower than the second position B32 of the flushing shaft B30.

Furthermore, the flushing shaft B30 comprises a main shaft member B33 and a movable pin B34 movably provided on a lower portion thereof so that the movable pin B34 is capable of longitudinally moving along the flushing shaft B30 with respective to the main shaft member B33.

The flush water control arrangement B40 comprises a water control pusher B42 alignedly extended towards the movable pin B34 of the flushing shaft B30, and an automated actuation unit B50 operatively controlling a movement of the water control pusher B42. In particular, the water control pusher B42 is alignedly extended towards the flushing shaft B30.

The automated actuation unit comprises a motorized unit B50 and an automated plunger arm B60 movably extended towards the water control pusher B42, wherein when the motorized unit B50 is activated in responsive to a presence of a user, the automated plunger arm B60 is driven by the motorized unit B50 to move the water control pusher B42 so as to actuate the flushing shaft B30 between the first and second positions B31, B32 for complete a flushing operation.

According to the preferred embodiment, the motorized unit B50 comprises a servo unit B51, a sensor B52 controllably activating the servo unit B51 in responsive to a presence of the user, and a processor B53 operatively linked to the servo unit B51 for determining a time usage of the user, so as to controllably move the water control pusher B42 to actuate the flushing shaft B30 between the first and second positions B31, B32.

Accordingly, the water control pusher B42 is actuated to push at the first position B31 of the flushing shaft B30 to complete the flushing operation with a relatively low volume of water. The water control pusher B42 is actuated to push at the second position B32 of the flushing shaft B30 to complete the flushing operation with a relatively high volume of water.

The water control pusher B42 comprises a low volume pusher member B421 and a high volume pusher member B422 alignedly extended towards the first position B31 and the second position B32 of the flushing shaft B30 respectively, in such a manner that when the automated plunger arm B60 is actuated to push the high volume pusher member B422, as shown in FIG. 29, the high volume pusher member B422 is actuated to push at the second position B32 of the flushing shaft B30 to complete the flushing operation with a relatively high volume of water for allowing a high volume of water flowing through the valve seat B20. When the automated plunger arm B60 is actuated to push the low volume pusher member B421, as shown in FIG. 28, the low volume pusher member B421 is actuated to push at the first position B31 of the flushing shaft B30 to complete the flushing operation with a relatively low volume of water for allowing a low volume of water flowing through the valve seat B20. Therefore, the system of the present invention can control a flush volume of the water by automatically actuating the automated plunger arm B52 between the high volume actuating position and the low volume actuating position. Normally, the low volume pusher member B421 and the high volume pusher member B422 are spacedly apart from the flushing shaft B30 so as to close the valve seat B20 for blocking water from flowing through the valve body B10.

As shown in FIGS. 27 to 30, the automated plunger arm B60 comprises a driving member B61 coupled at an output shaft of the servo unit B51 of the motorized unit B50 in such a manner that when the driving member B61 is actuated by the motorized unit B50, the driving member B61 is driven to selectively actuate one of the high volume pusher member B422 and the low volume pusher member B421 to complete the flushing operation.

In particularly, the driving member B61 is driven to rotate by the motorized unit B50, such that when the driving member B61 is rotated at a first rotation direction, the driving member B61 actuates the high volume pusher member B422, and when the driving member B61 is rotated at an opposite second rotation direction, the driving member B61 actuates the low volume pusher member B421.

The automated pusher member B60 further has first and second inclined actuating surfaces B62, B63 spacedly and coaxially formed at the driving member B61 to couple with the high volume pusher member B422 and the low volume pusher member B421 respectively, such that when the driving member B61 is rotated at the first rotation direction, the first inclined actuating surface B62 pushes at the high volume pusher member B422, and when the driving member B61 is rotated at the second rotation direction, the second inclined actuating surface B63 pushes at the low volume pusher member B421.

Figure 30:
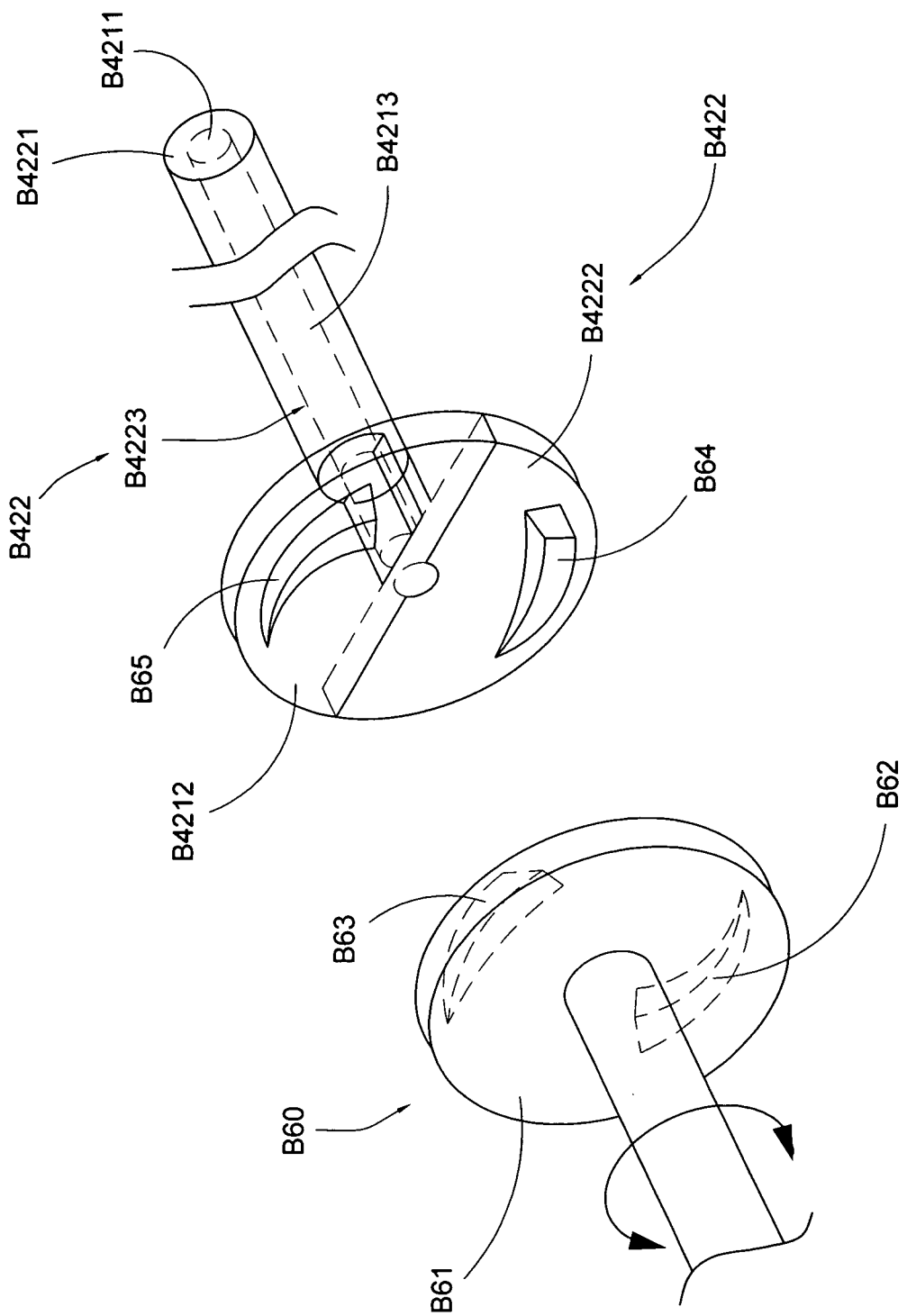
FIG. 30 is a schematic view of the water control pusher of the flush apparatus according to the above fourth preferred embodiment of the present invention.

As shown in FIG. 30, the automated pusher member B60 further comprises a corresponding first included pushing surface B64 provided at the high volume pusher member B422 to contact with the first inclined actuating surface B62, and a corresponding second included pushing surface B65 provided at the low volume pusher member B421 to contact with the first inclined actuating surface B62. Therefore, when the driving member B61 is rotated at the first rotation direction, the first inclined actuating surface B62 engages and pushes the first pushing surface B64 to drive the high volume pusher member B422 at the second position B32 of the flushing shaft B30. When the driving member B61 is rotated at the second rotation direction, the second inclined actuating surface B63 engages and pushes the second pushing surface B65 to drive the low volume pusher member B421 at the first position B31 of the flushing shaft B30.

It is worth mentioning that the first and second inclined actuating surfaces B62, B63 are coaxially protruded from the driving member B61 which has a circular disc shape. The first inclined actuating surface B62 is inclined and extended from the driving member B61 in a manner that a distance between the first inclined actuating surface B62 and the driving member B61 is gradually increased at the second rotation direction. The first inclined pushing surface B64 is inclined and extended from the high volume pusher member B422 in a manner that a distance between the first inclined pushing surface B64 and the high volume pusher member B422 is gradually increased at the first rotation direction.

The second inclined actuating surface B63 is inclined and extended from the driving member B61 in a manner that a distance between the second inclined actuating surface B63 and the driving member B61 is gradually increased at the first rotation direction. The second inclined pushing surface B65 is inclined and extended from the low volume pusher member B421 in a manner that a distance between the second inclined pushing surface B65 and the low volume pusher member B421 is gradually increased at the second rotation direction.

In other words, when the driving member B61 is rotated at the first rotation direction, the second inclined actuating surface B63 will not engage and push the second pushing surface B65 to prevent the actuation of the low volume pusher member B421. Likewise, when the driving member B61 is rotated at the second rotation direction, the first inclined actuating surface B62 will not engage and push the first pushing surface B64 to prevent the actuation of the high volume pusher member B422.

As shown in FIG. 27, the high volume pusher member B422, having a generally L-shaped configuration, has a front high volume biasing head B4221 aligning with the second position B32 of the flushing shaft B30, an enlarged rear high volume flat end B4222 arranged to be pushed by the automated pusher member B60, and an elongated central cavity B4223 extended between the high volume biasing head B4221 and the high volume flat end B4222. In particularly, the first inclined pushing surface B64 is formed at the high volume flat end B4222 of the high volume pusher member B422.

It is worth mentioning that when the high volume pusher member B422 is pushed to bias against the flushing shaft B30, the movable pin B34 is arranged to be pushed to move upwardly along the flushing shaft B30 while the main shaft member B33 is pivotally pushed to open the valve seat B20 for allowing a high volume of water flowing through the valve body B10.

The low volume pusher member B421, having a generally L-shaped configuration, has a front low volume biasing head B4211 aligning with the first position B31 of the flushing shaft B30, an enlarged rear low volume flat end B4212 arranged to be pushed by the automated pusher member B60, and an elongated pusher pin B4213, preferably a solid pin, extended between the low volume biasing head B4211 and the low volume flat end B4212. The pusher pin B4213 is slidably received in the central cavity B4223 of the high volume pusher member B422. In other words, the high and low volume pusher members B422, B421 form a tube-in-tube structural configuration. In particularly, the second inclined pushing surface B65 is formed at the low volume flat end B4212 of the low volume pusher member B421.

Therefore, when the high volume pusher member B422 is pushed, the high volume pusher member B422 is slid with respect to the stationary low volume pusher member B421, such that the front high volume biasing head B4221 will push at the second position B32 of the flushing shaft B30. When the low volume pusher member B422 is pushed, the pusher pin B4213 is slid within the central cavity B4223 of the high volume pusher member B422 while the high volume pusher member B422 is stationary, the front low volume biasing head B4211 will push at the first position B31 of the flushing shaft B30.

Figure 31:
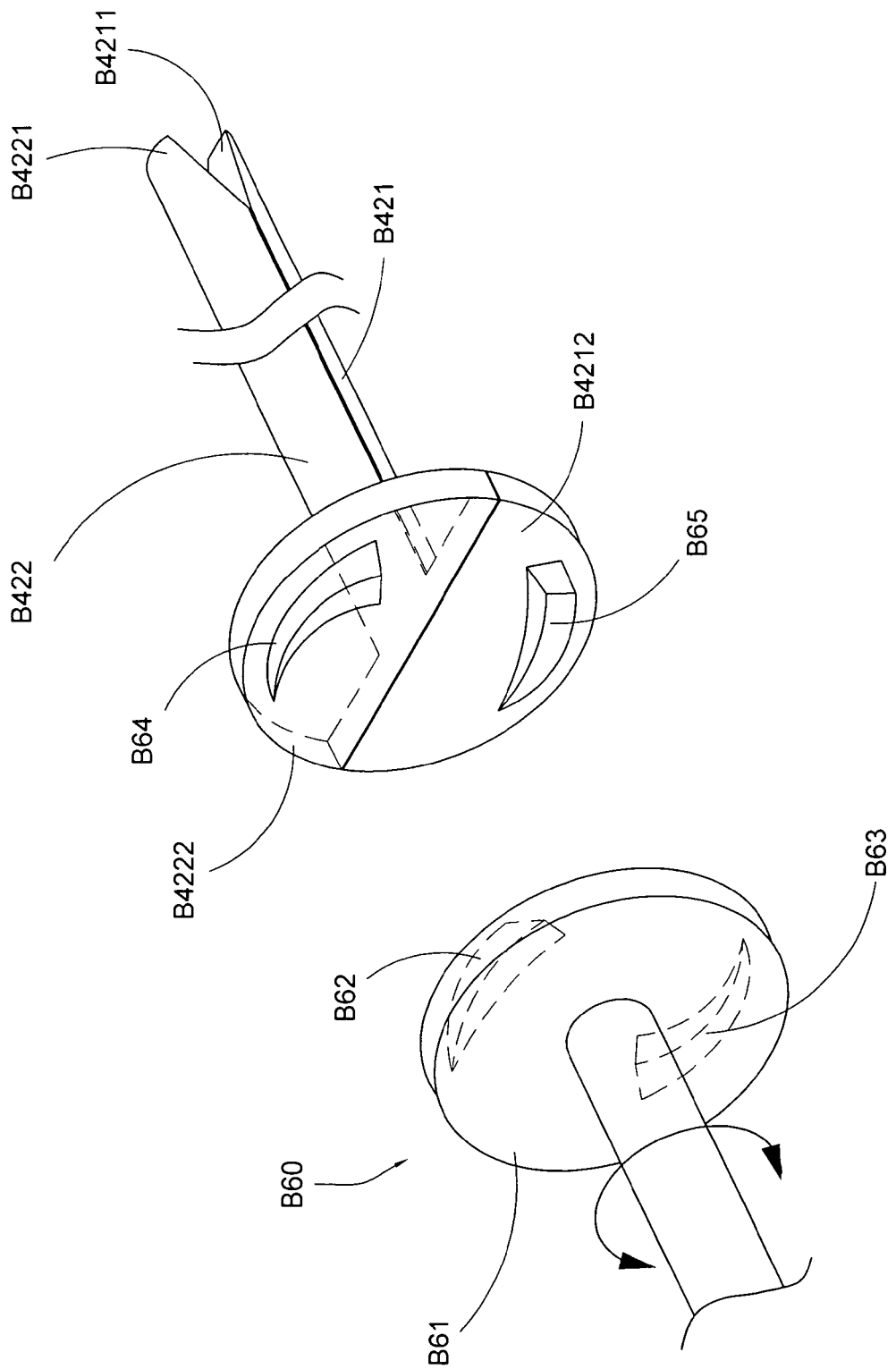
FIG. 31 illustrates an alternative mode of the water control pusher of the flush apparatus according to the above fourth preferred embodiment of the present invention.

Alternatively, each of the low volume pusher member B421 and the high volume pusher member B422 is an elongated member, as shown in FIG. 31, wherein the low volume pusher member B421 and the high volume pusher member B422 are slidably supported side-by-side for being driven to move for pushing the first position B31 and the second position B32 respectively, as shown in FIG. 31. In other words, the high and low volume pusher members B422, B421 can be identical that each of the high and low volume pusher members B422, B421 has a generally L-shaped configuration with the flat end, the biasing head, and the solid pusher pin extending side-by-side.

In order to precisely control the volume of the water to complete the flushing operation, the time period of the valve seat B20 being stayed at the flushing position should be concerned. In other words, the longer time of the valve seat B20 being stayed at the flushing position, the relatively higher volume of water is used for completing the flushing operation. Therefore, the shorter time of the valve seat B20 being stayed at the flushing position, the relatively lower volume of water is used for completing the flushing operation.

Accordingly, the time period of the valve seat B20 being stayed at the flushing position can be controlled by the time of the flushing shaft B30 being actuated to move back to its vertical orientation. It is worth to mention that when the movable pin B34 of the flushing shaft B30 is moved back to its vertical orientation, the valve seat B20 is sealed back at its idle position to block the water flushing out of the water outlet B12.

When the high volume pusher member B422 is driven to move to pivotally move the flushing shaft B30 at the second position B32, the movable pin B34 requires longer time to return back to its vertical orientation. When the low volume pusher member B421 is driven to move to pivotally move the flushing shaft B30 at the first position B31, the movable pin B34 requires shorter time to return back to its vertical orientation. Therefore, by actuating one of the low volume pusher member B421 and the high volume pusher member B422, the time period of the movable pin B34 returning back to its vertical orientation can be controlled so as to control the volume of water for completing the flushing operation.

Another way to precisely control the volume of the water to complete the flushing operation is to control the inclination angle of the flushing shaft B30 being actuated.

According to the preferred embodiment of the present invention, the high volume pusher member B422 is arranged to be longitudinally pushed to bias against the flushing shaft B30 until the movable pin B34 is moved to a position above the high volume pusher member B422. In other words, the flushing shaft B30 is pivotally moved to a high volume flushing angle of inclination with respect to a vertical axis of the flushing shaft B30 so that a time period for which the valve seat B20 is opened is maximized.

According to the preferred embodiment of the present invention, the low volume pusher member B421 is arranged to be longitudinally pushed to bias against the flushing shaft B30 until the movable pin B34 is moved to a position above the low volume pusher member B421. In other words, the flushing shaft B30 is pivotally moved to a low volume flushing angle of inclination with respective to a vertical axis of the flushing shaft B30 so that a time period for which the valve seat B20 is less than that when the flushing shaft B30 is pivotally moved to the high volume flushing angle. Since the low volume flushing angle of inclination is less than the high volume flushing angle of inclination, the time period for which the valve seat B20 is opened is less than that when the flushing shaft B30 is pivotally moved to the high volume flushing angle, and the volume of flush water will be accordingly less than when the flushing shaft B30 is pivotally moved to the high volume flushing angle.

Thus, when the second position B32 of the flushing shaft B30 is longitudinally pushed, a relatively high volume of flush water is allowed to pass through the valve body B10 because there is an extended time of opening of the valve seat B20. When the first position B31 of the flushing shaft B30 is longitudinally pushed, a relatively low volume of flush water is allowed to pass through the valve body B10 because the time of which the valve seat B20 is opened is less than that when the first position B31 of the flushing shaft B30 is pushed.

According to the preferred embodiment, the servo unit B51 comprises an electric motor or a solenoid electrically connected to the power source, wherein the servo unit B51 is actuated to drive the automated plunger arm B60 to move laterally. It is worth to mention that the electric motor is preferred and is more reliable than the solenoid because the electric motor provides simple mechanical work rather than using the magnetic force, so as to minimize the failure operation of the servo unit B51 and to reduce the maintenance cost of the present invention. In addition, the size of the electric motor is so small in comparison with the solenoid so as to reduce the overall size of the motorized unit B50. Therefore, the electric motor is preferred to be used to not only ensure the reliable of the motorized unit B50 but also enhance the smooth operation thereof.

The sensor B52, such as an infrared sensor, is arranged to detect the presence of the user by means of infrared signal in such a manner that when the sensor B52 transmits an infrared signal for detecting the presence of the user of the sanitary system.

The processor B53 is operatively connected to the sensor B52 to receive the signal therefrom. Accordingly, when the sensor B52 detects the presence of the user, the sensor B52 will send a first signal to the processor B53. The processor B53 will then activate the servo unit B51 in a standby mode. Once the user leaves the system, the sensor B52 will send a second signal to the processor B53. The processor B53 will then activate the servo unit B51 to actuate the automated pusher member B60. Accordingly, the processor B53 will determine the time usage of the user by determining the time difference between the first and second signals in order to actuate the automated pusher member B60 to move the flushing shaft B30 at one of the first position B31 and the second positions B32. According to the preferred embodiment, the time threshold is preset in the processor B53 such that when the time usage of the user is shorter and the time threshold, the servo unit B51 is actuated to move the flushing shaft b30 at the first position B31 for completing the flushing operation with the relatively low volume of water. When the time usage of the user equal or is longer than the time threshold, the servo unit B51 is actuated to move the flushing shaft b30 at the second position B32 for completing the flushing operation with the relatively high volume of water. In addition, the time threshold can be selectively adjusted in the processor B53, for example 30 to 60 seconds, by the user. Once the water control pusher B42 is moved back to the original position, i.e. the flushing operation is completed, the processor B53 will be returned to its initial state.

Accordingly, the flush water control arrangement further comprises an actuation housing B70 having an actuation channel B71 coupling with the retention ring of the valve body B10, wherein the automated plunger arm B60 is slidably supported within the actuation channel B541. The power source, the sensor B52, and the processor B53 of the motorized unit B50 are received in the actuation housing B70. Therefore, the flush system of the present invention can mount at the retention ring and to actuate the flush water control arrangement of the conventional manual operation mechanism. Therefore, the present invention will provide an accurate and simple flush operation as the manual flush apparatus provides.

Figure 32:
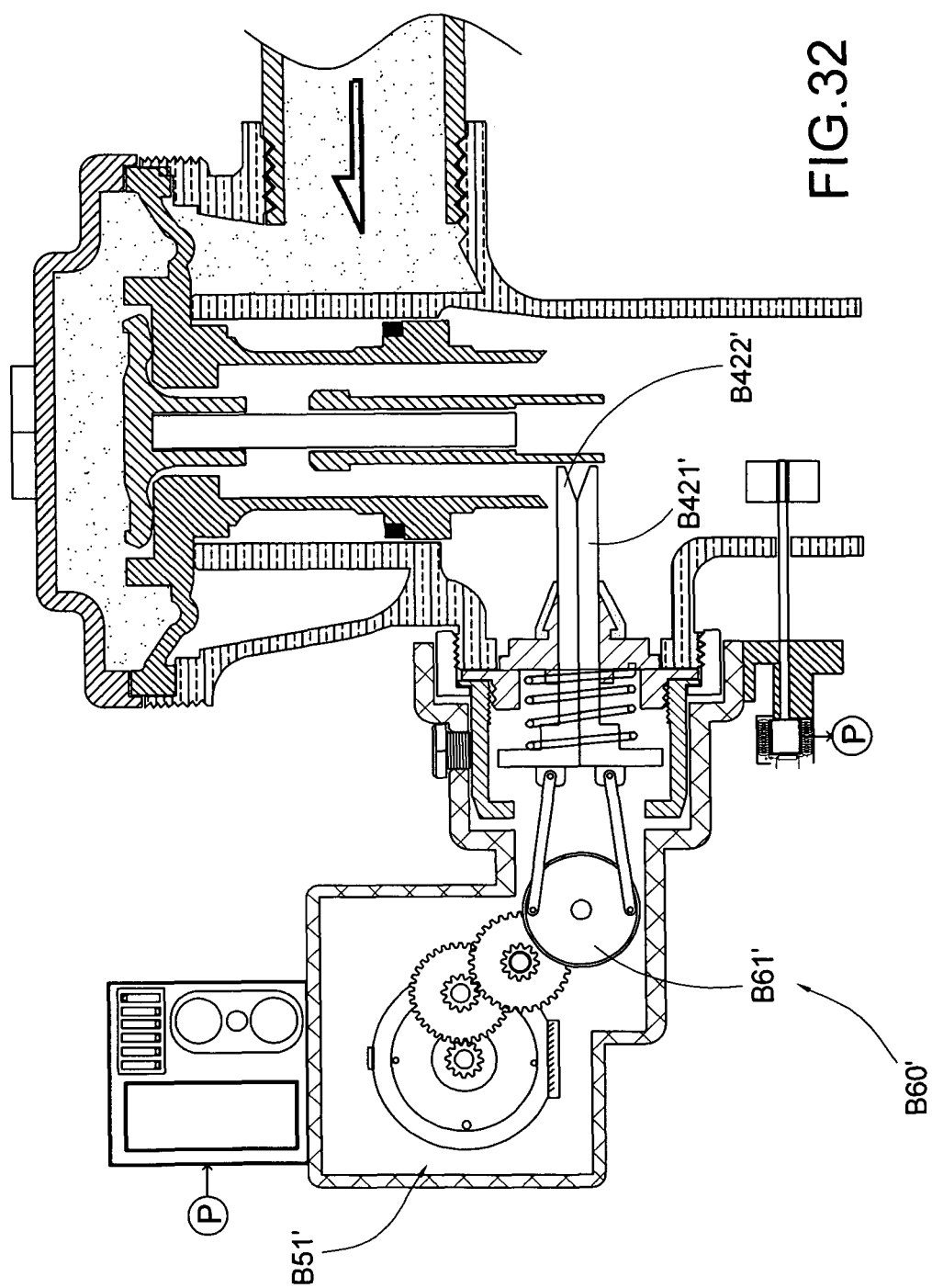
FIG. 32 is a sectional view of the flush apparatus according to a fifth preferred embodiment of the present invention

As shown in FIG. 32, a flush system according to a fifth embodiment illustrates an alternative mode of the fourth embodiment, wherein the structure of the fifth embodiment is the same as the fourth embodiment, except the automated plunger arm B60'.

Figure 33:
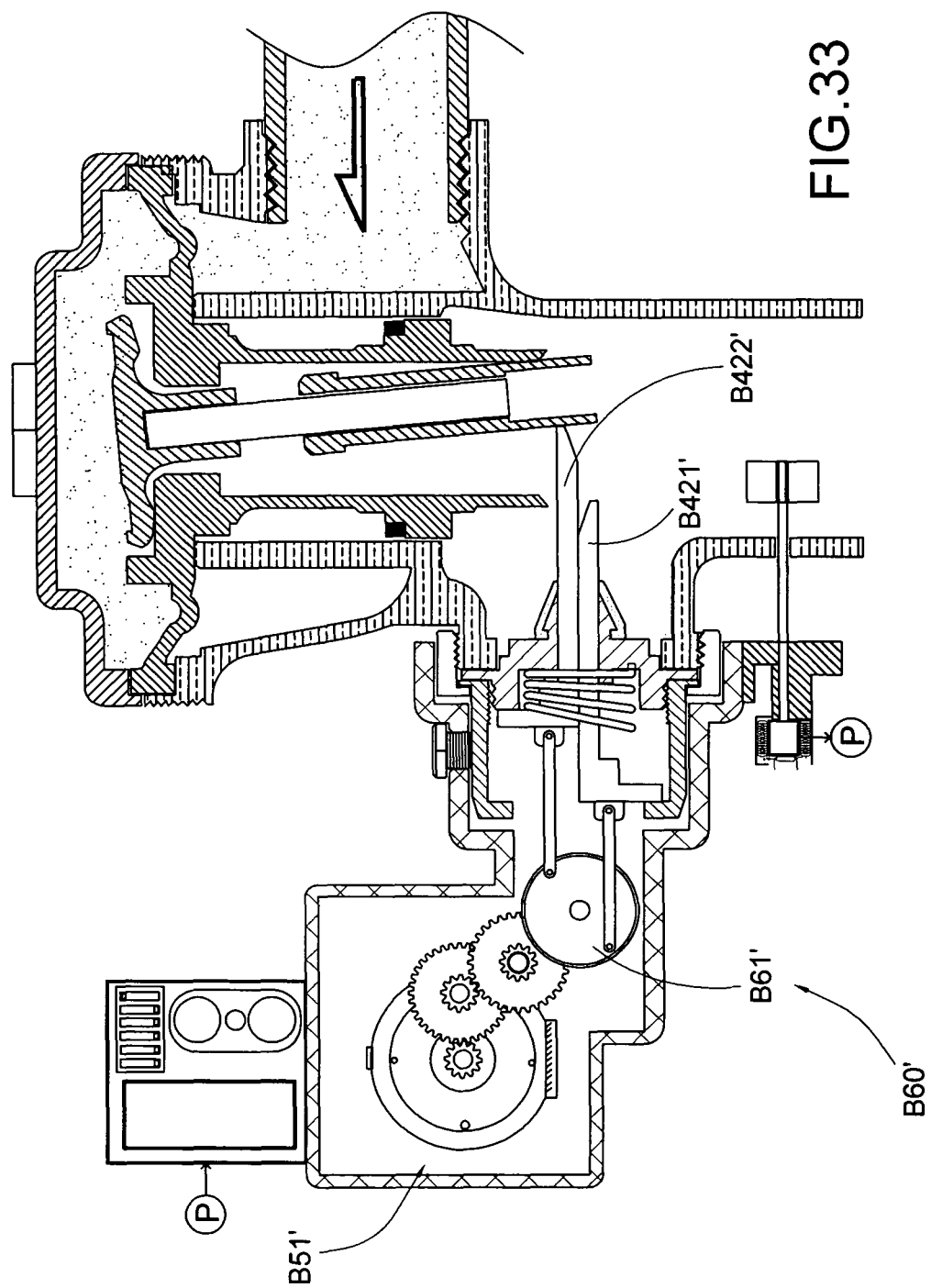
FIG. 33 is a sectional view of the flush apparatus according to the above fifth preferred embodiment of the present invention, illustrating the high volume pusher member being actuated.
Figure 34:
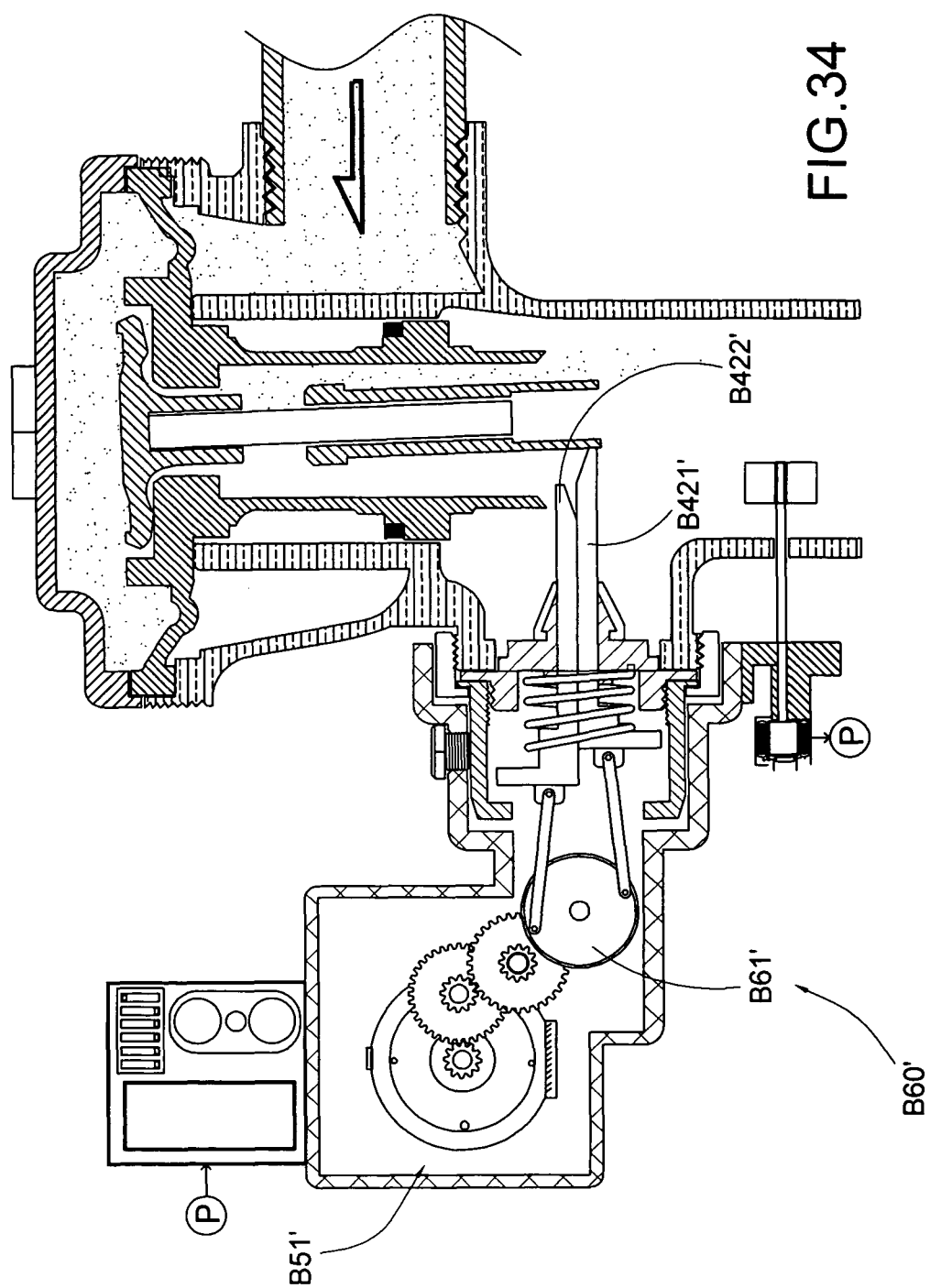
FIG. 34 is a sectional view of the flush apparatus according to the above fifth preferred embodiment of the present invention, illustrating the low volume pusher member being actuated.

As shown in FIGS. 32 to 34, the automated plunger arm B60' comprises a driving disc B61' driven to be rotated by the motorized unit B50, wherein the inner ends of said high and low volume pusher members B422, B421 are pivotally and spacedly coupled at the driving disc B61' in such a manner that when the driving disc B61' is rotated at a first rotation direction, the low volume pusher member B421 is pushed at the first position B31 of the flushing shaft B30, and when the driving disc B61' is rotated at an opposite second rotation direction, the high volume pusher member B422 is pushed at the second position B32 of the flushing shaft B30.

According to the preferred embodiment, each of the high and low volume pusher members B422, B421 has an elongated pin structure that the inner ends of the high and low volume pusher members B422, B421 is pivotally coupled at the driving disc B61' while the outer ends of the high and low volume pusher members B422, B421 are extended to align with the second and first positions B32, B31 of the flushing shaft B30 respectively. In particularly, the high volume pusher member B422 and the low volume pusher member B421 are slidably extended side-by-side to push at the second and first positions B32, B31 of the flushing shaft B30 respectively.

It is appreciated that the driving member B61' can incorporate with the tube-in-tube structural configuration that the low volume pusher member B421 is slidably coupled within the tubular high volume pusher member B422 as it is mentioned above.

In addition, when the driving disc B61' is rotated at the first rotation direction, the low volume pusher member B421 is pushed towards the flushing shaft B30 while the high volume pusher member B422 is pulled away from the flushing shaft B30 in a synchronized manner, as shown in FIG. 34. Likewise, when the driving disc B61' is rotated at the second rotation direction, the low volume pusher member B421 is pulled away from the flushing shaft B30 while the high volume pusher member B422 is pushed towards the flushing shaft B30 in a synchronized manner, as shown in FIG. 33.

In order to drive the driving member B61' to rotate, the servo unit B51 can be operatively coupled with the driving member B61' via the gear unit such that the servo unit B51 can generate the rotational power at two opposite directions for selectively driving the driving member B61' at the first and second rotation directions.

Figure 35:
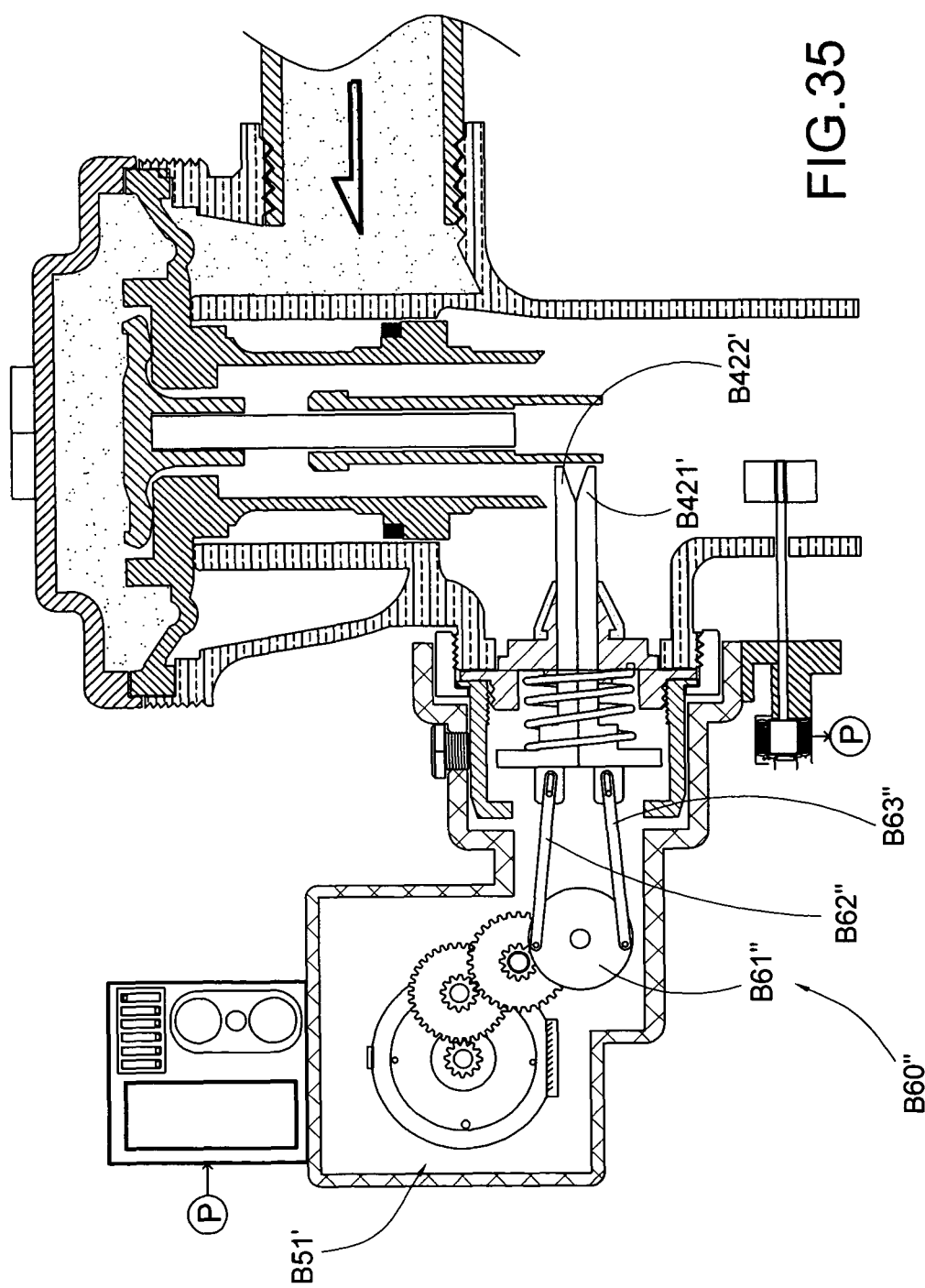
FIG. 35 illustrates an alternative mode of the automated plunger arm of the flush apparatus according to the above fifth preferred embodiment of the present invention.
Figure 36:
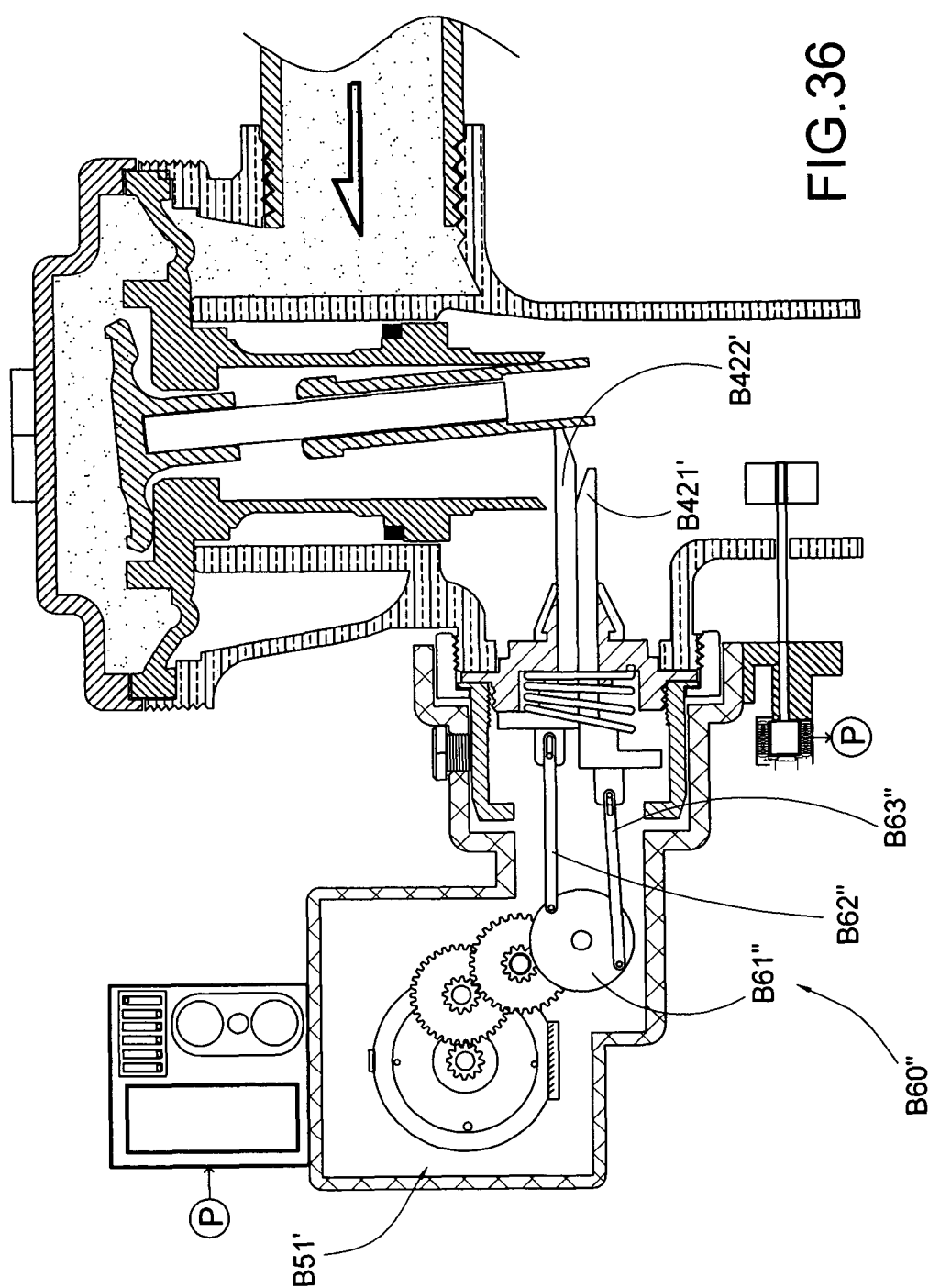
FIG. 36 is a sectional view of the flush apparatus according to the above alternative mode of the fifth preferred embodiment of the present invention, illustrating the high volume pusher member being actuated.
Figure 37:
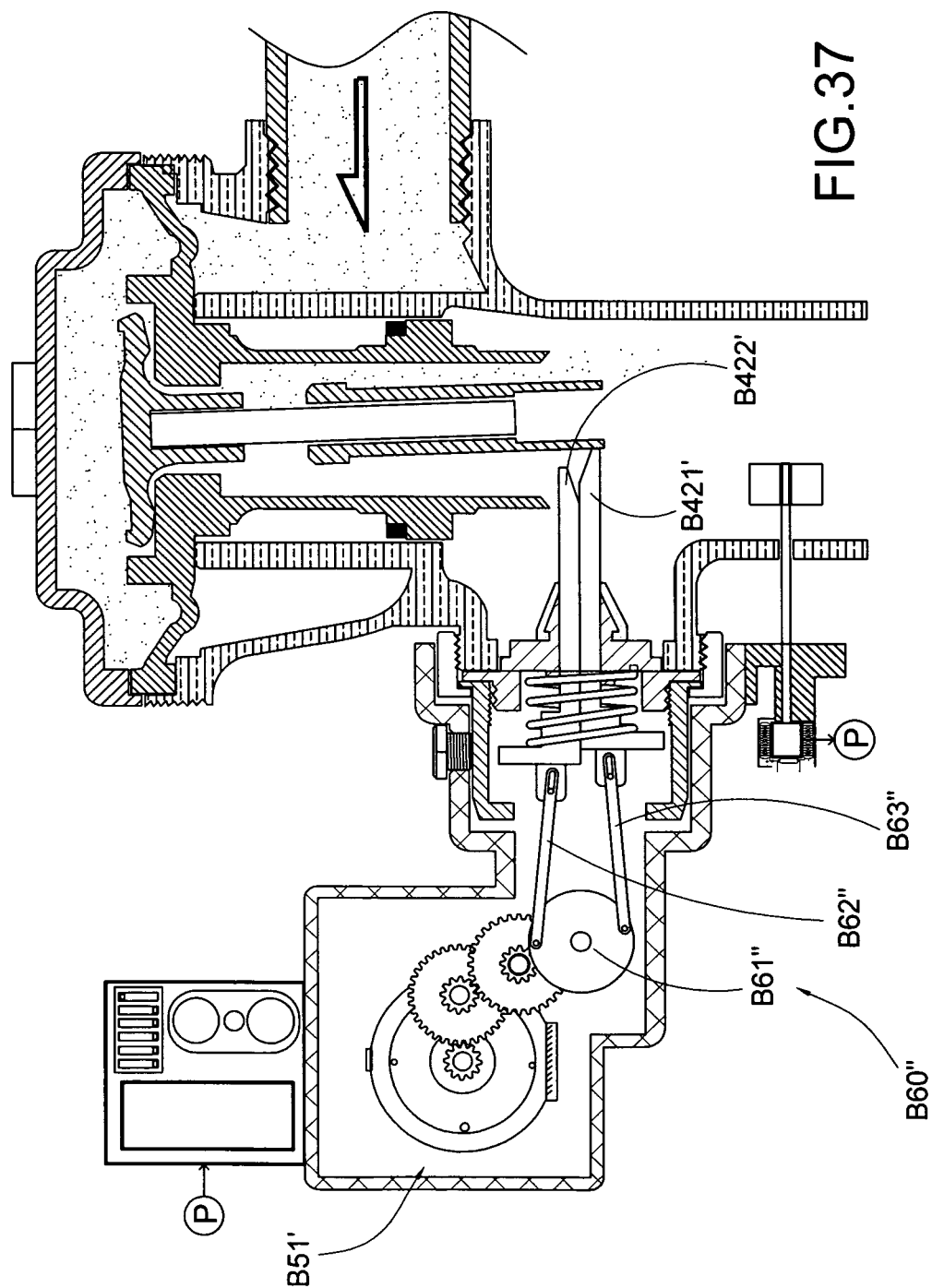
FIG. 37 is a sectional view of the flush apparatus according to the above alternative mode of the fifth preferred embodiment of the present invention, illustrating the low volume pusher member being actuated.

FIGS. 35 to 37 illustrate an alternative mode of the fifth embodiment, wherein the automated plunger arm B60" comprises a driving disc B61" driven to be rotated by the motorized unit B50, and first and second driving members B62", B63" pivotally and spacedly coupled at the driving disc B61" to align with the high and low volume pusher members B422, B421 respectively. Therefore, when the driving disc B61" is rotated at a the rotation direction, the first driving member B62" is actuated to push at the high volume pusher member B422, and when the driving disc B61" is rotated at the second to rotation direction, the second driving member B63" is actuated to push at the low volume pusher member B421.

It is worth mentioning that the low volume pusher member B421 can be slidably coupled within the central cavity B4223 of the high volume pusher member B422 to form the tube-in-tube configuration as it is mentioned above in order for the first and second driving members B62", B63" to selectively push at the high and low volume pusher members B422, B421. It is appreciated that the high and low volume pusher members B422, B421 can be supported side-by-side for the first and second driving members B62", B63" to selectively push at the high and low volume pusher members B422, B421.

Figure 38:
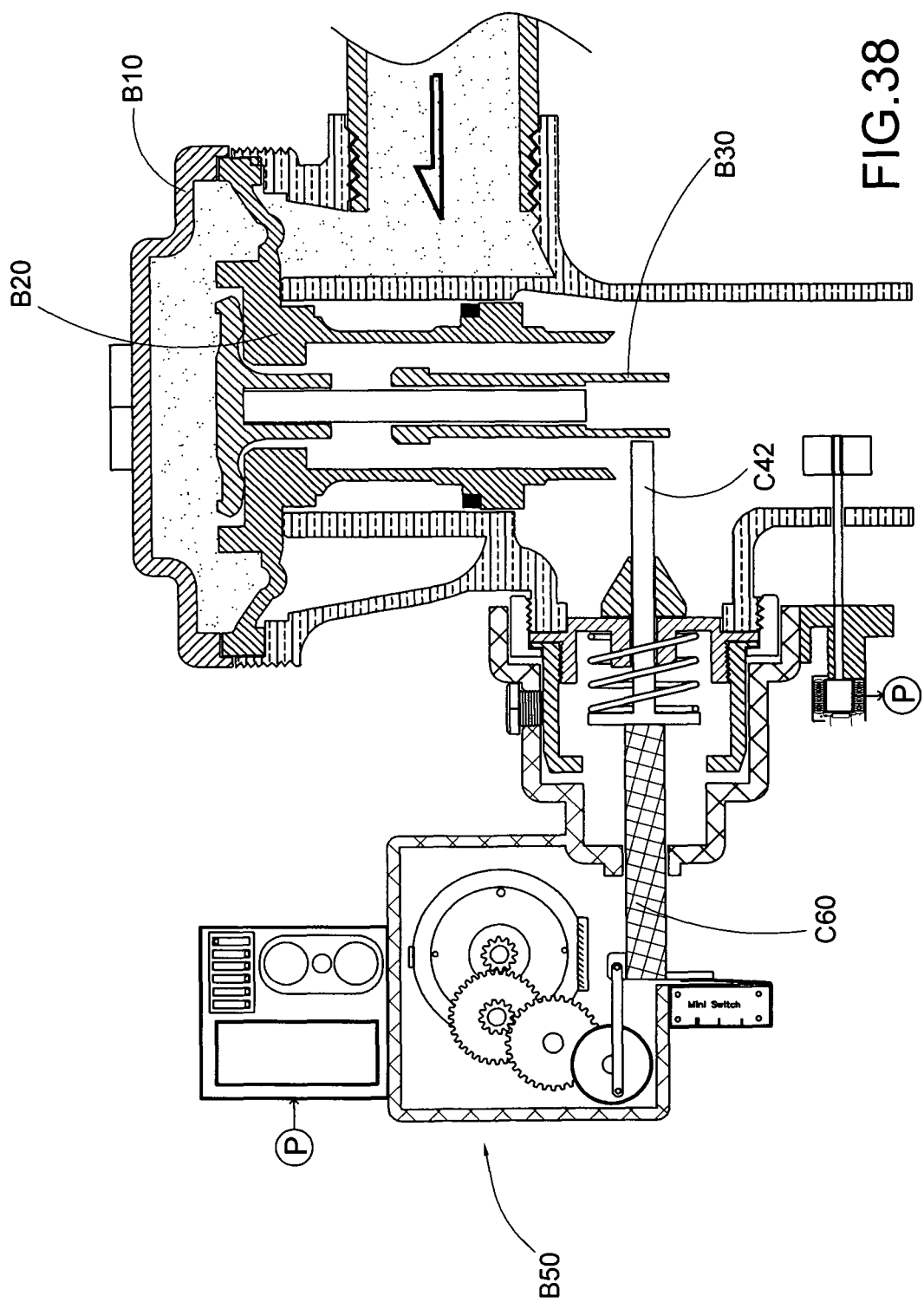
FIG. 38 is a sectional view of the flush apparatus according to a sixth preferred embodiment of the present invention

As shown in FIG. 38, a flush system of sixth embodiment illustrates an alternative mode of the second embodiment, wherein the automated plunger arm C60 is driven to laterally move in a reciprocating manner via the output of the motorized unit B50 through the rotation of the gear set. It is worth to mention that the time of the automated plunger arm C60 traveling back and forth can be controlled by the rotational speed of the gear set by means of the output of the motorized unit B50. In addition, the automated plunger arm C60 is laterally pulled back by the driving arm so as to ensure the automated plunger arm C60 returning back to its original position once the flush operation is completed.

Figure 39:
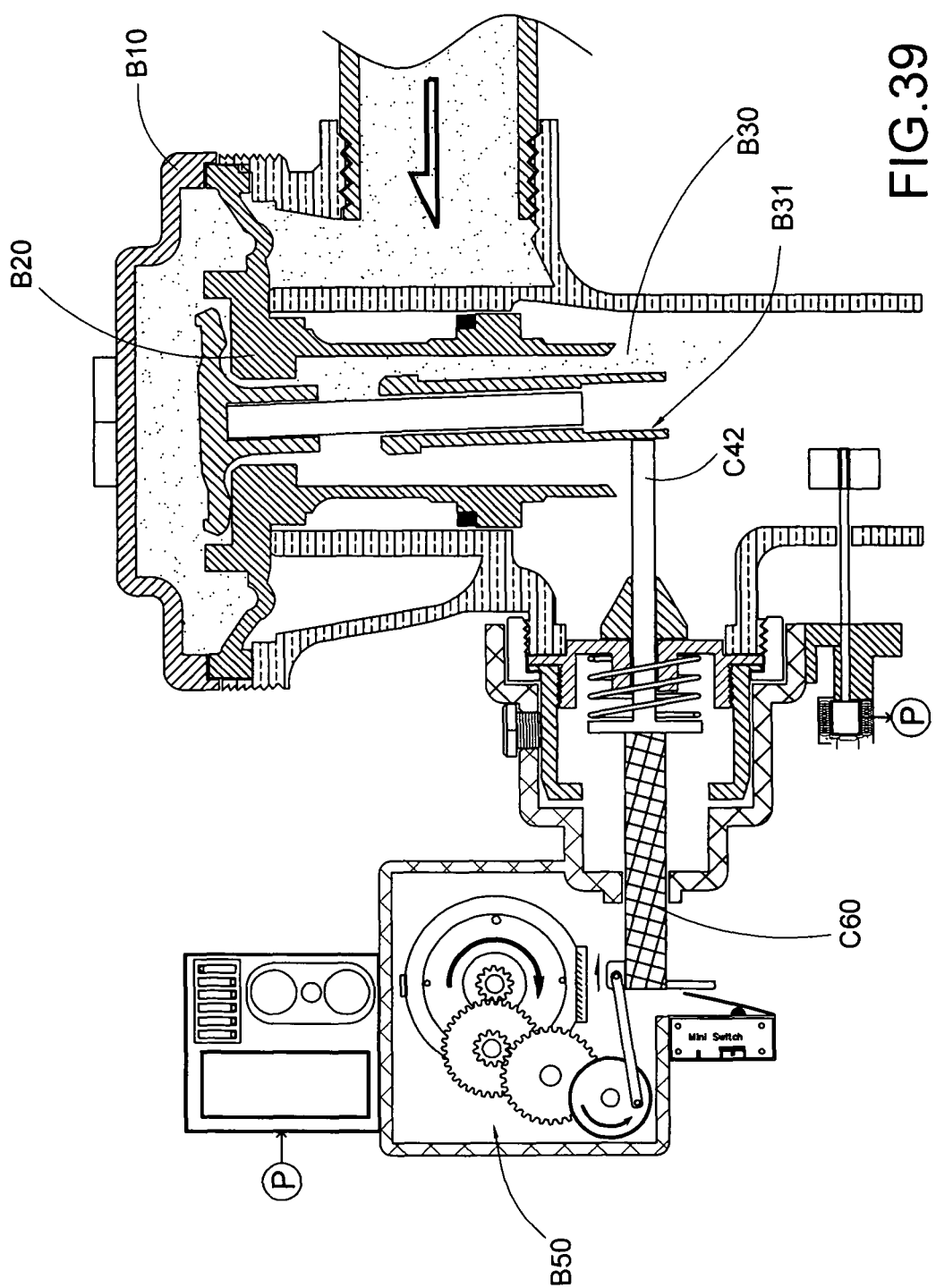
FIG. 39 is a sectional view of the flush apparatus according to the above sixth preferred embodiment of the present invention, illustrating the water control pusher being actuated to push at the first position of the flushing shaft.
Figure 40:
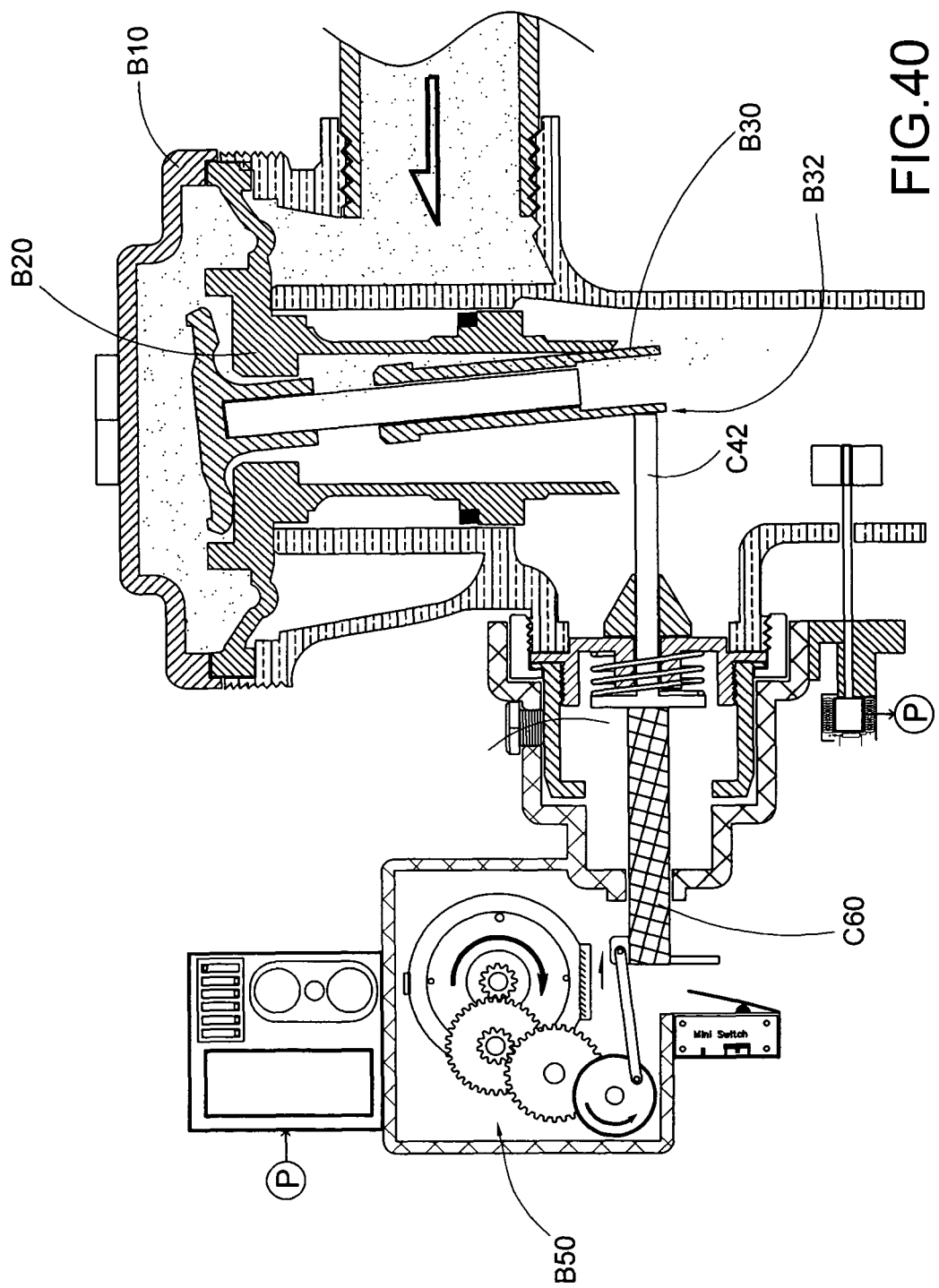
FIG. 40 is a sectional view of the flush apparatus according to the above sixth preferred embodiment of the present invention, illustrating the water control pusher being actuated to push at the second position of the flushing shaft.

Accordingly, the traveling distance of the automated plunger arm C60 will control the inclination angle of the flushing shaft B30 being actuated so as to control the volume of the flushing water. The automated plunger arm C60 is driven to slide between a first traveling distance and a second traveling distance by the motorized unit B50. When the automated plunger arm C60 is slid at the first traveling distance, the water control pusher C42 is actuated to push at the first position B31 of the flushing shaft B30, as shown in FIG. 39, and when the automated plunger arm C60 is slid at the second traveling distance, the water control pusher C42 is actuated to push at the second position B32 of the flushing shaft B30, as shown in FIG. 40. Accordingly, the first traveling distance is shorter than the second traveling distance.

In other words, by controlling the output of the motorized unit B50, the time period of the valve seat B20 being stayed at the opened condition can be controlled. When the automated plunger arm C60 travels a relatively longer the traveling distance, i.e. the second position B32 of the flushing shaft B30, a relatively high volume of flush water is allowed to pass through the valve body B10 because there is an extended time of opening of the valve seat B20. When the automated plunger arm C60 travels a relatively shorter the traveling distance, i.e. the first position B31 of the flushing shaft B30, a relatively low volume of flush water is allowed to pass through the valve body B10 because there is a shorter time of opening of the valve seat B20.

Figure 41:
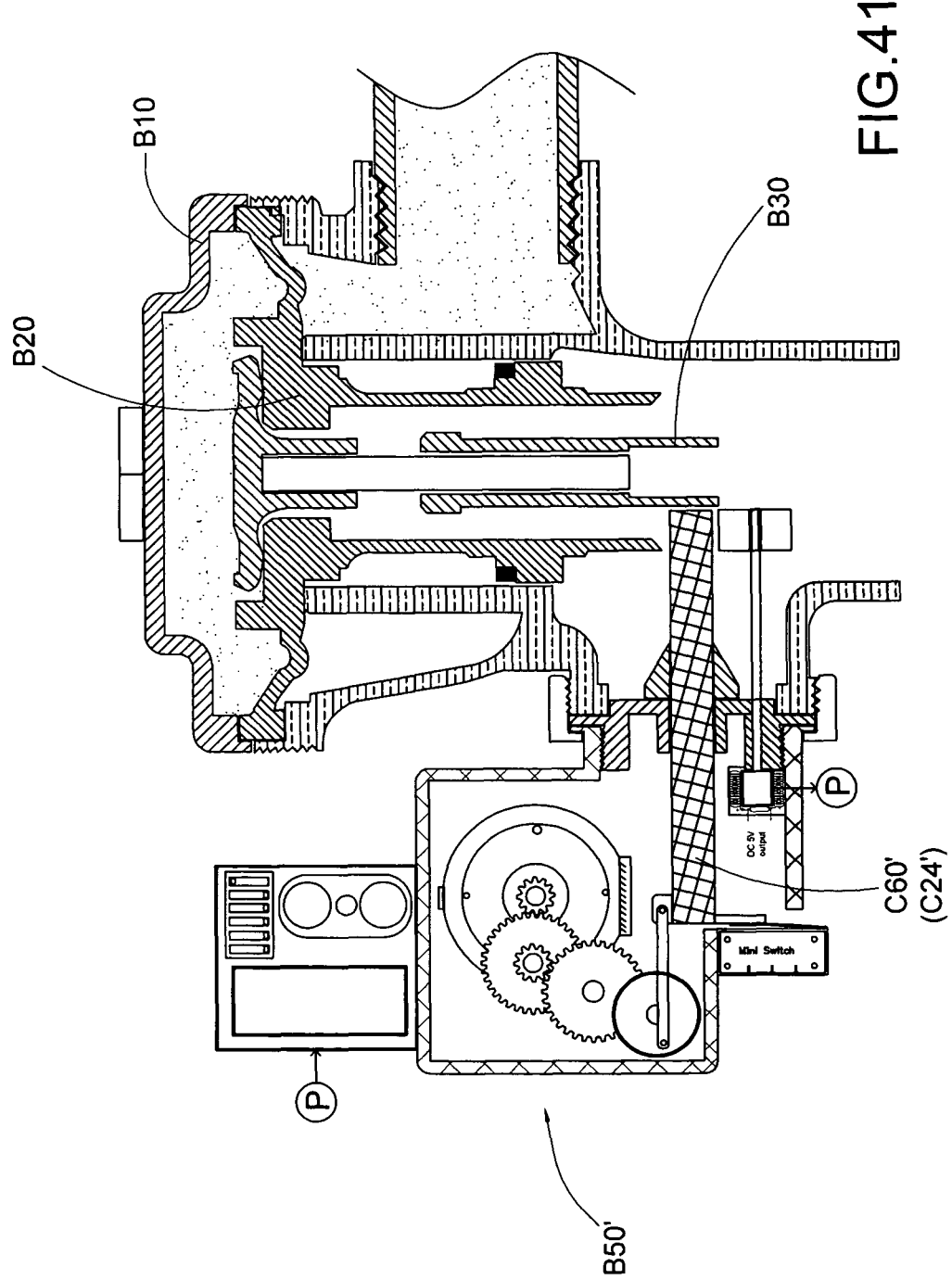
FIG. 41 illustrates an alternative mode of the flush apparatus according to the above sixth preferred embodiment of the present invention, illustrating the water control pusher integrated with the automated plunger arm.

FIG. 41 illustrates an alternative mode of the automated plunger arm C60', wherein the automated plunger arm C60' is integrated with the water control pusher C24' to form an elongated pushing member that the output of the motorized unit B50 directly controls the traveling distance of the water control pusher C24' towards the flushing shaft B30.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A flush system, comprising:
a valve body having a water inlet and a water outlet;
a valve seat supported in said valve body between said water inlet and said water outlet, wherein said valve seat is adapted to move between a normal idle position that water is blocked to flow from said water inlet to said water outlet and a flushing position that said water is allowed to flow from said water inlet to said water outlet so as to complete a flushing operation;
a flushing shaft extended from said valve seat to move said valve seat between said idle position and said flushing position, wherein said flushing shaft defines a first position and a second position;
a flush water control arrangement, which comprises:
a water control pusher alignedly extended towards said flushing shaft; and
an automated actuation unit which comprises a motorized unit and an automated plunger arm movably extended towards said water control pusher, wherein when said motorized unit is activated in responsive to a presence of a user, said automated plunger arm is driven by said motorized unit to move said water control pusher so as to actuate said flushing shaft between said first and second positions for complete a flushing operation, wherein said water control pusher is actuated to push at said second position of said flushing shaft to complete said flushing operation with a relatively high volume of water, wherein said water control pusher is actuated to push at said first position of said flushing shaft to complete said flushing operation with a relatively low volume of water.

2. The flush system, as recited in claim 1, wherein said water control pusher comprising a low volume pusher member and a high volume pusher member alignedly extended towards said first position and said second position of said flushing shaft respectively such that when said automated plunger arm is actuated to push said high volume pusher member, said high volume pusher member is actuated to push at said second position of said flushing shaft to complete said flushing operation with a relatively high volume of water, and when said automated plunger arm is actuated to push said low volume pusher member, said low volume pusher member is actuated to push at said first position of said flushing shaft to complete said flushing operation with a relatively low volume of water.

3. The flush system, as recited in claim 2, wherein said automated plunger arm comprises a driving member coupled at an output shaft of said motorized unit in such a manner that when said driving member is actuated by said motorized unit, said driving member is driven to selectively actuate one of said high volume pusher member and said low volume pusher member to complete said flushing operation.

4. The flush system, as recited in claim 3, wherein said driving member is driven to rotate by said motorized unit, such that when said driving member is rotated at a first rotation direction, said driving member actuates said high volume pusher member, and when said driving member is rotated at an opposite second rotation direction, said driving member actuates said low volume pusher member.

5. The flush system, as recited in claim 4, wherein said automated pusher member further has first and second inclined actuating surfaces spacedly and coaxially formed at said driving member to couple with said high volume pusher member and said low volume pusher member respectively, such that when said driving member is rotated at said first rotation direction, said first inclined actuating surface pushes at said high volume pusher member, and when said driving member is rotated at said second rotation direction, said second inclined actuating surface pushes at said low volume pusher member.

6. The flush system, as recited in claim 5, wherein said high volume pusher member is a tubular member having a central cavity that said low volume pusher member is slidably received in said central cavity, such that said low volume pusher member is slid within said high volume pusher member to push at said first position of said flushing shaft.

7. The flush system, as recited in claim 2, wherein said automated plunger arm comprises a driving disc driven to be rotated by said motorized unit, wherein inner ends of said high and low volume pusher members are pivotally and spacedly coupled at said driving disc in such a manner that when said driving disc is rotated at a first rotation direction, said low volume pusher member is pushed at said first position of said flushing shaft, and when said driving disc is rotated at an opposite second rotation direction, said high volume pusher member is pushed at said second position of said flushing shaft.

8. The flush system, as recited in claim 7, wherein said high volume pusher member and said low volume pusher member are slidably extended side-by-side to push at said second and first positions of said flushing shaft respectively.

9. The flush system, as recited in claim 2, wherein said automated plunger arm comprises a driving disc driven to be rotated by said motorized unit, and first and second driving members pivotally and spacedly coupled at said driving disc to align with said high and low volume pusher members respectively, such that when said driving disc is rotated at a first rotation direction, said first driving member is actuated to push at said high volume pusher member, and when said driving disc is rotated at an opposite second rotation direction, said second driving member is actuated to push at said low volume pusher member.

10. The flush system, as recited in claim 9, wherein said high volume pusher member is a tubular member having a central cavity that said low volume pusher member is slidably received in said central cavity, such that said low volume pusher member is slid within said high volume pusher member to push at said first position of said flushing shaft.

11. The flush system, as recited in claim 9, wherein said high volume pusher member and said low volume pusher member are slidably extended side-by-side to push at said second and first positions of said flushing shaft respectively.

12. The flush system, as recited in claim 1, wherein said automated plunger arm is driven to slide between a first traveling distance and a second traveling distance by said motorized unit, such that when said automated plunger arm is slid at said first traveling distance, said water control pusher is actuated to push at said first position of said flushing shaft, and when said automated plunger arm is slid at said second traveling distance, said water control pusher is actuated to push at said second position of said to flushing shaft.

13. The flush system, as recited in claim 12, wherein said first traveling distance is shorter than said second traveling distance.

14. The flush system, as recited in claim 1, wherein said motorized unit comprises a servo unit, a sensor controllably activating said servo unit in responsive to a presence of the user, and a processor operatively linked to said servo unit for determining a time usage of said user, so as to controllably move said water control pusher to actuate said flushing shaft between said first and second positions.

15. The flush system, as recited in claim 5, wherein said motorized unit comprises a servo unit, a sensor controllably activating said servo unit in responsive to a presence of the user, and a processor operatively linked to said servo unit for determining a time usage of said user, so as to controllably move said water control pusher to actuate said flushing shaft between said first and second positions.

16. The flush system, as recited in claim 7, wherein said motorized unit comprises a servo unit, a sensor controllably activating said servo unit in responsive to a presence of the user, and a processor operatively linked to said servo unit for determining a time usage of said user, so as to controllably move said water control pusher to actuate said flushing shaft between said first and second positions.

17. The flush system, as recited in claim 9, wherein said motorized unit comprises a servo unit, a sensor controllably activating said servo unit in responsive to a presence of the user, and a processor operatively linked to said servo unit for determining a time usage of said user, so as to controllably move said water control pusher to actuate said flushing shaft between said first and second positions.

18. The flush system, as recited in claim 14, wherein said processor operatively activates said servo unit for controlling a time of a flushing cycle in responsive to the time usage of said user, so as to selectively actuate said flushing shaft at one of said first position and said second position.

19. The flush system, as recited in claim 15, wherein said processor operatively activates said servo unit for controlling a time of a flushing cycle in responsive to the time usage of said user, so as to selectively actuate said flushing shaft at one of said first position and said second position.

20. The flush system, as recited in claim 16, wherein said processor operatively activates said servo unit for controlling a time of a flushing cycle in responsive to the time usage of said user, so as to selectively actuate said flushing shaft at one of said first position and said second position.

21. The flush system, as recited in claim 17, wherein said processor operatively activates said servo unit for controlling a time of a flushing cycle in responsive to the time usage of said user, so as to selectively actuate said flushing shaft at one of said first position and said second position.

22. A method of controlling a volume of water for completing a flushing operation of a flush system, comprising the steps of:
(a) normally retaining a valve seat at an idle position that said valve seat is sealed in a valve body between a water inlet and a water outlet to block the water flowing from said water inlet to said water outlet, wherein a flushing shaft is extended from said valve seat to move said valve seat between said idle position and a flushing position; and (b) in responsive to a presence of a user, determining said flush system requiring high volume of water or low volume of water to complete said flush operation; and (c) activating an motorized unit to actuate an automated plunger arm to move a water control pusher so as to actuate said flushing shaft between a first position and a second position, wherein said water control pusher is actuated to push at said second position of said flushing shaft to complete said flushing operation with a relatively high volume of water, wherein said water control pusher is actuated to push at said first position of said flushing shaft to complete said flushing operation with a relatively low volume of water.

23. The method, as recited in claim 22, wherein the step (c) further comprises the steps of:

(c.1) actuating a low volume pusher member of said automated plunger arm to push at said first position of said flushing shaft to complete said flushing operation with a relatively low volume of water; and (c.2) actuating a high volume pusher member of said automated plunger arm to push at said second position of said flushing shaft to complete said flushing operation with a relatively high volume of water.

24. The method, as recited in claim 23, wherein the step (c) further comprises a step of (c.3) actuating a driving member by said motorized unit to selectively actuate one of said high volume pusher member and said low volume pusher member to complete said flushing operation.

25. The method, as recited in claim 24, wherein said driving member is driven to rotate by said motorized unit, such that when said driving member is rotated at a first rotation direction, said driving member actuates said high volume pusher member, and when said driving member is rotated at an opposite second rotation direction, said driving member actuates said low volume pusher member.

26. The method, as recited in claim 25, wherein said automated pusher member further has first and second inclined actuating surfaces spacedly and coaxially formed at said driving member to couple with said high volume pusher member and said low volume pusher member respectively, such that when said driving member is rotated at said first rotation direction, said first inclined actuating surface pushes at said high volume pusher member, and when said driving member is rotated at said second rotation direction, said second inclined actuating surface pushes at said low volume pusher member.

27. The method, as recited in claim 26, wherein said high volume pusher member is a tubular member having a central cavity that said low volume pusher member is slidably received in said central cavity, such that said low volume pusher member is slid within said high volume pusher member to push at said first position of said flushing shaft.

28. The method, as recited in claim 26, wherein inner ends of said high and low volume pusher members are pivotally and spacedly coupled at said driving disc in such a manner that when said driving disc is rotated at a first rotation direction, said low volume pusher member is pushed at said first position of said flushing shaft, and when said driving disc is rotated at an opposite second rotation direction, said high volume pusher member is pushed at said second position of said flushing shaft.

29. The method, as recited in claim 28, wherein said high volume pusher member and said low volume pusher member are slidably extended side-by-side to push at said second and first positions of said flushing shaft respectively.

30. The method, as recited in claim 24, wherein the step (c.3) further comprises the steps of:

(c.3.1) actuating a first driving member to push at said high volume pusher member when said driving disc is rotated at said first rotation direction; and (c.3.2) actuating a second driving member to push at said low volume pusher member when said driving disc is rotated at said second rotation direction, wherein said first and second driving members pivotally and spacedly coupled at said driving disc to align with said high and low volume pusher members respectively.

31. The method, as recited in claim 30, wherein said high volume pusher member is a tubular member having a central cavity that said low volume pusher member is slidably received in said central cavity, such that said low volume pusher member is slid within said high volume pusher member to push at said first position of said flushing shaft.

32. The method, as recited in claim 30, wherein said high volume pusher member and said low volume pusher member are slidably extended side-by-side to push at said second and first positions of said flushing shaft respectively.

33. The method, as recited in claim 22, wherein the step (c) further comprises a step of driving said automated plunger arm by said motorized unit to slide between a first traveling distance and a second traveling distance, wherein when said automated plunger arm is slid at said first traveling distance, said water control pusher is actuated to push at said first position of said flushing shaft, and when said automated plunger arm is slid at said second traveling distance, said water control pusher is actuated to push at said second position of said flushing shaft.

34. The method, as recited in claim 33, wherein said first traveling distance is shorter than said second traveling distance.

35. The method, as recited in claim 22, wherein the step (b) further comprises the steps of:

(b.1) sending a first signal to a processor from a sensor when said sensor detects the presence of the user so as to activate said motorized unit;

(b.2) sending a second signal to said processor once the user leaves the flush system; and (b.3) determining a time usage of the user by the time difference between said first and second signals in order to actuate said automated plunger arm to move said flushing shaft at one of said first position and said second positions, so as to complete said flush operation with one of high volume of water and low volume of water.

36. The method, as recited in claim 25, wherein the step (b) further comprises the steps of:

(b.1) sending a first signal to a processor from a sensor when said sensor detects the presence of the user so as to activate said motorized unit;

(b.2) sending a second signal to said processor once the user leaves the flush system; and (b.3) determining a time usage of the user by the time difference between said first and second signals in order to actuate said automated plunger arm to move said flushing shaft at one of said first position and said second positions, so as to complete said flush operation with one of high volume of water and low volume of water.

37. The method, as recited in claim 28, wherein the step (b) further comprises the steps of:

(b.1) sending a first signal to a processor from a sensor when said sensor detects the presence of the user so as to activate said motorized unit;

(b.2) sending a second signal to said processor once the user leaves the flush system; and (b.3) determining a time usage of the user by the time difference between said first and second signals in order to actuate said automated plunger arm to move said flushing shaft at one of said first position and said second positions, so as to complete said flush operation with one of high volume of water and low volume of water.

38. The method, as recited in claim 30, wherein the step (b) further comprises the steps of:

(b.1) sending a first signal to a processor from a sensor when said sensor detects the presence of the user so as to activate said motorized unit;

(b.2) sending a second signal to said processor once the user leaves the flush system; and (b.3) determining a time usage of the user by the time difference between said first and second signals in order to actuate said automated plunger arm to move said flushing shaft at one of said first position and said second positions, so as to complete said flush operation with one of high volume of water and low volume of water.

39. The method, as recited in claim 33, wherein the step (b) further comprises the steps of:

(b.1) sending a first signal to a processor from a sensor when said sensor detects the presence of the user so as to activate said motorized unit;

(b.2) sending a second signal to said processor once the user leaves the flush system; and (b.3) determining a time usage of the user by the time difference between said first and second signals in order to actuate said automated plunger arm to move said flushing shaft at one of said first position and said second positions, so as to complete said flush operation with one of high volume of water and low volume of water.

* * * * *